United States Patent
Sekiguchi et al.

(10) Patent No.: US 6,493,385 B1
(45) Date of Patent: Dec. 10, 2002

(54) IMAGE ENCODING METHOD, IMAGE ENCODER, IMAGE DECODING METHOD, AND IMAGE DECODER

(75) Inventors: Shunichi Sekiguchi, Tokyo (JP); Yoshimi Isu, Tokyo (JP); Kohtaro Asai, Tokyo (JP); Hirofumi Nishikawa, Tokyo (JP); Shinichi Kuroda, Tokyo (JP); Yuri Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/529,026

(22) PCT Filed: Oct. 23, 1997

(86) PCT No.: PCT/JP97/03847

§ 371 (c)(1), (2), (4) Date: Apr. 6, 2000

(87) PCT Pub. No.: WO99/22525

PCT Pub. Date: May 6, 1999

(51) Int. Cl.[7] ................................................ H04N 7/50
(52) U.S. Cl. ..................... 375/240.03; 375/240.12; 375/240.14; 375/240.15; 375/240.24
(58) Field of Search ................ 375/240.03, 240.12, 375/240.14, 240.15, 240.24; H04N 7/50

(56) References Cited

U.S. PATENT DOCUMENTS 5,715,008 A * 2/1998 Sekiguchi et al. ..... 375/240.15
6,381,275 B1 * 4/2002 Fukuhara et al. ...... 375/240.14

FOREIGN PATENT DOCUMENTS

JP        A6351006        12/1994

OTHER PUBLICATIONS

Sugiyama, Technical Report of the Institute of Television Engineers of Japan, vol. 13, No. 60, pp. 13–18 (1989).
Kogure et al., Nikkei Electronics, No. 699, pp. 159–160 (1997).

* cited by examiner

*Primary Examiner*—Howard Britton

(57) ABSTRACT

In a picture coding apparatus, even though conditions such as a bit rate are changed, a burden of overhead information arranged in a picture signal is reduced, and the picture signal is coded according to an optimum coding mode without lowering a coding efficiency. A coding mode judging unit 2 has two coding mode tables A and B including identification numbers of coding modes selectable for a picture-to-be-coded, one of the coding mode tables 1 and 2 is selected according to coding mode table selection information, a coding mode corresponding to a better coding efficiency is selected from a plurality of coding modes of the selected coding mode table, and a coded picture signal is obtained.

10 Claims, 40 Drawing Sheets

FIG.2

MBTYPE TABLE FOR B-VOP CODING PROPOSED IN VM 8.0 (MBTYPE-0)

| MODE NUMBER (VALUE OF MBTYPE) | CODING MODE | DQUANT | MVDf | MVDb | MVDB | CODE-WORD |
|---|---|---|---|---|---|---|
| 0 | DIRECT PREDICTION | | | | × | 1 |
| 1 | BIDIRECTIONAL PREDICTION+ QUANTIZATION CHANGE-OVER | × | × | × | | 01 |
| 2 | BACKWARD PREDICTION+ QUANTIZATION CHANGE-OVER | × | | × | | 001 |
| 3 | FORWARD PREDICTION+ QUANTIZATION CHANGE-OVER | × | × | | | 0001 |

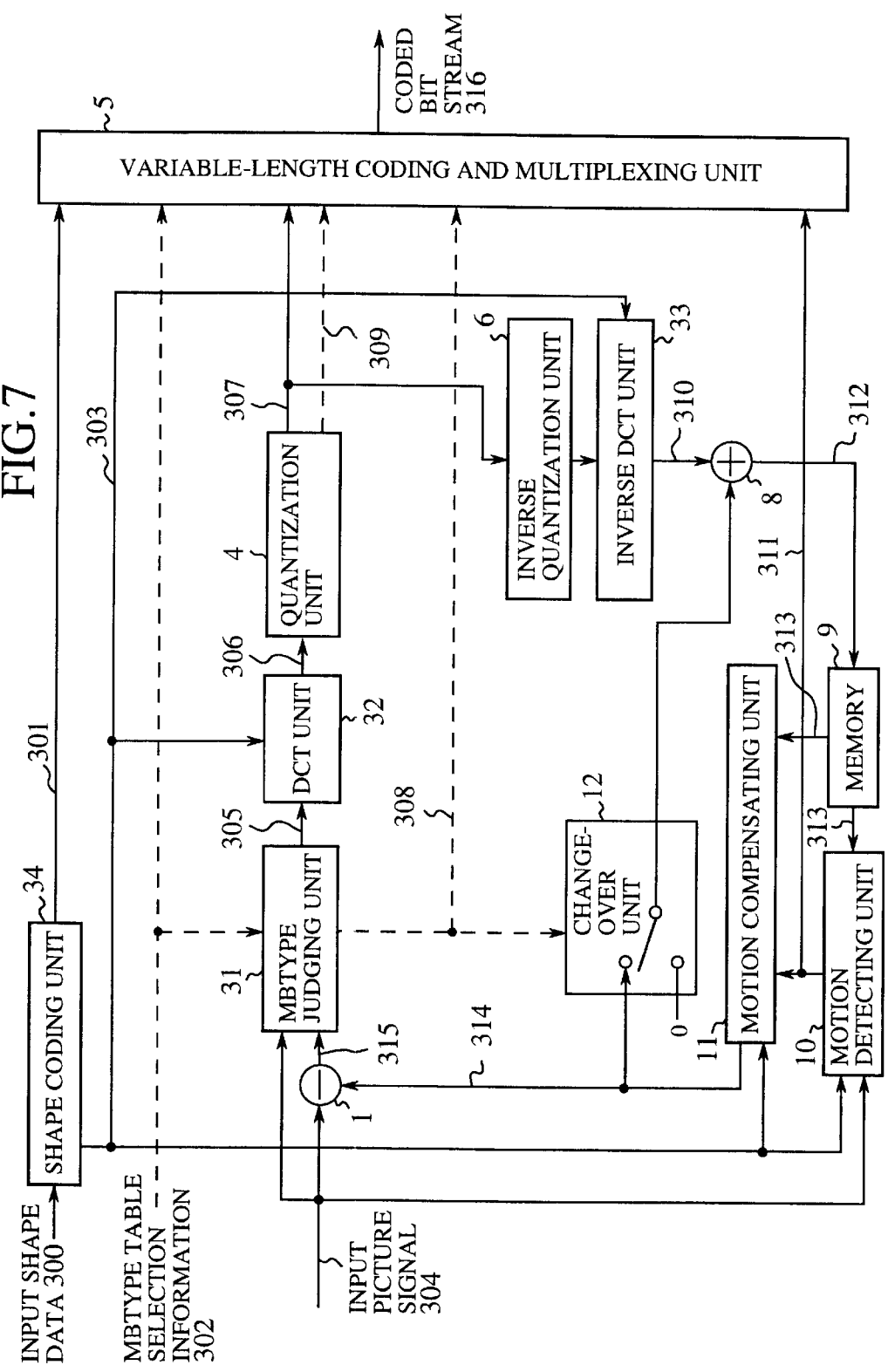

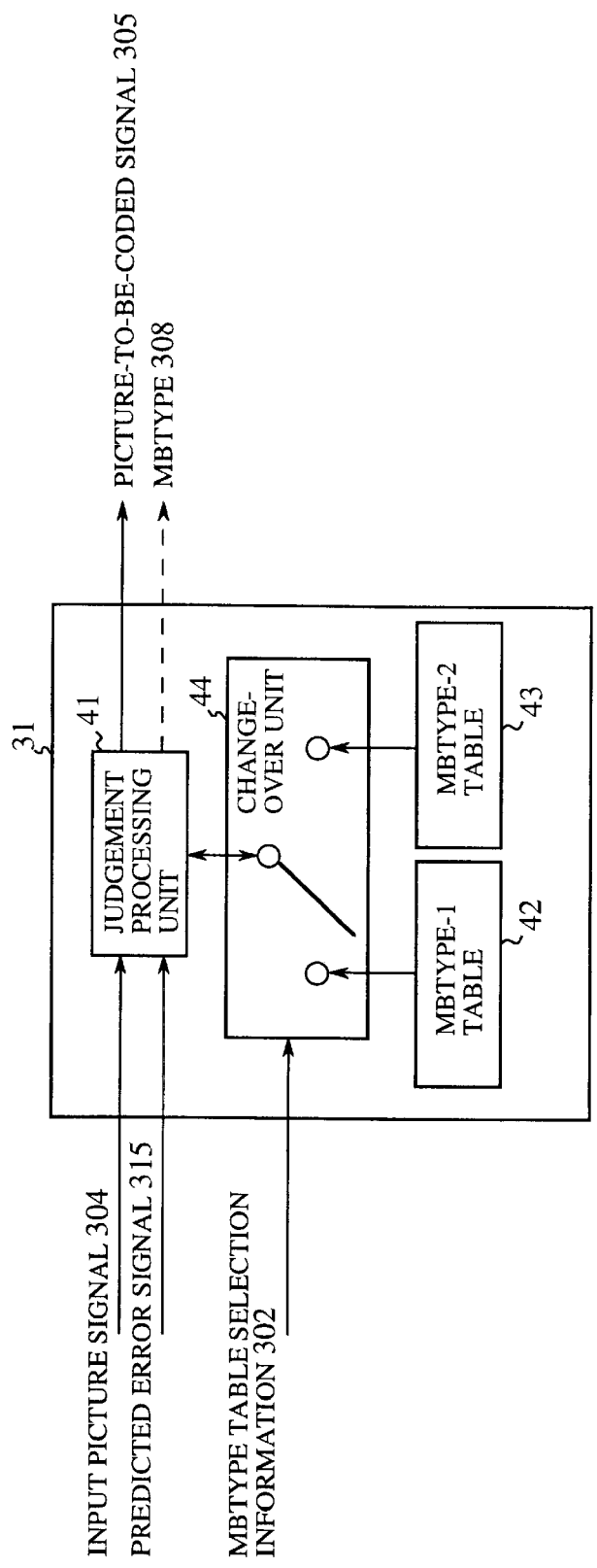

FIG.9

MBTYPE TABLE FOR B-VOP CODING IN SECOND EMBODIMENT (MBTYPE-1)

| MODE NUMBER (VALUE OF MBTYPE) | CODING MODE | DQUANT | MVDf | MVDb | MVDB | CODE-WORD |
|---|---|---|---|---|---|---|
| 0 | DIRECT PREDICTION | | | | × | |
| 1 | BACKWARD PREDICTION + QUANTIZATION CHANGE-OVER | × | | × | | |
| 2 | FORWARD PREDICTION + QUANTIZATION CHANGE-OVER | × | × | | | |
| 3 | STUFFING | | | | | |

※CODE-WORD COLUMN IS DETERMINED ACCORDING TO OCCURRENCE PROBABILITY OF EACH MODE (BEST CODE-WORD AT THIS TIME IS NOT DECIDED)

FIG.10

MBTYPE TABLE FOR B-VOP CODING IN SECOND EMBODIMENT (MBTYPE-2)

| MODE NUMBER (VALUE OF MBTYPE) | CODING MODE | DQUANT | MVDf | MVDb | CODE-WORD |
|---|---|---|---|---|---|
| 0 | INTRA-CODING | | | | |
| 1 | INTRA-CODING + QUANTIZATION CHANGE-OVER | × | | | |
| 2 | BIDIRECTIONAL PREDICTION | | × | × | |
| 3 | BIDIRECTIONAL PREDICTION + QUANTIZATION CHANGE-OVER | × | × | × | |
| 4 | BACKWARD PREDICTION | | | × | |
| 5 | BACKWARD PREDICTION + QUANTIZATION CHANGE-OVER | × | | × | |
| 6 | FORWARD PREDICTION | | × | | |
| 7 | FORWARD PREDICTION + QUANTIZATION CHANGE-OVER | × | × | | |
| 8 | STUFFING | | | | |

※CODE-WORD COLUMN IS DETERMINED ACCORDING TO OCCURRENCE PROBABILITY OF EACH MODE (BEST CODE-WORD AT THIS TIME IS NOT DECIDED)

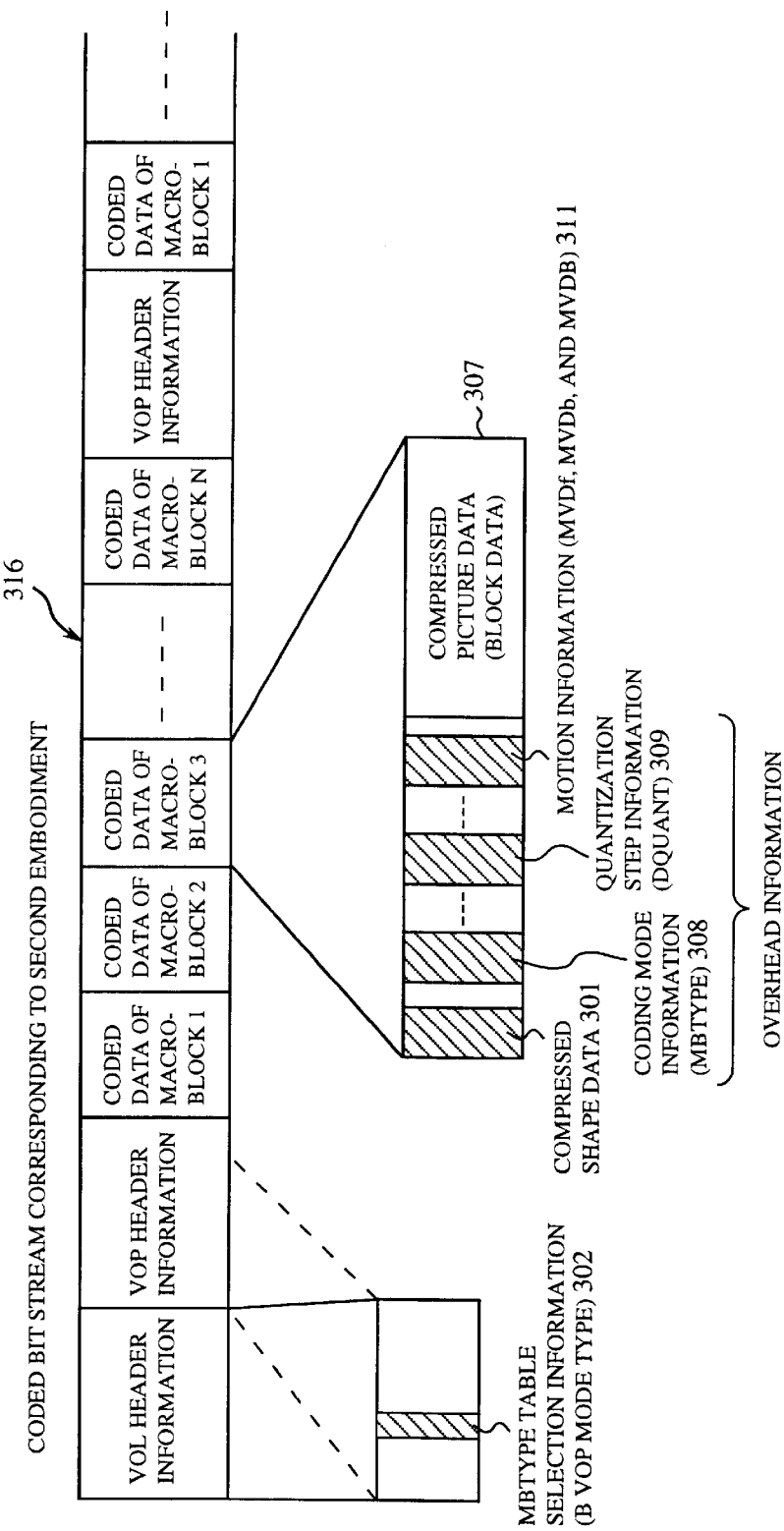

FIG.13

MBTYPE TABLE FOR B-VOP CODING (MBTYPE-3)

| MODE NUMBER (VALUE OF MBTYPE) | CODING MODE | DQUANT | MVDf | MVDb | MVDB | CODE-WORD |
|---|---|---|---|---|---|---|
| 0 | DIRECT PREDICTION | | | | × | |
| 1 | DIRECT PREDICTION + QUANTIZATION CHANGE-OVER | × | | | × | |
| 2 | BACKWARD PREDICTION | | | × | | |
| 3 | BACKWARD PREDICTION + QUANTIZATION CHANGE-OVER | × | | × | | |
| 4 | FORWARD PREDICTION | | × | | | |
| 5 | FORWARD PREDICTION + QUANTIZATION CHANGE-OVER | × | × | | | |

※CODE-WORD COLUMN IS DETERMINED ACCORDING TO OCCURRENCE PROBABILITY OF EACH MODE (BEST CODE-WORD AT THIS TIME IS NOT DECIDED)

FIG.14

MBTYPE TABLE FOR B-VOP CODING (MBTYPE-4)

| MODE NUMBER (VALUE OF MBTYPE) | CODING MODE | DQUANT | MVDf | MVDb | MVDB | CODE-WORD |
|---|---|---|---|---|---|---|
| 0 | BIDIRECTIONAL PREDICTION | | × | × | | |
| 1 | BIDIRECTIONAL PREDICTION + QUANTIZATION CHANGE-OVER | × | × | × | | |
| 2 | BACKWARD PREDICTION | | | × | | |
| 3 | BACKWARD PREDICTION + QUANTIZATION CHANGE-OVER | × | | × | | |
| 4 | FORWARD PREDICTION | | × | | | |
| 5 | FORWARD PREDICTION + QUANTIZATION CHANGE-OVER | × | × | | | |

※CODE-WORD COLUMN IS DETERMINED ACCORDING TO OCCURRENCE PROBABILITY OF EACH MODE (BEST CODE-WORD AT THIS TIME IS NOT DECIDED)

FIG.15

MBTYPE TABLE FOR B-VOP CODING (MBTYPE-5)

| MODE NUMBER (VALUE OF MBTYPE) | CODING MODE | DQUANT | MVDf | MVDb | MVDB | CODE-WORD |
|---|---|---|---|---|---|---|
| 0 | DIRECT PREDICTION | | | | | |
| 1 | DIRECT PREDICTION + QUANTIZATION CHANGE-OVER | × | | | | |
| 2 | BACKWARD PREDICTION | | | × | | |
| 3 | BACKWARD PREDICTION + QUANTIZATION CHANGE-OVER | × | | × | | |
| 4 | FORWARD PREDICTION | | × | | | |
| 5 | FORWARD PREDICTION + QUANTIZATION CHANGE-OVER | × | × | | | |
| 6 | STUFFING | | | | | |

※CODE-WORD COLUMN IS DETERMINED ACCORDING TO OCCURRENCE PROBABILITY OF EACH MODE
(BEST CODE-WORD AT THIS TIME IS NOT DECIDED)

FIG.16

MBTYPE TABLE FOR B-VOP CODING (MBTYPE-6)

| MODE NUMBER (VALUE OF MBTYPE) | CODING MODE | DQUANT | MVDf | MVDb | CODE-WORD |
|---|---|---|---|---|---|
| 0 | REVISED DIRECT PREDICTION | | | | |
| 3 | BACKWARD PREDICTION + QUANTIZATION CHANGE-OVER | × | | × | |
| 5 | FORWARD PREDICTION + QUANTIZATION CHANGE-OVER | × | × | | |
| 6 | STUFFING | | | | |

※CODE-WORD COLUMN IS DETERMINED ACCORDING TO OCCURRENCE PROBABILITY OF EACH MODE (BEST CODE-WORD AT THIS TIME IS NOT DECIDED)

FIG.18

MBTYPE TABLE FOR B-VOP CODING (MBTYPE-7)

| MODE NUMBER (VALUE OF MBTYPE) | CODING MODE | DQUANT | MVDf | MVDb | CODE-WORD |
|---|---|---|---|---|---|
| 0 | REVISED DIRECT PREDICTION | | | | |
| 1 | REVISED DIRECT PREDICTION + QUANTIZATION CHANGE-OVER | × | | | |
| 2 | BACKWARD PREDICTION | | | × | |
| 3 | BACKWARD PREDICTION + QUANTIZATION CHANGE-OVER | × | | × | |
| 4 | FORWARD PREDICTION | | × | | |
| 5 | FORWARD PREDICTION + QUANTIZATION CHANGE-OVER | × | × | | |
| 6 | STUFFING | | | | |

※CODE-WORD COLUMN IS DETERMINED ACCORDING TO OCCURRENCE PROBABILITY OF EACH MODE
(BEST CODE-WORD AT THIS TIME IS NOT DECIDED)

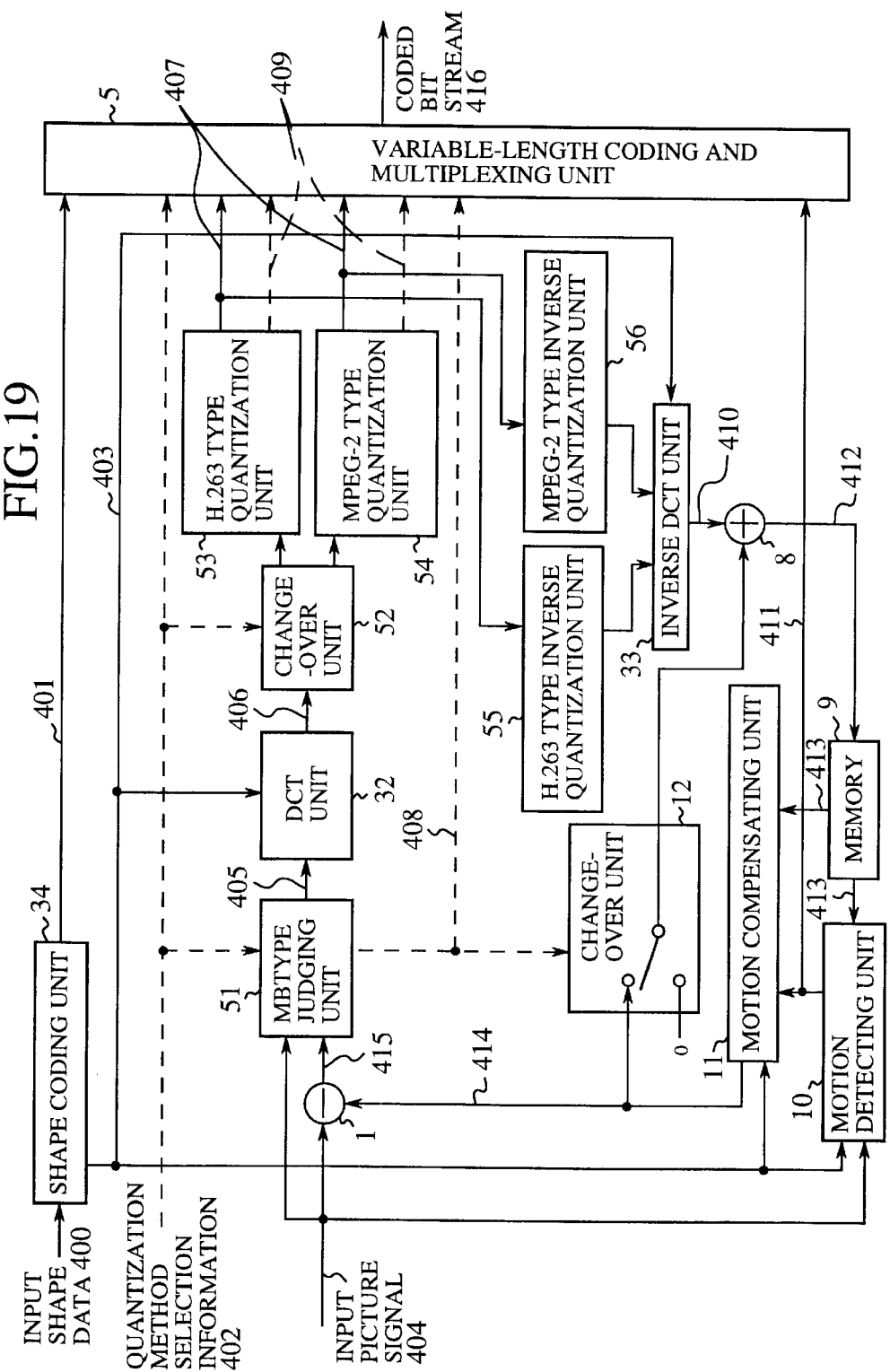

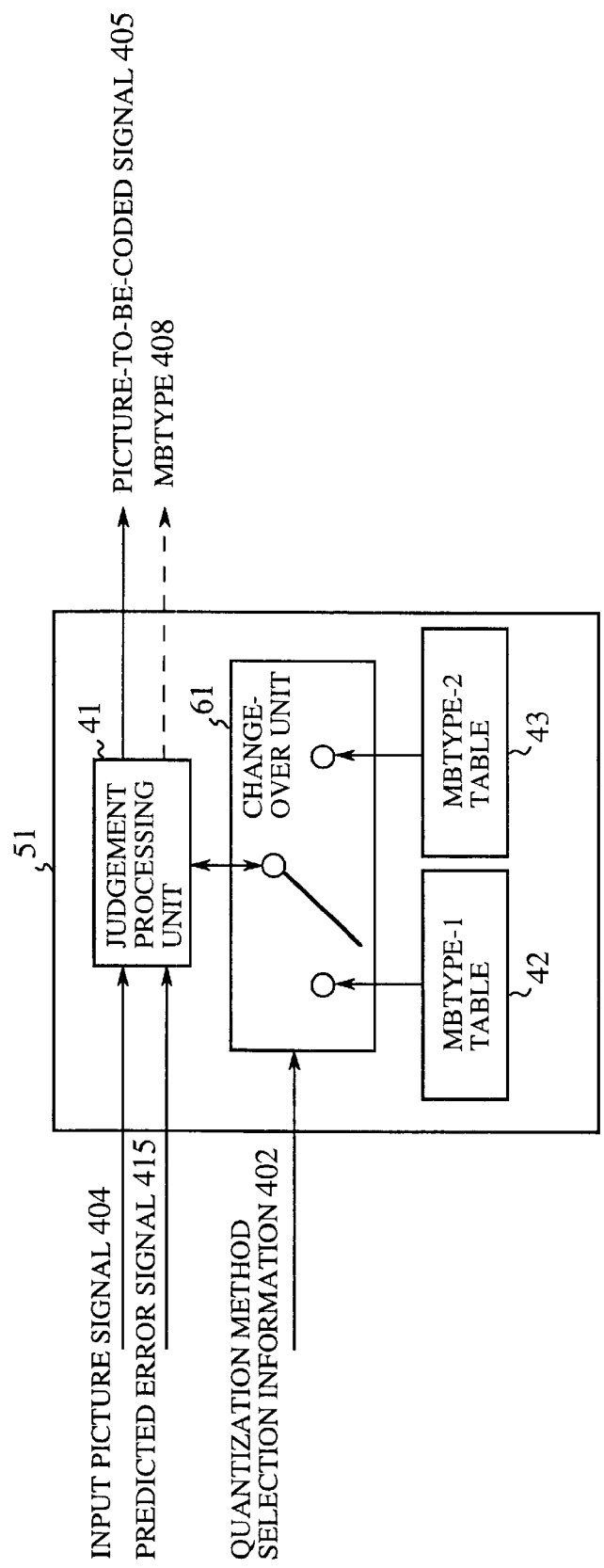

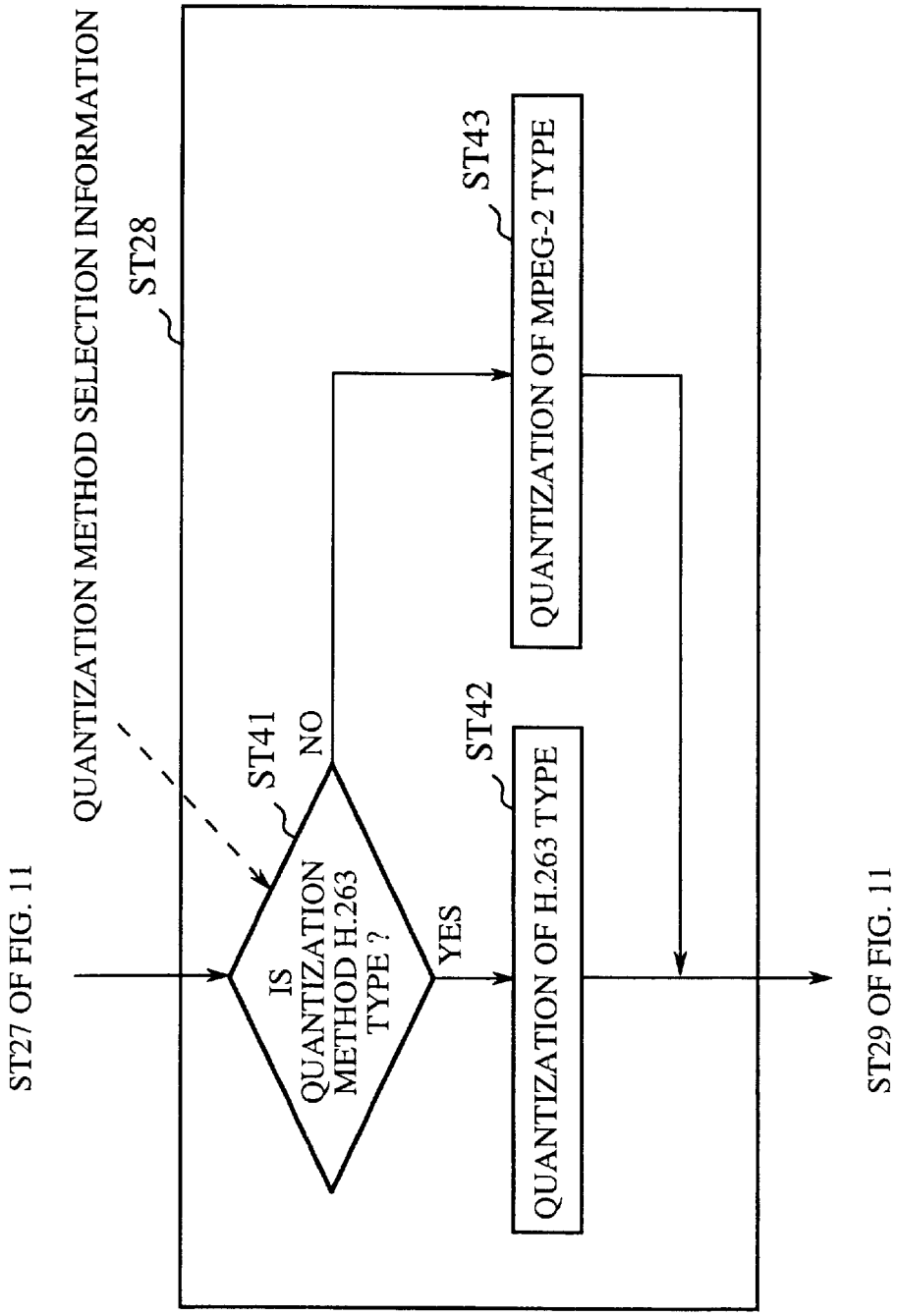

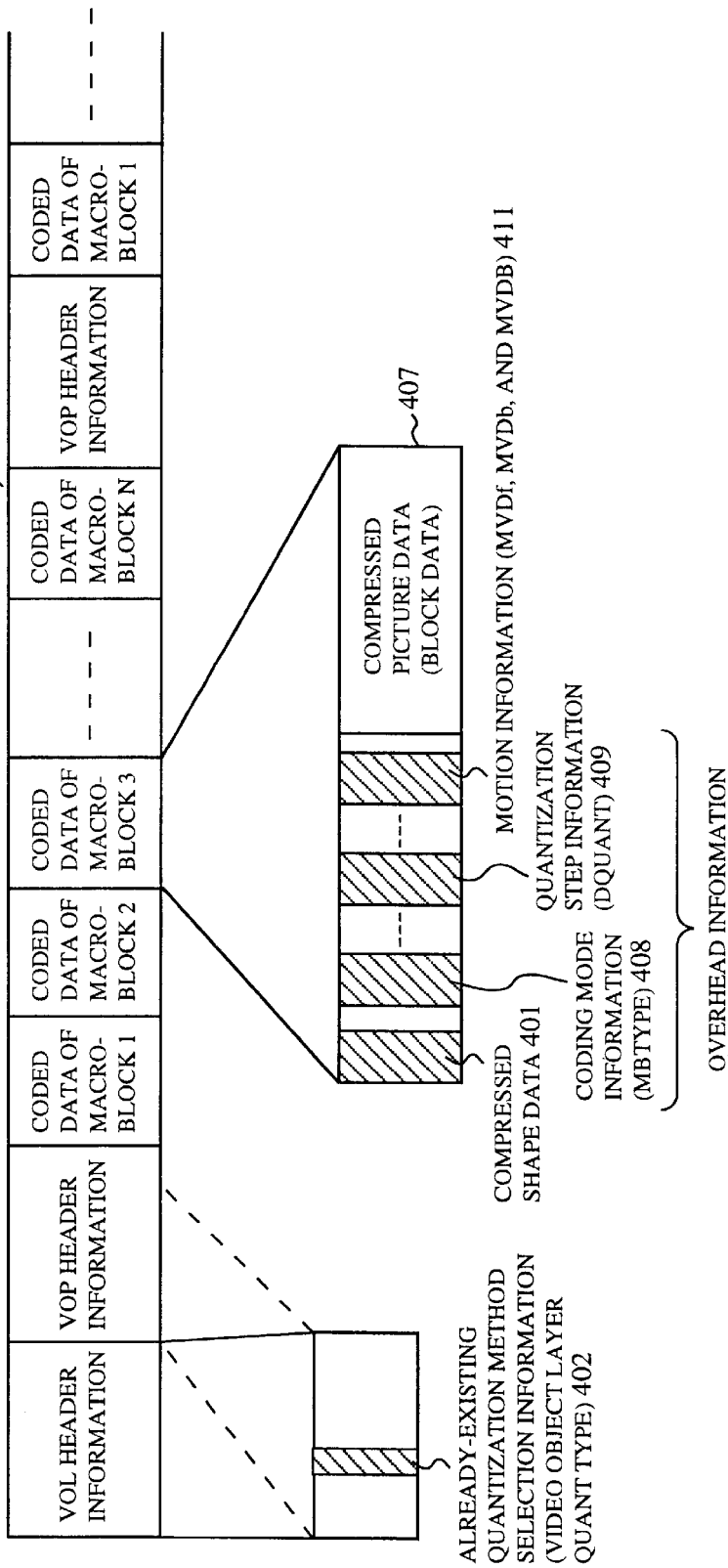

IMAGE ENCODING METHOD, IMAGE ENCODER, IMAGE DECODING METHOD, AND IMAGE DECODER

This application is the national phase under 35 U.S.C. §371 of PCT International Application No. PCT/JP/97/03847 which has an International filing date of Oct. 23, 1997, which designated the United States of America.

TECHNICAL FIELD

The present invention relates to a picture coding method, a picture coding apparatus, a picture decoding method and a picture decoding apparatus for selecting an optimum coding mode of a picture signal to be coded and the picture signal to be decoded (hereinafter, called a picture-to-be-coded signal) from a plurality of coding modes registered in advance, according to conditions such as a bit rate in the transmission of a coded bit stream, and for coding and decoding the picture-to-be-coded signal.

BACKGROUND ART

A background art relating to the present invention in a general picture coding apparatus and a general picture decoding apparatus and drawbacks of the background art are described.

FIG. 1 is a diagram showing a structure of a coded bit stream generally transmitted and received between a picture coding apparatus and a picture decoding apparatus.

As shown in FIG. 1, a coded bit stream is, for example, produced for each frame (or each image plane) of a time and is composed of picture-to-be-coded header information and coded data of each of blocks 1 to N in cases where one frame is, for example, divided into N blocks.

In the picture-to-be-coded header information, quantization method selection information is, for example, included in cases where a method for changing over from a quantization method to another quantization method on coding and decoding sides is adopted.

The coded data of each of the blocks 1 to N is composed of compressed picture data and overhead data, for example, composed of coding mode information, quantization step information and motion information respectively corresponding to each quantization mode.

Therefore, in cases where the number of coding mode types is small, an information amount of the coding modes in the coded data becomes small, so that an overhead information amount can be made small. However, there is a case that an optimum coding mode depending on a picture-to-be-coded signal does not exist, so that there is a drawback that the picture-to-be-coded signal cannot be effectively coded and a picture quality is lowered.

In contrast, in cases where a large number of coding modes for various picture-to-be-coded signals are registered in advance to improve a quality of a decoded picture, the amount of the coding modes existing in the coded data is increased, so that the amount of the overhead information is increased. Therefore, in cases where a size of the coded data is predetermined because of a fixed length coding or a variable length coding, the amount on a compressed picture data side becomes small, a picture quality is lowered on the contrary, so that there is a drawback that a coding efficiency is lowered. In particular, this drawback becomes remarkable in case of a low bit rate in which a small size of the coded data is only allowed.

Next, the above drawbacks are concretely described in a case that a picture coding method and a picture decoding method are specialized to a picture coding apparatus and a picture decoding apparatus corresponding to MPEG-4 (Moving Picture Experts Group Phase-4) which is currently in progress toward standardization by ISO/IEC JTC11/SC29/WG11.

In a video VM8.0 (ISO/IEC JTC1/SC29/WG11/N1796), it is proposed to encode each of macro-blocks in a Bidirectionally predictive-Video Object Plane (B-VOP) coding by selecting one of four macro-block coding modes (hereinafter, called MBTYPEs).

FIG. 2 is a diagram showing an MBTYPE table (MBTYPE-0) for the B-VOP coding proposed in the VM8.0. In this VM8.0, it is proposed to encode each macro-block by selecting one of four coding modes specified in the MBTYPE-0 to MBTYPE-4. As a selection criterion, it is recommended to use a predictive error electric power which is out of a standardization range. In FIG. 2, a symbol "X" indicates data (DQUANT, MVDf, MVDb or MVDB) used in each coding mode. The detail is described in 3.5.5 item of page 77.

As is described above, because the coding modes are limited to 4 in the VM8.0 proposal, there is a case that the macro-block cannot be effectively coded, so that there is a drawback that a picture quality is lowered.

Therefore, the above proposed B-VOP coding method is extremely shifted to deal with the low bit rate, the 4 types of coding modes are insufficient, so that a using flexibility of the B-VOP coding method is low. To prevent the drawback of the B-VOP coding method, it is proposed to prepare ten or more coding modes for each macro-block of the B-VOP. However, though the flexibility of the B-VOP coding, method in the coding is improved, the number of bits of code-words expressing each coding mode is undesirably increased, an adverse influence of the increase of the overhead information becomes large in the low bit rate coding, and a coding efficiency is lowered. In particular,, in the B-VOP coding which is not used for the prediction and in which it is sufficient to display a picture for a moment, it is sure that a ratio of Discrete Cosine Transformation (DCT) coefficients to the compressed picture data in the B-VOP coding becomes lowered as compared with that in an Intra-Video Object Plane (I-VOP) coding or a Predictive-Video Object Plane (P-VOP) coding, a ratio of the overhead information to the compressed picture data is heightened in the B-VOP coding to the contrary, so that a coding efficiency is undesirably lowered.

The present invention is provided to solve the above drawbacks, and an object of the present invention is to provide a picture coding method, a picture coding apparatus, a picture decoding method and a picture decoding apparatus in which an optimum coding mode is selected from a plurality of coding modes registered in advance to perform the coding and decoding of a picture signal, even though the condition of a bit rate is changed, while reducing the burden of overhead information included in the picture signal without lowering a coding efficiency or lowering a picture quality.

Also, in cases where the present invention is specialized to a picture coding apparatus and a picture decoding apparatus corresponding to the MPEG-4, another object of the present invention is to provide a picture coding method, a picture coding apparatus, a picture decoding method and a picture decoding apparatus, in which an optimum coding mode is selected from a plurality of coding modes registered in advance to perform the coding and decoding of a picture signal according to the B-VOP coding, even though the condition of a bit rate in the transmission of the picture signal is changed, while reducing the burden of overhead information included in the picture signal without lowering a coding efficiency or lowering a picture quality.

DISCLOSURE OF THE INVENTION

In a picture coding method, in which an input picture is coded while changing over a coding mode to another coding mode for each of prescribed blocks of the input picture, according to the present invention, a coding mode group is selected from a plurality of coding mode groups, which each are obtained by registering a coding mode selectable for each prescribed block, according to prescribed coding mode group selection information, a coded bit stream is produced by coding each of the prescribed blocks of the input picture according to the selected coding mode group, the prescribed coding mode group selection information is added to the coded bit stream, and the coded bit stream with the prescribed coding mode group selection information is output.

Therefore, even though the number of coding modes is increased, an amount of coding mode information is not increased, and there is an effect that a picture coding method, in which the coding can be effectively performed, can be obtained.

A picture coding apparatus, in which an input picture is coded while changing over a coding mode to another coding mode for each of prescribed blocks of the input picture, according to the present invention, comprises a plurality of coding mode groups, which each are obtained by registering a coding mode selectable for each prescribed block, coding mode group selecting means for selecting a coding mode group to be used in a coding processing according to prescribed coding mode group selection information, coding mode selecting means for selecting a coding mode from a plurality of coding modes registered in the selected coding mode group for each prescribed block, coding means for coding each block according to the selected coding mode and outputting a piece of coded data, and multiplexing means for multiplexing the coding mode group selection information, the coding modes and the pieces of coded data with each other and outputting those as a coded bit stream.

Therefore, even though the number of coding modes is increased, an amount of coding mode information is not increased, so that there is an effect that a picture coding apparatus, in which the coding can be effectively performed, can be obtained.

In a picture coding apparatus according to the present invention, a plurality of coding modes respectively selectable for each of macro-blocks, which each denote a unit of a picture-to-be-coded, is registered in each of the plurality of coding mode groups, and the coding mode group selecting means selects a coding mode group to be used for the coding from the plurality of coding mode groups according to the coding mode group selecting information for each of video object planes which each denote a picture indicating a condition of a video object at a time and each are composed of the macro-blocks.

Therefore, even though the number of coding modes is increased, an amount of coding mode information is not increased, so that there is an effect that a picture coding apparatus corresponding to the MPEG-4, in which the coding can be effectively performed, can be obtained.

In a picture coding apparatus according to the present invention, the coding means comprises a plurality of quantization means different from each other, and quantization selecting means for selecting one of the quantization means according to quantization method selection information, wherein a quantization is performed by using the selected quantization means in a coding, and the coding mode group selecting means uses the quantization method selection information as the coding mode group selection information.

Therefore, even though the number of coding modes is increased, an amount of coding mode information is not increased, so that the coding can be effectively performed on given conditions. Also, because the already-existing quantization method selection information is used as the coding mode group selection information, there is an effect that a picture coding apparatus, in which a more effective coding can be performed, can be obtained.

In a picture coding apparatus according to the present invention, the plurality of coding mode groups comprises a coding mode group corresponding to a low bit rate in which a plurality of coding modes corresponding to the low bit rate lower than a prescribed standard bit rate are registered, and a coding mode group corresponding to a high bit rate in which a plurality of coding modes corresponding to the high bit rate higher than the prescribed standard bit rate are registered.

Therefore, there is an effect that a picture coding apparatus, which can correspond to various bit rates widely ranging from the low bit rate to the high bit rate, can be obtained.

In a picture decoding method, in which a coded bit stream obtained by compressing and coding a picture is input and the picture is decoded for each of prescribed blocks of the picture, according to the present invention, coding mode group selection information is decoded from the coded bit stream, a coding mode group indicated according to the coding mode group selection information is selected from a plurality of coding mode groups in which a coding mode selectable in a coding of one block is registered for each block, and coded data is decoded from the coded bit stream for each block according to the selected coding mode group.

Therefore, even though an amount of the coding mode information existing in the coded bit stream is made small, the coded data can be accurately decoded, and there is an effect that a decoding method, in which the decoding can be effectively performed on given conditions, can be realized.

A picture decoding apparatus, in which a coded bit stream obtained by compressing and coding a picture is input and the picture is decoded for each of prescribed blocks of the picture, according to the present invention, comprises a plurality of coding mode groups in which a coding mode selectable in a coding of one block is registered for each block, coding mode group selection information decoding means for decoding coding mode group selection information from the coded bit stream, coding mode group selecting means for selecting a coding mode group indicated by the coding mode group selection information from the plurality of coding mode groups, coding mode decoding means for decoding a coding mode used in the coding of one block from the coded bit stream for each block by using the selected coding mode group, and decoding means for decoding coded data of each block from the coded bit stream according to the coding mode.

Therefore, even though an amount of the coding mode information existing in the coded bit stream is made small, the coded data can be accurately decoded, and there is an effect that a decoding apparatus, in which the decoding can be effectively performed on given conditions, can be realized.

In a picture decoding apparatus according to the present invention, a plurality of coding modes respectively selectable for each of macro-blocks, which each denote a unit of a picture-to-be-coded, is registered in each of the plurality of coding mode groups, and the coding mode group selecting means selects a coding mode group to be used for the decoding from the plurality of coding mode groups according to the coding mode group selecting information for each of video object planes which each denote a picture indicating a condition of a video object at a time and each are composed of the macro-blocks.

Therefore, even though an amount of the coding mode information existing in the coded bit stream is made small, the coded data can be accurately decoded, and there is an effect that a decoding apparatus corresponding to the MPEG-4, in which the decoding can be effectively performed on given conditions, can be realized.

In a picture decoding apparatus according to the present invention, the decoding means comprises a plurality of inverse quantization means different from each other, and inverse quantization selecting means for selecting one of the inverse quantization means according to quantization method selection information, wherein an inverse quantization is performed by using the selected inverse quantization means in a decoding, and the coding mode group selecting means uses the quantization method selection information as the coding mode group selection information.

Therefore, even though an amount of the coding mode information existing in the coded bit stream is made small, the coded data can be accurately decoded, and the decoding can be effectively performed on given conditions. Also, because the already-existing quantization method selection information is used as the coding mode group selection information, there is an effect that a picture decoding apparatus, in which a more effective decoding can be performed, can be obtained.

In a picture decoding apparatus according to the present invention, the plurality of coding mode groups comprises a coding mode group corresponding to a low bit rate in which a plurality of coding modes corresponding to the low bit rate lower than a prescribed standard bit rate are registered, and a coding mode group corresponding to a high bit rate in which a plurality of coding modes corresponding to the high bit rate higher than the prescribed standard bit rate are registered.

Therefore, there is an effect that a picture decoding apparatus, which can correspond to various bit rates widely ranging from the low bit rate to the high bit rate, can be obtained.

BRIEF DESCRIPTION OF THE DRAWINGS

FIG. 2 is a diagram showing an MBTYPE table (MBTYPE-0) for the B-VOP coding proposed in the VM8.0;

FIG. 7 is a block diagram showing the configuration of a picture coding apparatus according to a second embodiment of the present invention;

FIG. 8 is a block diagram showing the configuration of an MBTYPE judging unit according to the second embodiment of the present invention;

FIG. 9 is a diagram showing contents of an MBTYPE-1 table according to the second embodiment of the present invention;

FIG. 10 is a diagram showing contents of an MBTYPE-2 table according to the second embodiment of the present invention;

FIG. 12 is a diagram showing the structure of a coded bit stream according to the second embodiment of the present invention;

FIG. 13 is a diagram showing contents of an MBTYPE-3 table;

FIG. 14 is a diagram showing contents of an MBTYPE-4 table;

FIG. 15 is a diagram showing contents of an MBTYPE-5 table;

FIG. 16 is a diagram showing contents of an MBTYPE-6 table;

FIG. 18 is a diagram showing contents of an MBTYPE-7 table;

FIG. 19 is a block diagram showing the configuration of a picture coding apparatus according to a third embodiment of the present invention;

FIG. 20 is a block diagram showing the configuration of an MBTYPE judging unit according to the third embodiment of the present invention;

FIG. 21 is a flow chart showing the operation of a quantization processing according to the third embodiment of the present invention;

FIG. 22 is a block diagram showing the structure of a coded bit stream according to the third embodiment of the present invention;

BEST MODE FOR CARRYING OUT THE INVENTION

The best mode for carrying out the present invention will now be described with reference to the accompanying drawings to explain the present invention in more detail.

EMBODIMENT 1

In addition to a feature of a conventional coding apparatus in which an optimum coding mode is selected from a plurality of coding modes for each of a plurality of picture-to-be-coded blocks and is coded according to the optimum coding mode, a picture coding apparatus according to a first embodiment is characterized in that a coding mode group selectable for the plurality of picture-to-be-coded blocks according to prescribed conditions is changed according to a table for each of a plurality of pictures to be coded.

In this picture coding apparatus according to the present invention, a picture sequence of a digital moving picture or the like is composed of a plurality of pictures respectively displayed at a certain time, a coding operation is performed for each picture, each picture is divided into a plurality of picture blocks respectively smaller than the picture, and each picture block is coded. Each picture block denoting a minimum coding unit is called "picture-to-be-coded block" in this specification, and each picture at a time composed of a group of the picture-to-be-coded blocks is called "picture-to-be-coded" in this specification. As an example of the picture-to-be-coded block, a macro-block disclosed in ISO/IEC 13818-2 is known. As an example of the picture-to-be-coded, a picture frame in a television signal and a Video Object Plane (VOP) disclosed in ISO/IEC JTC1/SC29/WG11 N1796 are known.

Figure 3:
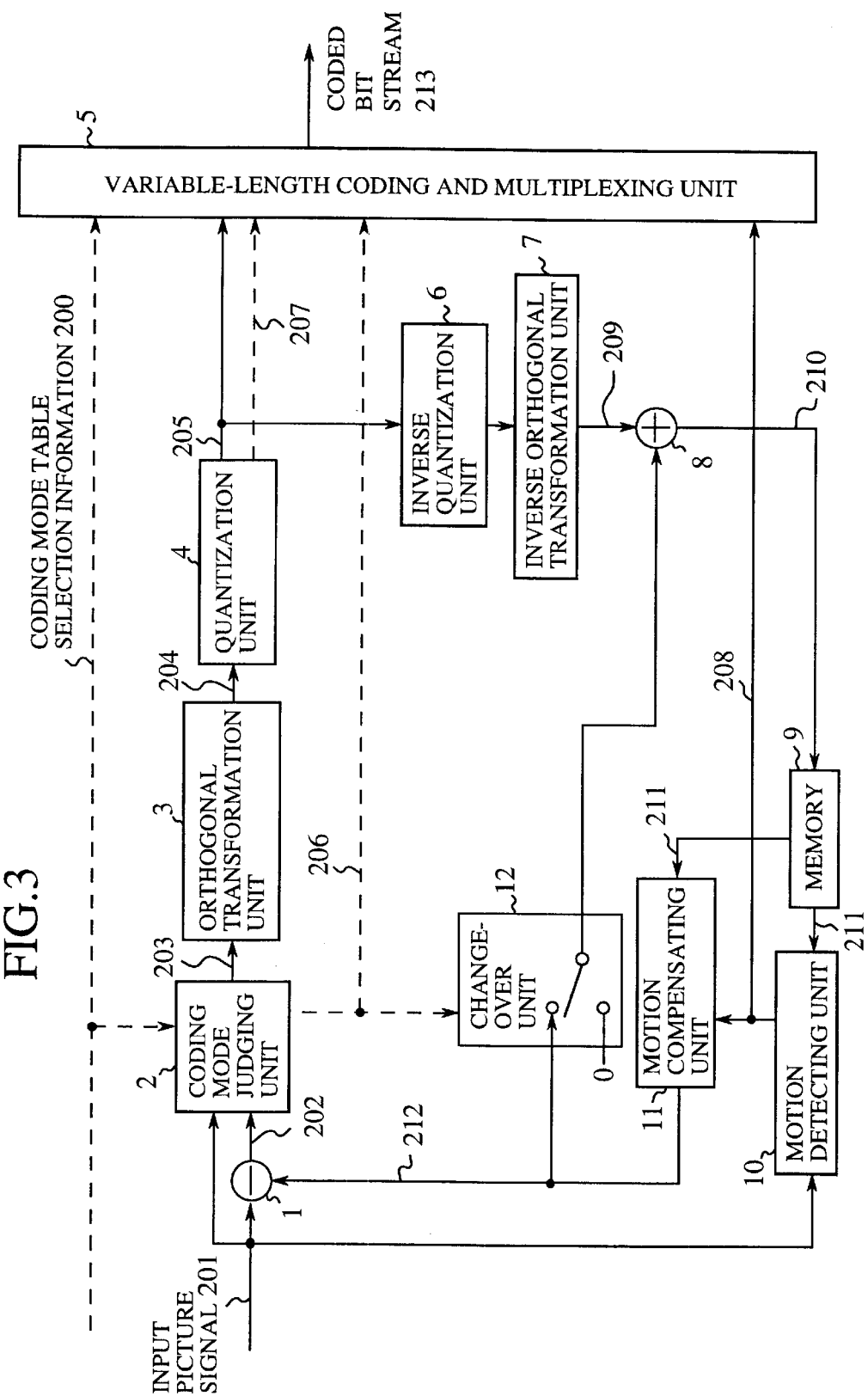
FIG. 3 is a block diagram showing the configuration of a picture coding apparatus according to a first embodiment of the present invention.

FIG. 3 is a block diagram showing the configuration of a picture coding apparatus according to a first embodiment of the present invention. In FIG. 3, 1 denotes a subtracting unit, 2 denotes a coding mode judging unit, 3 denotes an orthogonal transformation unit, 4 denotes a quantization unit, 5 denotes a variable-length coding and multiplexing unit, 6 denotes an inverse quantization unit, 7 denotes an inverse orthogonal transformation unit, 8 denotes an adding unit, 9 denotes a memory, 10 denotes a motion detecting unit, 11 denotes a motion compensating unit, and 12 denotes a change-over unit.

Figure 4:
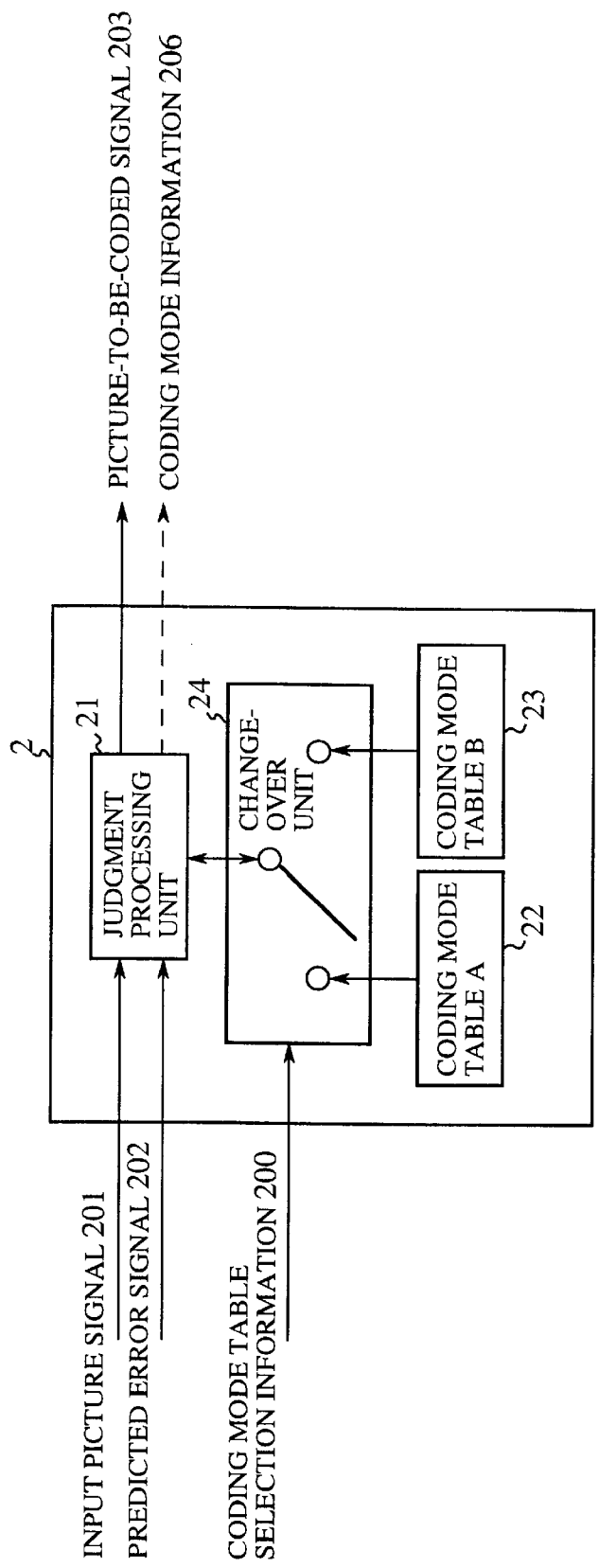
FIG. 4 is a block diagram showing the configuration of a coding mode judging unit according to the first embodiment of the present invention.

FIG. 4 is a block diagram showing the configuration of the coding mode judging unit 2 shown in FIG. 3. In FIG. 4, 21 denotes a judgement processing unit, 22 denotes a coding mode table A, 23 denotes a coding mode table B, and 24 denotes a change-over unit.

The coding mode judging unit 2 has two coding mode tables A22 and B23 which include identifiers or identification numbers, indicated by variable-coded code-words, of a plurality of coding modes selectable for a corresponding picture-to-be-coded.

In the first embodiment, the coding mode table A22 includes a coding mode group, for example shown in FIG. 2, composed of a plurality of coding modes used in cases where a coding operation is, for example, performed at a low bit rate lower than a prescribed standard bit rate, and the coding mode table B23 includes a coding mode group composed of a plurality of coding modes used in cases where a coding operation is performed at a high bit rate higher than the prescribed standard bit rate.

Figure 5:
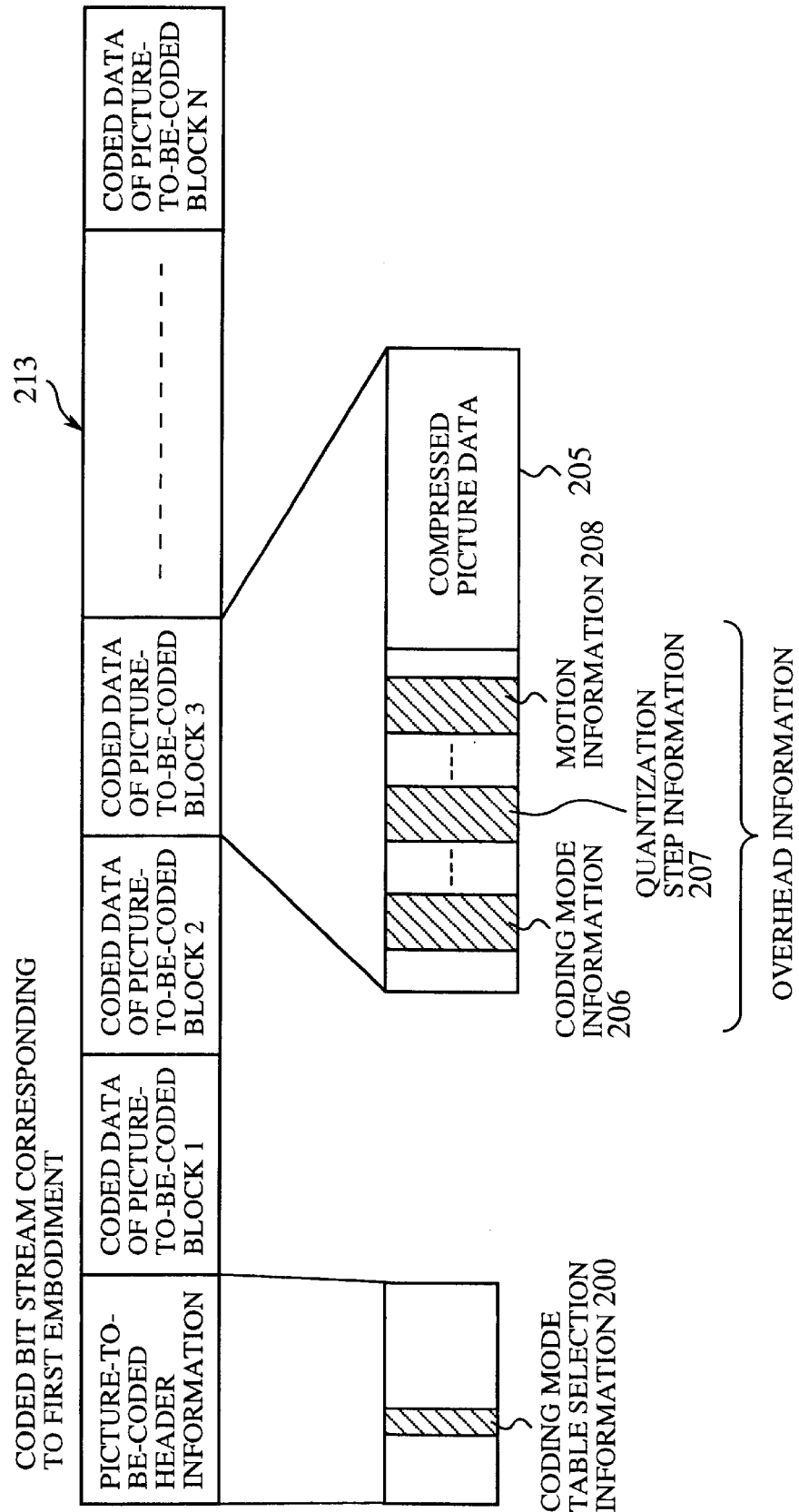
FIG. 5 is a block diagram showing the structure of a coded bit stream according to the first embodiment of the present invention.

FIG. 5 is a block diagram showing the structure of a coded bit stream denoting a coded signal coded and output by the picture coding apparatus according to the first embodiment of the present invention. This coded bit stream 213 is, for example, produced for each frame (or each image plane) of a corresponding time in the same manner as the conventional coded bit stream shown in FIG. 1. The coded bit stream 213 is composed of picture-to-be-coded header information and coded data of each of a plurality of blocks 1 to N obtained in cases where one frame is, for example, divided into N blocks.

Figure 1:
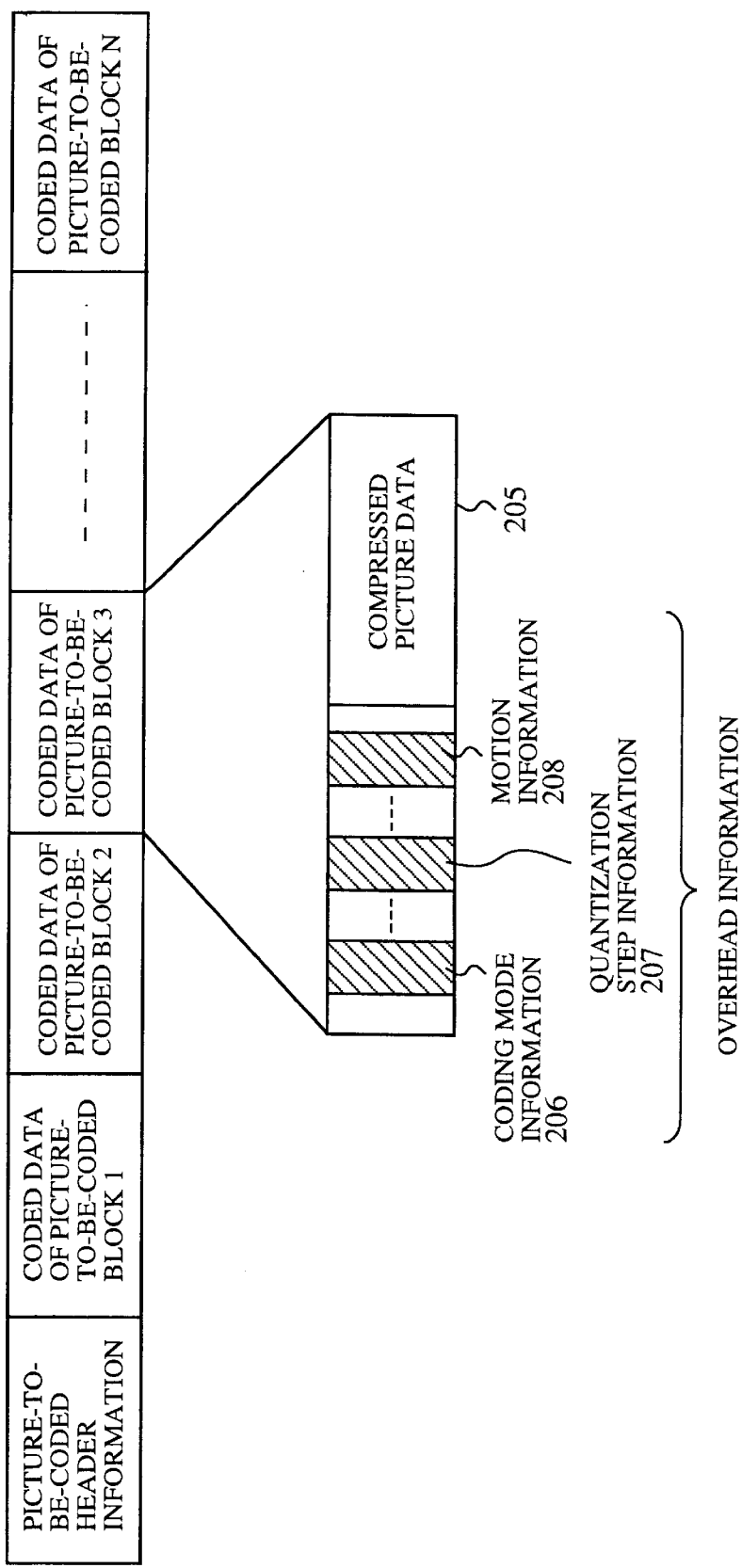
FIG. 1 is a diagram showing a structure of a coded bit stream generally transmitted and received between a picture coding apparatus and a picture decoding apparatus.

However, the coded bit stream 213 differs from the conventional coded bit stream shown in FIG. 1, one-bit information denoting coding mode table selection information 200 is newly added as coding mode group selection information to the picture-to-be-coded header information. In case of the two coding mode tables A22 and B23, the tables can be indicated by using the information of one bit. In cases where the number of coding mode tables are increased, it is required to increase the number of bits in the coding mode table selection information 200 according to the number of tables to select any of the tables. The coded data of each of the blocks 1 to N is composed of compressed picture data 205 and overhead data, for example, composed of coding mode information 206, quantization step information 207 and motion information 208 respectively corresponding to each quantization mode.

Next, an operation is described.

Figure 6:
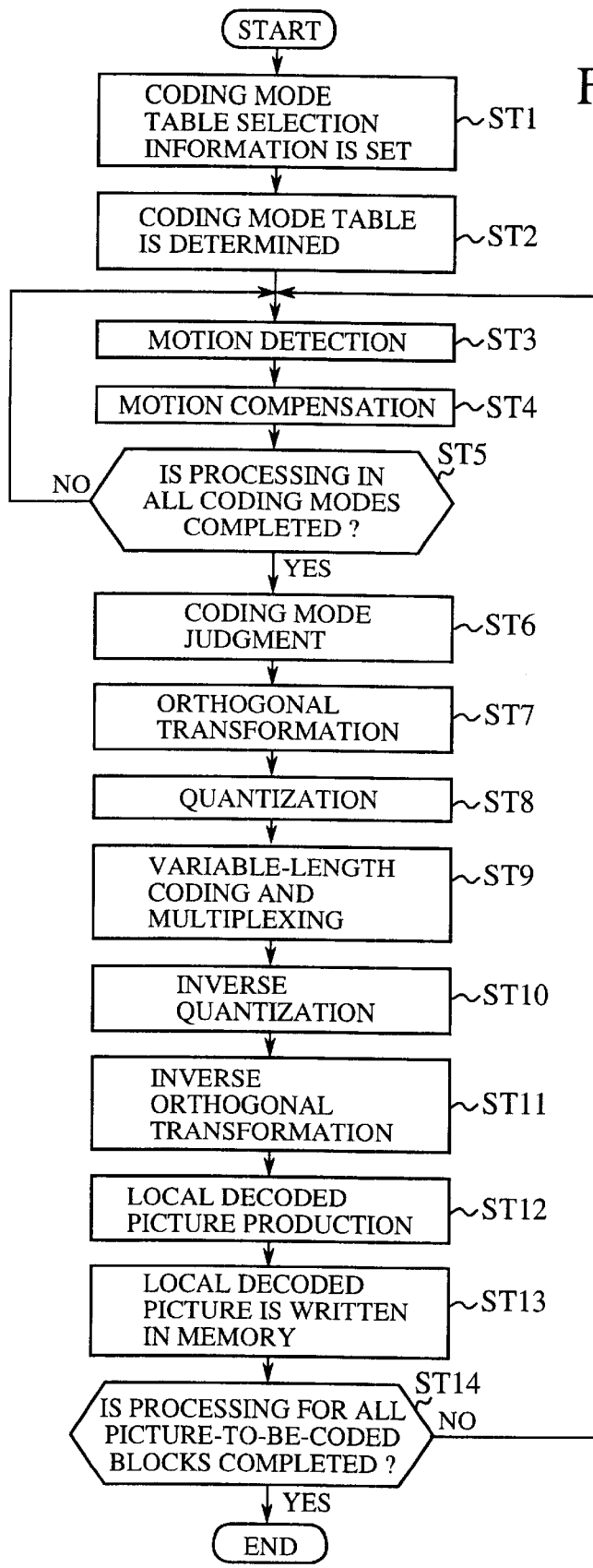
FIG. 6 is a flow chart showing an operation of the picture coding apparatus according to the first embodiment of the present invention.

FIG. 6 is a flow chart showing an operation of the picture coding apparatus according to the first embodiment of the present invention.

(1) The Selection and Determination of a Coding Mode Table

Initially, in a first step ST1, when an operation of this coding apparatus is started, a user sets the coding mode table selection information 200 for the selection of the coding mode table A22 or B23 to be used, according to conditions such as a bit rate used in this apparatus by using a switch or a program, and the coding mode table selection information 200 is output to the coding mode judging unit 2 and the variable-length coding and multiplexing unit 5. That is, in this coding apparatus, the user can set a target bit rate when an operation of this coding apparatus is started, the set bit rate can be identified as a low bit rate or a high bit rate by using a certain threshold value, and this identification is set as the coding mode table selection information 200.

Thereafter, in a step ST2, the change-over unit 24 of the coding mode judging unit 2 selects either the coding mode table A22 corresponding to the low bit rate in a low bit rate coding or the coding mode table B23 corresponding to the high bit rate in a high bit rate coding according to the coding mode table selection information 200, so that the coding mode table is determined.

(2) The Production of a Picture-to-be-coded Signal and the Selection of a Coding Mode Thereafter, the judgement processing unit 21 of the coding mode judging unit 2 produces a picture-to-be-coded signal 203 corresponding to all coding modes to be selectable, from an input picture signal 201 of an input picture-to-be-coded block in the processing of following steps ST3 to ST14, and a coding mode corresponding to the best coding efficiency is selected.

Here, the coding modes are described. A mode for setting the input picture signal as a picture-to-be-coded signal is one of the coding modes and is normally called an intra-mode. Also, there is an inter-mode for producing a predicted picture according to a motion compensation prediction, obtaining a predicted error signal and setting the predicted error signal as a picture-to-be-coded signal. In case of the inter-mode, a coding mode is set for each of predictive methods. For example, in a B picture disclosed in ISO/IEC 13818-2, a plurality of predictive methods such as a forward prediction for performing a motion compensation prediction by using a time-forward coded picture, a backward prediction for performing a motion compensation prediction by using a time-backward coded picture and a bidirectional prediction for adding a forward predicted picture obtained by the forward prediction and a backward predicted picture obtained by the backward prediction together and setting an average of the predicted pictures as a predicted picture can be adopted, and one coding mode is set for each predictive method. A picture-to-be-coded signal obtained by selecting a mode corresponding to the best coding efficiency from the plurality of coding modes described above is compressed and coded. Therefore, though it is not required to newly produce a picture-to-be-coded signal in case of the coding mode of the intra-mode because the input picture signal 201 itself is used as a picture-to-be-coded signal, a predicted error signal is produced in the motion detecting unit 10, the motion compensating unit 11 and the subtracting unit 1 shown in FIG. 3 for each of the selectable predictive methods corresponding to the inter-modes, in case of the coding modes of the inter-modes.

Initially, in. a step ST3, motion information 208 corresponding to one predictive method is obtained from a reference picture signal 211 of the memory 9 in the motion detecting unit 10.

Thereafter, in a step ST4, the reference picture data 211 is read out from the memory 9 according to the motion information 208 in the motion compensating unit 11, a calculation is performed for the reference picture data 211 if necessary, and a predicted picture 212 is produced.

Thereafter, this predicted picture 212 is subtracted from the input picture signal 201 in the subtracting unit 1, a predicted error signal 202 indicating a picture-to-be-coded signal 203 is obtained. The above-described processing is performed for all coding modes registered in the selected coding mode table.

Thereafter, in a step ST5, the production of a picture-to-be-coded signal is performed for each of all coding modes registered in the selected coding mode table, and it is checked whether or not the processing is completed.

Thereafter, in cases where the processing is completed, in a next step ST6, the judgement processing unit 21 estimates and judges the picture-to-be-coded signal 203 corresponding to each coding mode included in the selected coding mode table, selects a picture-to-be-coded signal 203 corresponding to the best coding efficiency, selects the coding mode corresponding to the signal 203 as a coding mode of the picture-to-be-coded block, and outputs the picture-to-be-coded signal 203 and an identifier of the signal 203 treated as coding mode information 206.

(3) Compressing and Coding Processing

In a next step ST7, in the orthogonal transformation unit 3, a transformation such as a discrete cosine transformation (DCT) is performed for the picture-to-be-coded signal 203 output from the coding mode judging unit 2 and is transformed to orthogonal transformation coefficients 204. Thereafter, in a next step ST8, in the quantization unit 4, the orthogonal transformation coefficients 204 are quantized according to a prescribed quantization step and are output as compressed picture data 205, and quantization step information 207 indicating the quantization step is output.

(4) Variable-length Coding and Multiplexing

Thereafter, in a next step ST9, the compressed picture data 205 output from the quantization unit 4, the coding mode table selection information 200 and the overhead information such as the coding mode information 206 output from the coding mode judging unit 2 and the motion information 208 output from the motion detecting unit 10 are transformed into a bit string in the variable-length coding and multiplexing unit 5, are multiplexed with each other according to a prescribed syntax and are output as a coded bit stream 213 having a structure in which the coding mode table selection information 200 of one bit is only set in the picture-to-be-coded header information, as shown in FIG. 5. Here, the quantization step information 207 is known in advance on a side of the variable-length coding and multiplexing unit 5, so that it is preferred that the quantization step information 207 be registered.

(5) Locally Decoding Processing

The compressed picture data is transmitted through the inverse quantization unit 6 and the inverse orthogonal transformation unit 7 in steps ST10 and ST11, so that the compressed picture data is locally-decoded to a state of the picture-to-be-coded, and a locally-decoded predicted error signal 209 is obtained.

Thereafter, in a next step ST12, the predicted picture 212 is transmitted to the adding unit 8 through the change-over unit 12 according to the coding mode information 206 if necessary, the locally-decoded predicted error signal 209 and the predicted picture 212 are added to each other in the adding unit 8, and a locally-decoded picture signal 210 is obtained. In a next step ST13, the locally-decoded picture signal 210 is stored in the memory 9 for the preparation of a following decoding.

In a final step ST14, it is checked whether or not a series of processing in the steps ST3 to ST13 is completed for all picture-to-be-coded blocks. In cases where the procedure is completed for all picture-to-be-coded blocks, a coding processing described above is completed.

As is described above, in the first embodiment, a plurality of coding mode tables are prepared by classifying a plurality of coding modes into a plurality of appropriate coding mode groups according to conditions such as a target bit rate, when an operation of this apparatus is started, the coding mode table selection information is set according to the conditions to select an appropriate coding mode table, an optimum coding mode is selected from the selected coding mode table, and the coding mode table selection information is not set in the coded data of each block but is set in the picture-to-be-coded header information. Therefore, even though the number of coding modes is increased by preparing the plurality of coding mode tables, an amount of the coding mode information of the overhead information existing in the coded data is not increased, so that an effect that a picture coding apparatus for effectively performing the coding can be realized can be obtained.

In more detail, because the picture coding apparatus affords a total information amount of the coded bit stream in case of the high bit rate, in cases where a number of coding modes sufficient in some degree are prepared to adaptively encode the picture-to-be-coded signal 203 corresponding to the best coding efficiency, even though a certain amount of the overhead information is increased by a certain amount of the coding mode information, there are many cases that a coding efficiency can be improved as a whole. In contrast, in case of the low bit rate, because it is required to suppress a total data amount of the coded bit stream, a ratio of an information amount of the overhead information including the coding mode information to an information amount of the compressed picture data is increased. Therefore, in cases where a number of coding modes are used, there is a case that the burden of the overhead information such as the coding mode information becomes large without sufficiently improving the coding efficiency of the compressed picture data, so that the coding efficiency is lowered. The reason is as follows. In a coding apparatus fixedly having only one coding mode table, in cases where the bit rate is changed, it is difficult to adaptively encode the picture-to-be-coded signal 203 corresponding to the best coding efficiency without lowering the coding efficiency.

In this first embodiment, an example of the change-over to the coding mode table corresponding to the communication conditions of the bit rate is indicated. However, the present invention is not limited to this example. That is, it is applicable that the coding mode be changed according to other conditions such as a time resolution (for example, frame rate) or a size of the picture-to-be-coded (for example, a size of the video object plane in the longitudinal and lateral directions). That is, in cases where the frame rate is lowered, because a distance between the picture-to-be-coded and a reference picture is increased, the coding efficiency can be improved by applying a plurality of different predictive methods respectively depending on the picture distance. Also, a size of the picture-to-be-coded indicates a space resolution of a sequence of a moving picture to be coded, and the space resolution directly influences the target bit rate. Therefore, it becomes effective to change the coding mode table, in the same manner as in this embodiment. The changing of the coding mode according to the time resolution of the picture or the size of the picture-to-be-coded is also effective in following embodiments.

Also, in the first embodiment, the coding mode table A is prepared for the coding mode group corresponding to the low bit rate, and the coding mode table B is prepared for the coding mode group corresponding to the high bit rate. However, in the present invention, it is applicable that the number of coding mode groups be higher than 2 according to the conditions of the bit rate or the like. Also, it is applicable that a plurality of coding mode groups be registered in one coding mode table. In this case, the change-over is performed in the change-over unit 24 of the coding mode judging unit 2 to select one coding mode group from the plurality of coding mode groups according to the coding mode table selection information. This modification is also applicable in following embodiments.

Also, in the first embodiment, the coding mode table selection information is arranged in the picture-to-be-coded header information for each picture-to-be-coded corresponding to one picture frame. However, the present invention is not limited to the arrangement for each picture-to-be-coded, it is applicable that the coding mode table selection information be arranged in the picture-to-be-coded header information for each prescribed picture-to-be-coded group composed of a plurality of pictures-to-be-coded to select one coding mode table according to the coding mode table selection information of the picture-to-be-coded header information previously detected until new picture-to-be-coded header information is detected. Also, it is applicable that the coding mode table selection information be arranged in header information corresponding to all pictures-to-be-coded, which is placed at a hierarchy level higher than that of the picture-to-be-coded header information, to select one coding mode table to be used for the all pictures-to-be-coded (for example, VOL header information of the MPEG-4 or the like). This modification is also applicable in following embodiments.

Also, in the first embodiment, the motion compensation is performed for each of all coding modes registered in the selected coding mode table, the predicted error signals are obtained, the picture-to-be-coded signals are produced, the picture-to-be-coded signals are estimated and judged, and one coding mode corresponding to the best efficiency is selected. However, in the present invention, it is applicable that no estimation or judgement be performed but one coding mode corresponding to the best efficiency be selected from a plurality of coding modes according to another method.

EMBODIMENT 2

A picture coding apparatus according to a second embodiment is obtained by improving the picture coding apparatus of FIG. 3 according to the first embodiment to that corresponding to the MPEG-4 standards.

FIG. 7 is a block diagram showing the configuration of a picture coding apparatus according to a second embodiment of the present invention. In FIG. 7, 31 denotes a macro-block coding type (MBTYPE) judging unit, 32 denotes a DCT unit, 33 denotes an inverse DCT unit, 34 denotes a shape coding unit, and the other units, to which the same reference numerals as those attached to the units of FIG. 3 according to the first embodiment are attached, are the same as those of FIG. 3.

The difference between this picture coding apparatus and that of FIG. 3 according to the first embodiment is described. In this second embodiment, the MBTYPE judging unit 31 used in place of the coding mode judging unit 2, the DCT unit 32 used in place of the orthogonal transformation unit 3 and the inverse DCT unit 33 used in place of the inverse orthogonal transformation unit 7 are arranged, the shape coding unit 34 peculiar to the MPEG-4 is newly arranged, compressed shape data 301 output from the shape coding unit 34 is variable-length-coded and multiplexed in the variable-length coding and multiplexing unit 5, and locally-decoded-shape data 303 output from the shape coding unit 34 are input to the MBTYPE judging unit 31, the DCT unit 32, the inverse DCT unit 33, the motion compensating unit 11 and the motion detecting unit 10. However, even though the picture coding apparatus corresponds to the MPEG-4, in cases where a rectangular picture frame of a television signal or the like is, for example, used as a picture-to-be-coded, because shape data indicates a constant rectangle, the shape coding unit 34 is not required.

FIG. 8 is a block diagram showing the configuration of the MBTYPE judging unit 31 of FIG. 7. In FIG. 8, 41 denotes a judgement processing unit, 42 denotes a macro-block coding type 1 (MBTYPE-1)table, 43 denotes a macro-block coding type 2 (MBTYPE-2) table, and 44 denotes a change-over unit for performing a change-over according to MBTYPE table selection information 302.

FIG. 9 is a diagram showing contents of the MBTYPE-1 table 42 shown in FIG. 8. In FIG. 9, differential value in quantization step (DQUANT), motion vector differential value for forward prediction (MVDf), motion vector differential value for backward prediction (MVDb), delta prediction for direct prediction (MVDB) and code-word indicating each coding mode, which are used in the coding based on the corresponding coding mode and denote data indicated by the symbol "X" are registered in the MBTYPE-1 table 42 for each of four types coding modes, ranging from the mode No.0 to the mode No.4 (values of MBTYPE), such as direct prediction, backward prediction+quantization change-over, forward prediction+quantization change-over and stuffing.

The MBTYPE-1 table 42 is a table in which the stuffing used for the adjustment of the bit rate is added in place of a bidirectional prediction+quantization change-over mode of the MBTYPE-0 table shown in FIG. 2. The stuffing denotes the coding in which stuffing bits denoting dummy bits are added to adjust the bit rate. In cases where a code-word corresponding to the stuffing such as stuffing bits or the like is decoded, the code-word of the stuffing is only read and thrown in the decoding, and no macro-block data corresponding to this code-word exists. Therefore, a plurality of bit rates respectively corresponding to each macro-block can be finely combined. Therefore, as shown in the MBTYPE-1 table 42, in case of the coding mode of the stuffing, no data (DQUANT, MVDf, MVDb or MVDB) to be used exists. Also, the code-word of each coding mode is determined according to an occurrence probability of each coding mode, so that the best code-word is not determined at this time.

FIG. 10 is a diagram showing contents of the MBTYPE-2 table 43 shown in FIG.8. In FIG.10, differential value in quantization step (DQUANT), motion vector differential value for forward prediction (MVDf), motion vector differential value for backward prediction (MVDb) and code-word indicating each coding mode, which are used in the coding based on the corresponding coding mode and denote data indicated by the symbol "X", are registered in the MBTYPE-2 table 43 for each of nine types coding modes, ranging from the mode No.0 to the mode No.8, such as intra-coding, intra-coding+quantization change-over, bidirectional prediction, bidirectional prediction+quantization change-over, backward prediction, backward prediction+quantization change-over, forward prediction, forward prediction+quantization change-over and stuffing.

Next, an operation is described.

Figure 11:
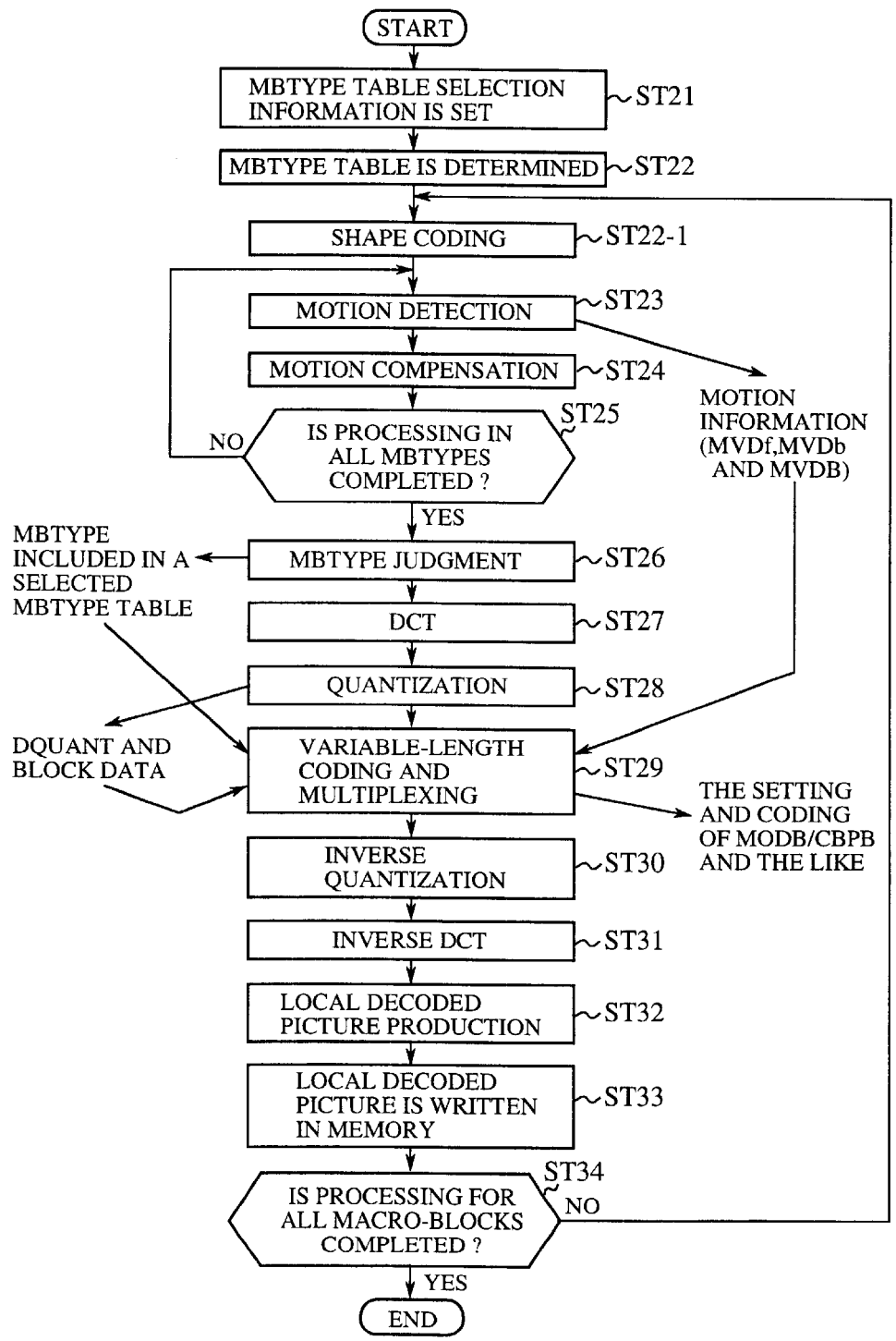
FIG. 11 is a flow chart showing an operation of the picture coding apparatus according to the second embodiment of the present invention.

FIG. 11 is a flow chart showing an operation of the picture coding apparatus according to the second embodiment of the present invention. An operation flow different from that of the first embodiment is described. The processing from a step ST21 to a step ST34 except for a step ST22-1 correspond to that from the step ST1 to the step ST14 of FIG. 6 in the first embodiment, though names of the processing differ from those in FIG. 6, the processing of the steps is substantially the same as that in the corresponding steps of FIG. 6.

In the second embodiment, a shape coding processing performed in the shape coding unit 34 for each macro-block is inserted as a step ST22-1 between the steps ST22 and ST23, and compressed shape data 301 and locally-decoded-shape data 303 are output in this processing.

FIG. 12 is a diagram showing the structure of a coded bit stream 316 coded and output in the picture coding apparatus according to the second embodiment. Here, a video object layer (VOL) is a constitutional element of a video object (VO), which denotes a moving picture object including a time axis, and is composed of a plurality of video object planes (VOP). Each VOP indicates a condition of the VO at a time.

The difference from the coded bit stream of the first embodiment shown in FIG. 5 is described. In this second embodiment, because the picture coding apparatus is specialized to that corresponding to the MPEG-4, the picture-to-be-coded header information is changed to VOP header information, and MBTYPE tape selection information (B VOP mode type) 302 is arranged as coding mode group selection information in the VOP header information or VOL header information of a video object layer which is placed at a hierarchy level higher than that of the VOP header information. Also, compressed shape data 301 is arranged as overhead information of coded data of each of a plurality of picture-to-be-coded blocks 1 to N.

In cases where the MBTYPE table selection information (B VOP mode type) 302 is arranged in the VOL header information, a total amount of the MBTYPE table selection information 302 is decreased and the coding efficiency is improved, in comparison with a case that the MBTYPE table selection information 302 is arranged in the VOP header information for each VOP. However, in this case, a coding mode table cannot be selected for each VOP.

Here, code-words corresponding to coding modes denoting all MBTYPEs are set in the coding mode information (MBTYPE) 308 of the overhead information for each MBTYPE table. In contrast, quantization step information 309 of the overhead information is set in only a case that the DQUANT is used. For example, in case of the MBTYPE-1 table of FIG. 9, the case denotes a case of the coding mode "backward prediction+quantization change-over" and a case of the coding mode "forward prediction+quantization change-over". Also, the motion information of the overhead information is set in only a case that MVDf, MVDb or MVDB is used.

As is described above, in the second embodiment specialized to the picture coding apparatus corresponding to the MPEG-4, the shape coding unit 34 is substantially added as compared with the first embodiment, the compressed shape data 301 is variable-length coded and multiplexed, the locally-decoded-shape data is used in the DCT, the inverse DCT, the motion detection and the motion compensation, and the selection of the MBTYPE table denoting the coding mode table is performed in the same manner as in the first embodiment. Therefore, in the same manner as in the first embodiment, even though the number of coding modes is increased by arranging a plurality of coding mode tables, an amount of the coding mode information 308 of the overhead information of the coded data is not increased, an effect that the picture coding apparatus, in which the coding can be performed at a better efficiency, can be realized can be obtained.

Also, in this second embodiment, because the coding mode of the stuffing is registered in each of the two MBTYPE tables 42 and 43, an effect that a plurality of bit rates respectively corresponding to one macro-block can be finely combined can be obtained, in comparison with a case that no coding mode of the stuffing is registered.

Also, in the MBTYPE-2 table 43 of FIG. 10, the stuffing is prepared, the direct prediction of the MBTYPE-0 table of FIG. 2 proposed in the prior art is changed to the intra-coding, two pairs of coding modes composed of the intra-mode, the bidirectional prediction, the backward prediction and the forward prediction are prepared and the coding mode of the quantization step change-over ON/OFF is added to one pair of coding modes. Therefore, as compared with the MBTYPE-0 table, the quantization step can be changed in any case using one of the coding modes, it is not required to multiplex the quantization step information (DQUANT) 309 with the bit stream in cases where a value of the quantization step corresponding to a current macro-block is the same as that corresponding to another macro-block just before the current macro-block, so that the coding can be performed at a better efficiency.

In this second embodiment, as an example of the MBTYPE table denoting the coding mode table, the MBTYPE-1 table shown in FIG. 9 and the MBTYPE-2 table shown in FIG. 10 are described. However, the present invention is not limited to these tables. For example, it is applicable that tables obtained by removing the coding mode of the stuffing from each of the MBTYPE-1 table and the MBTYPE-2 table be used. Also, it is applicable that a table obtained by removing the coding mode of the stuffing from the MBTYPE-2 table and replacing the intra-coding and the intra-coding+quantization change-over of the MBTYPE-2 table with the direct prediction and the direct prediction+quantization change-over to add the quantization step change-over ON/OFF mode to one of two pairs of coding modes composed of the direct prediction, the bidirectional prediction, the backward prediction and the forward prediction be used.

Also, it is applicable that the MBTYPE-3 table having contents shown in FIG. 13 and the MBTYPE-4 table having contents shown in FIG. 14 be, for example, selected and used as coding mode tables. In this case, in the same manner as in the first and second embodiments, because a plurality of coding mode tables are used, even though the number of coding modes is increased, an amount of the coding mode information of the overhead information of the coded data is not increased, and the coding can be performed at a better efficiency on given conditions. Also, the same prediction effect is expected in the direct prediction and the bidirectional prediction, an amount of the motion vector codes in the direct prediction becomes low on prescribed conditions of the coded bit rate, and an effect obtained by selecting the bidirectional prediction to improve the prediction efficiency in a wider searching range as compared with the selection of the direct prediction can be expected. Therefore, in cases where the adaptive change-over between the direct prediction and the bidirectional prediction is performed according to the VOL header information or the MBTYPE table selection information (B VOP mode type) of the VOP header information, even though the quantization change-over is added to all coding modes, the increase of the bits of the code-words indicating the MBTYPE can be suppressed.

Also, it is applicable that the MBTYPE-2 table shown in FIG. 10 and an MBTYPE-5 table shown in FIG. 15 be, for example, selected and used. In this case, in the same manner as in the above-described cases, because a plurality of coding mode tables are selected, even though the number of coding modes is increased, an amount of the coding mode information of the overhead information of the coded data is not increased, and the coding can be performed at a better efficiency on given conditions. Also, in particular, the MBTYPE-5 table is a table obtained by adding the stuffing used for the adjustment of the bit rate to the MBTYPE-3 table shown in FIG. 13. In cases where the code-word corresponding to the stuffing is decoded, no following macro-block data exists. Therefore, a plurality of bit rates respectively corresponding to each macro-block can be finely combined. The code-word of the stuffing is only read and thrown at a decoding time.

Also, it is applicable that the MBTYPE-2 table shown in FIG. 10 and an MBTYPE-6 table shown in FIG. 16 be, for example, selected and used. In this case, in the same manner, even though the number of coding modes is increased, an amount of the coding mode information of the overhead information of the coded data is not increased, so that the coding can be performed at a better efficiency on given conditions. Also, in particular, because the MBTYPE-6 table is obtained by replacing the direct prediction mode of the MBTYPE-1 shown in FIG. 9 with a revised direct prediction mode in which no delta vector for direct prediction (MVDB) is used, a decoding step of the delta vector for direct prediction (MVDB) is not required in the processing of the macro-block decoding by using the revised direct prediction mode, and an amount of the overhead information is decreased. Therefore, the coding efficiency is improved.

Figure 17:
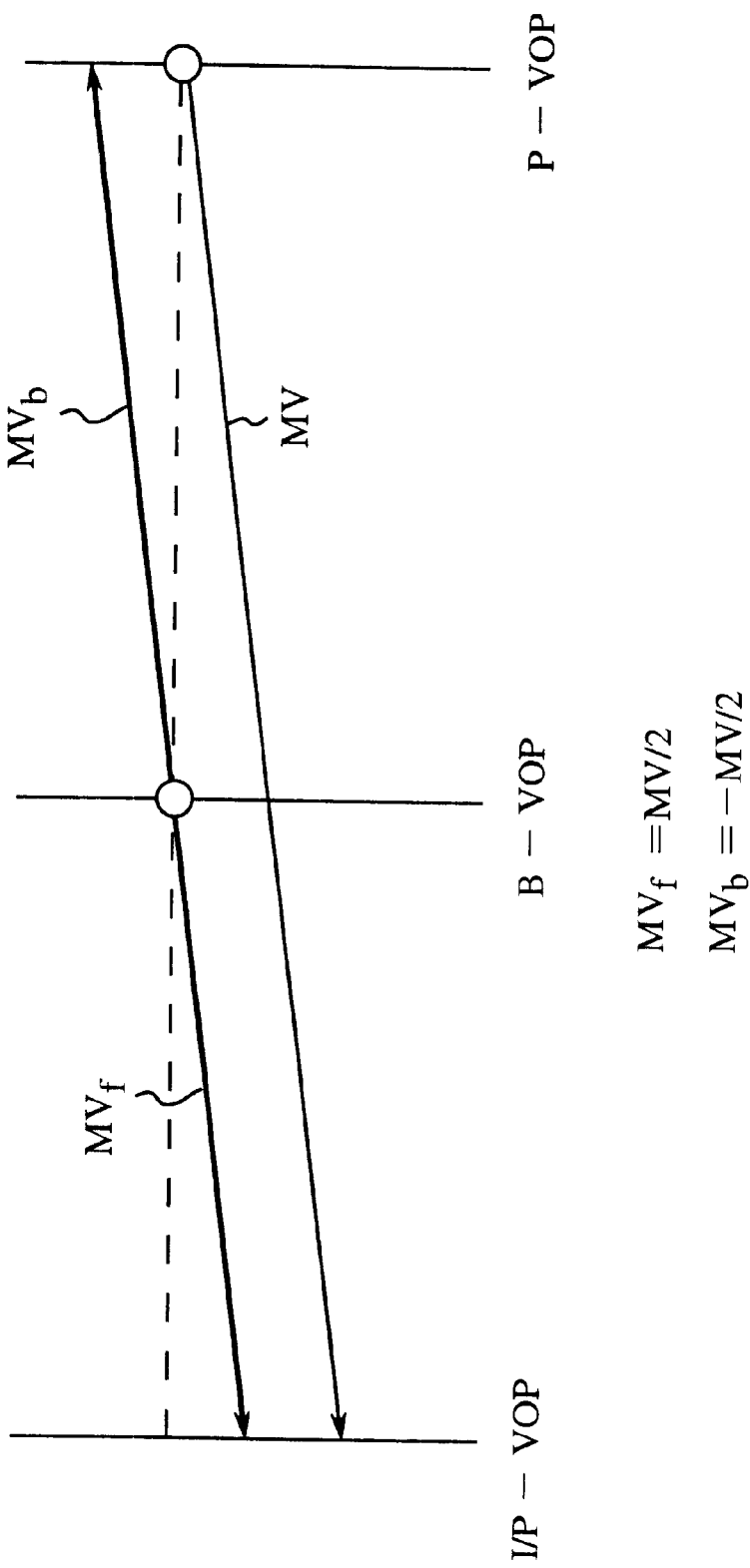
FIG. 17 is an explanatory diagram of a revised direct prediction.

As shown in FIG. 17, in the revised direct prediction differing from the direct prediction, the delta vector for direct prediction (MVDB) is always set to 0, so that the delta vector for direct prediction (MVDB) is not used. Therefore, the revised direct prediction is a prediction method in which the motion vector for forward prediction (MVf) and the motion vector for backward prediction (MVb) are calculated by only using the motion vector (MV).

Also, it is applicable that the MBTYPE-2 table shown in FIG. 10 and an MBTYPE-7 table shown in FIG. 18 be, for example, selected and used. In this case, in the same manner, even though the number of coding modes is increased, an amount of the coding mode information 308 of the overhead information of the coded data is not increased, so that the coding can be performed at a better efficiency on given conditions. Also, in particular, because the MBTYPE-7 table is obtained by replacing the direct prediction mode of the MBTYPE-5 shown in FIG. 15 with the revised direct prediction mode in which no delta vector for direct prediction (MVDB) is used, a decoding step of the delta vector for direct prediction (MVDB) is not required in the processing of the macro-block decoding by using the revised direct prediction mode, and an amount of the overhead information is decreased. Therefore, the coding efficiency is improved.

EMBODIMENT 3

FIG. 19 is a block diagram showing the configuration of a picture coding apparatus according to a third embodiment. In FIG. 19, 51 denotes an MBTYPE judging unit operated according to quantization method selection information 402, 52 denotes a change-over unit for performing a change-over according to the quantization method selection information 402, 53 denotes an H.263 type quantization unit, 54 denotes an MPEG-2 type quantization unit, 55 denotes an H.263 type inverse quantization unit, 56 denotes an MPEG-2 type inverse quantization unit, and the other units, to which the same reference numerals as those attached to the units of FIG. 7 according to the second embodiment are attached, are the same as those of FIG. 7.

The picture coding apparatus according to the third embodiment is obtained by describing in more detail the configuration of the quantization unit of the picture coding apparatus corresponding to the MPEG-4 according to the second embodiment and is characterized in that the H.263 type quantization unit 53 and the H.263 type inverse quantization unit 55 corresponding to an H.263 standards for the low bit rate, the MPEG-2 type quantization unit 54 and the MPEG-2 type inverse quantization unit 56 corresponding to an MPEG-2 for the high bit rate and the change-over unit 52 for changing over between a group of the units 53 and 55 of the H.263 type and a group of the units 54 and 56 of the MPEG-2 type according to the quantization method selection information (or video object layer quant type) 402 already existing are arranged.

FIG. 20 is a block diagram showing the configuration of the MBTYPE judging unit 51 shown in FIG. 19 according to the third embodiment.

The MBTYPE judging unit 51 of the picture coding apparatus according to the third embodiment is fundamentally the same as the MBTYPE judging unit 31 shown in FIG. 8 according to the second embodiment. As shown in FIG. 20, a different point is that the change-over unit 61 is operated to change over between the MBTYPE-1 table 42 and the MBTYPE-2 table 43 according to the quantization method selection information 402 already existing in place of the MBTYPE table selection information 302. Because the other configuration is the same as that of the picture coding apparatus of the second embodiment, the same reference numerals as those of the second embodiment are attached to the other units of the other configuration, and the description of the other units is omitted.

Next, an operation is described.

An operation of the third embodiment is fundamentally the same as that of the second embodiment shown in FIG. 11. However, because the change-over of the quantization method between the H.263 type quantization unit 53 and the MPEG-2 type quantization unit 54 is performed in the third embodiment, a following processing different from that of the second embodiment is performed.

FIG. 21 is a flow chart showing the operation of a quantization processing of the step ST28 of FIG. 11.

In a step ST41 of FIG. 21, it is judged according to the already-existing quantization method selection information 402 in the change-over unit 52 of FIG. 19 whether or not the quantization method is the H.263 type.

In cases where the quantization method selection information 402 indicates the H.263 type, the quantization is performed according to the MBTYPE-5 table corresponding to the low bit rate in the H.263 type quantization unit 53 in a step ST42. In contrast, in cases where the quantization method selection information 402 indicates the MPEG-2 type, the quantization is performed according to the MBTYPE-2 table corresponding to the high bit rate in the MPEG-2 type quantization unit 54 in a step ST43.

Also, in this third embodiment, in cases where it is judged in the change-over unit 52 in the step ST41 of FIG. 21 that the quantization method selection information 402 indicates the H.263 type, the inverse quantization is performed in the H.263 type inverse quantization unit 55 according to the MBTYPE-1 table corresponding to the low bit rate in the inverse quantization processing of the step ST30 of FIG. 11. In contrast, in cases where it is judged that the quantization method selection information 402 indicates the MPEG-2 type, the inverse quantization is performed in the MPEG-2 type inverse quantization unit 56 according to the MBTYPE-2 table corresponding to the high bit rate.

FIG. 22 is a block diagram showing the structure of a coded bit stream coded and output by the picture coding apparatus according to the third embodiment. The difference from the coded bit stream of the second embodiment shown in FIG. 12 is described. In this third embodiment, the already-existing quantization method selection information (or video object layer quant type) 402 stored in the VOL header information is used as the MBTYPE table selection information (or B VOP mode type) 302 denoting the coding mode group selection information, and no MBTYPE table selection information (or B VOP mode type) 302 is newly arranged in the VOL header information or the VOP header information.

Therefore, an amount of the VOL header information or the VOP header information in the coded bit stream 416 is not increased because no MBTYPE table selection information (or B VOP mode type) 302 is newly arranged, it is required to add no overhead information to a current syntax of the coded bit stream 416, and it is possible to improve the coding efficiency.

As is described above, because the apparatus in this third embodiment is the same as that in the second embodiment except that the change-over of the quantization method is performed, even though the coding mode is increased, an amount of the coding mode information arranged in the overhead information of the coded data is not increased in the same manner as in the second embodiment, so that the coding can be performed at a better efficiency on given conditions. Also, because the already-existing quantization method selection information 402 stored in the VOL header information is used as the MBTYPE table selection information 302, it is required to add no overhead information to a current syntax of the coded bit stream 416, so that an effect that the picture coding apparatus, in which the coding efficiency is improved, can be realized can be obtained.

Also, because the picture coding apparatus corresponds to the H.263 standards using the low bit rate and the MPEG-2 using the high bit rate, an effect that the picture coding apparatus possible to correspond to bit rates widely ranging from the low bit rate to the high bit rate can be realized can be obtained.

In this third embodiment, the MBTYPE-1 table and the MBTYPE-2 table are described as an example. However, as is described in the second embodiment, it is applicable that the MBTYPE-0 table, the MBTYPE-3 table, the MBTYPE-5 table, the MBTYPE-6 table or the MBTYPE-7 table be, for example, used as the MBTYPE table corresponding to the low bit rate and the MBTYPE-4 table be, for example, used as the MBTYPE table corresponding to the high bit rate.

EMBODIMENT 4

In a picture decoding apparatus according to this fourth embodiment, the decoding is performed for each picture of a certain time composing a sequence of pictures such as a digital moving picture, each picture is divided into a plurality of picture blocks smaller than the picture, the decoding for the picture is performed for each picture block, each picture block denoting a minimum decoding unit is called "picture-to-be-decoded block" corresponding to the picture-to-be-coded block of the picture coding apparatus side, and each picture of a certain time composed of a group of the picture-to-be-decoded blocks is called "picture-to-be-decoded" corresponding to the picture-to-be-coded of the picture coding apparatus side. As an example of the picture-to-be-decoded block, a macro-block disclosed in the ISO/IEC 13818-2 is known. As an example of the picture-to-be-decoded, a picture frame in a television signal or a video object plane disclosed in the ISO/IEC JTC1/SC29/WG11 N1796 is, for example, known.

A picture decoding apparatus of this fourth embodiment, in which the decoding is performed according to one coding mode determined for each picture-to-be-decoded block in the same manner as in a conventional decoding apparatus, is characterized in that a mechanism for specifying a table of a coding mode group to be used according to coding mode table selection information 200 added for each picture-to-be-decoded, specifying one coding mode of each picture-to-be-decoded block selected from the specified table of the coding mode group and performing the decoding is provided.

Figure 23:
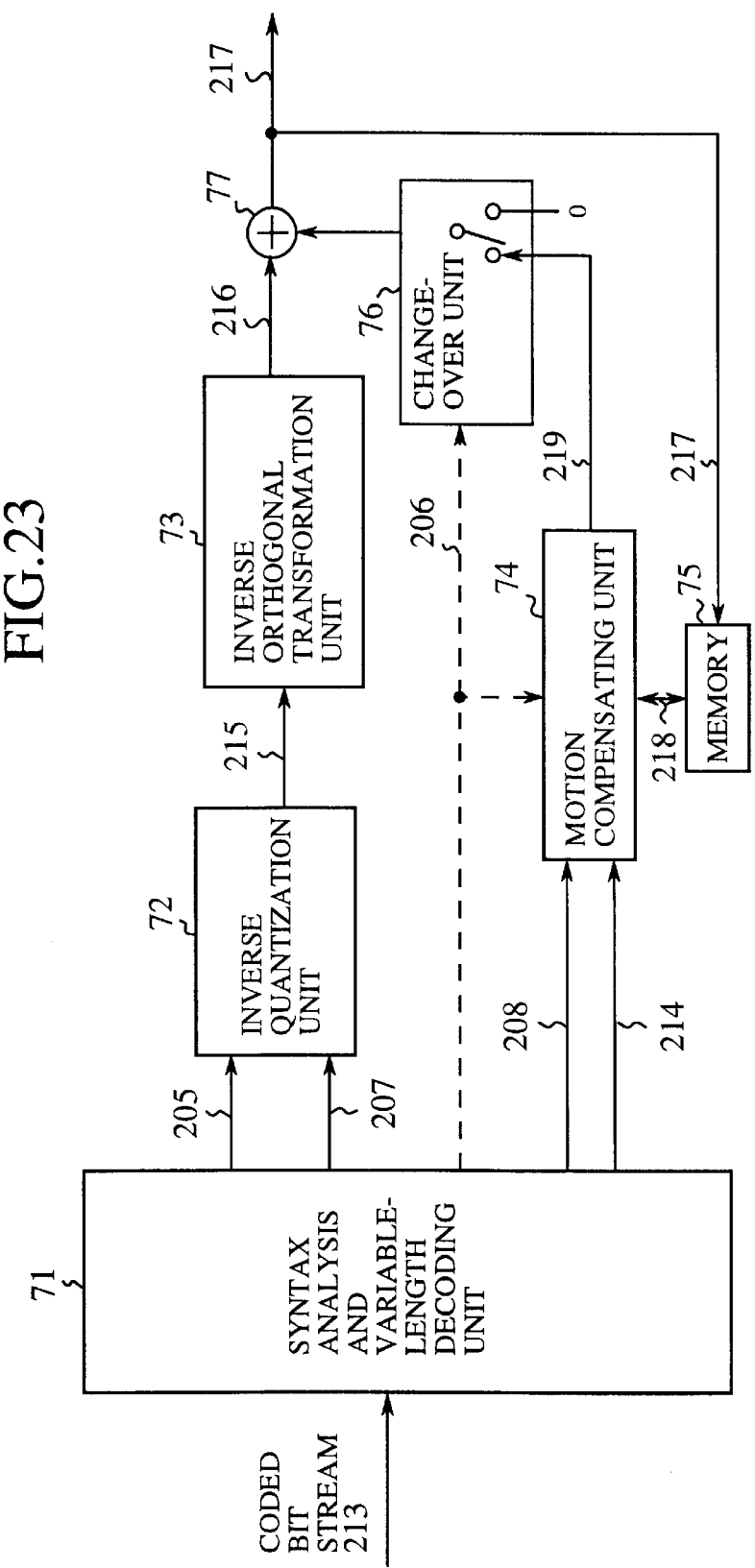
FIG. 23 is a block diagram showing the configuration of a picture decoding apparatus according to a fourth embodiment of the present invention.

FIG. 23 is a block diagram showing the configuration of a picture decoding apparatus, in which a compressed and coded digital picture is expanded and decoded, according to the fourth embodiment. In FIG. 23, 71 denotes a syntax analysis and variable-length decoding unit, 72 denotes an inverse quantization unit, 73 denotes an inverse orthogonal transformation unit, 74 denotes a motion compensating unit, 75 denotes a memory, 76 denotes a change-over unit, and 77 denotes an adding unit.

Figure 24:
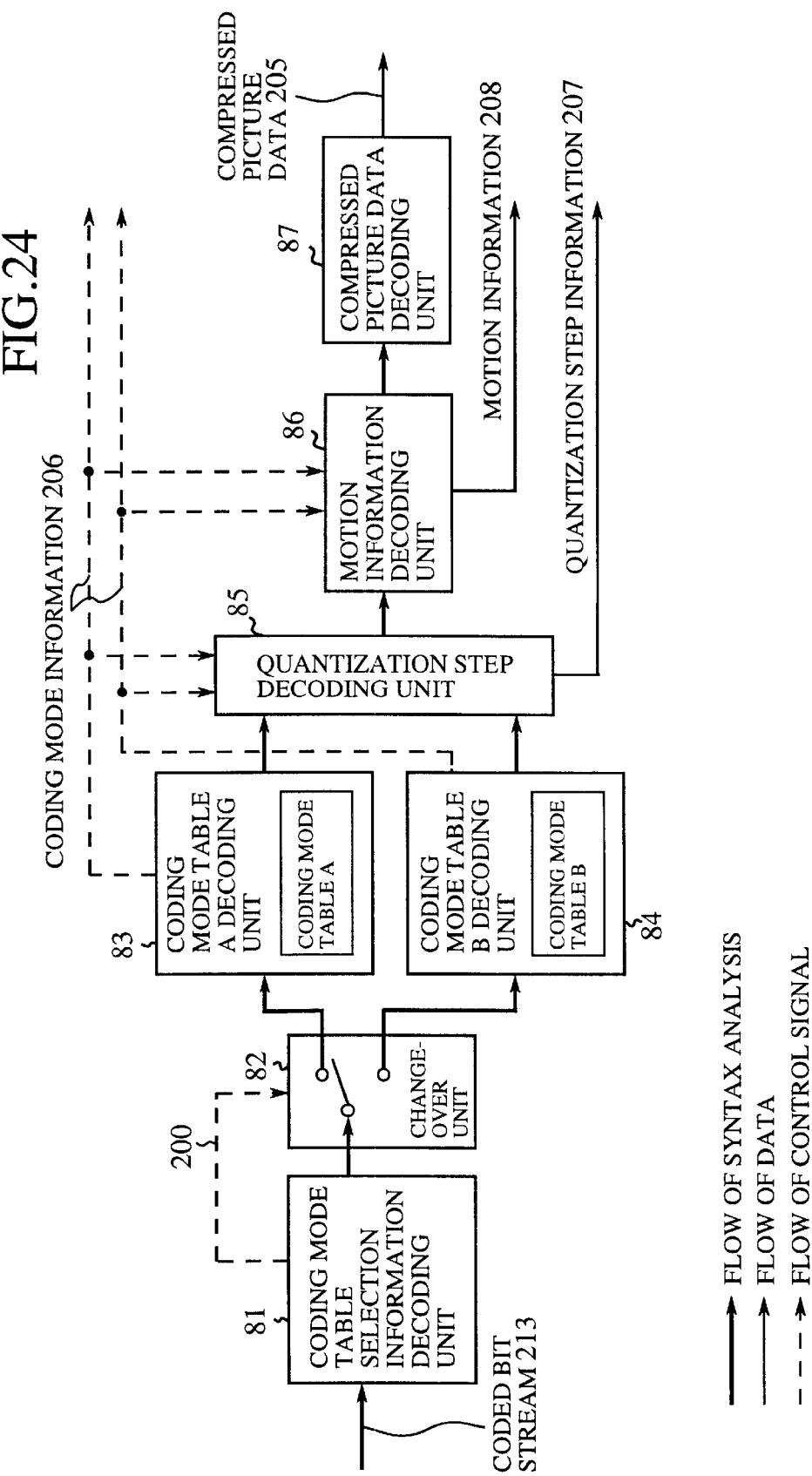
FIG. 24 is a block diagram showing the configuration of a syntax analysis and variable-length decoding unit according to the fourth embodiment of the present invention.

FIG. 24 is a block diagram showing the configuration of the syntax analysis and variable-length decoding unit 71 shown in FIG. 23. In FIG. 24, 81 denotes a coding mode table selection information decoding unit, 82 denotes a change-over unit, 83 denotes a coding mode table A decoding unit, 84 denotes a coding mode table B decoding unit, 85 denotes a quantization step decoding unit, 86 denotes a motion information decoding unit, and 87 denotes a compressed and picture data decoding unit.

Figure 25:
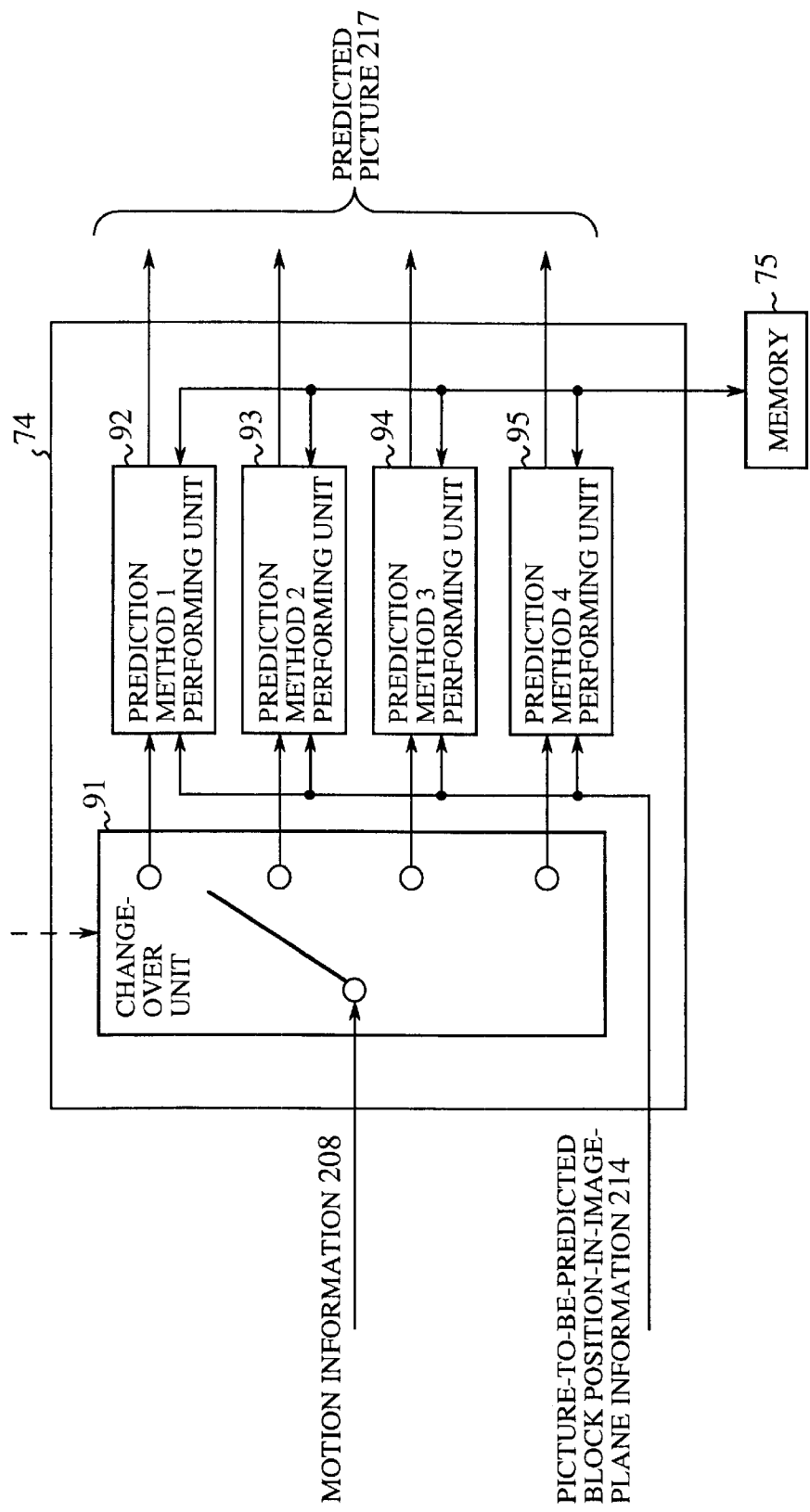
FIG. 25 is a block diagram showing the configuration of a motion compensating unit according to the fourth embodiment of the present invention.

FIG. 25 is a block diagram showing the configuration of the motion compensating unit 74 shown in FIG. 23. In FIG. 25, 91 denotes a change-over unit, 92 denotes a prediction method 1 performing unit, 93 denotes a prediction method 2 performing unit, 94 denotes a prediction method 3 performing unit, and 95 denotes a prediction method 4 performing unit.

Next, an operation is described.

Figure 26:
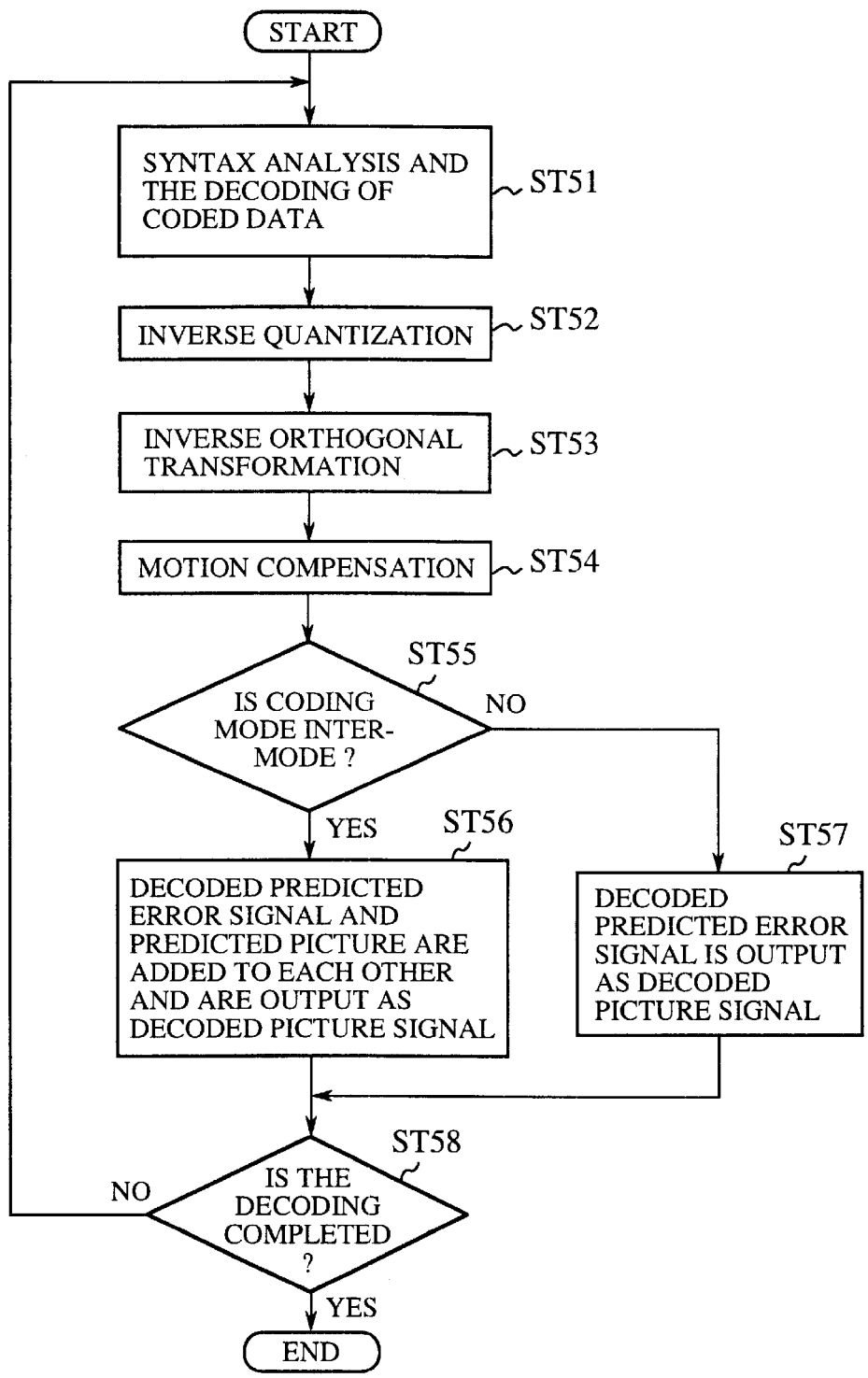
FIG. 26 is a flow chart showing an operation of the picture decoding apparatus according to the fourth embodiment of the present invention.

FIG. 26 is a flow chart showing an operation of a decoding processing in the picture decoding apparatus according to the fourth embodiment.

Initially, in a step ST51, in the syntax analysis and variable-length decoding unit 71 shown in FIG. 23, the coded bit stream 213 having the structure shown in FIG. 5 is, for example, analyzed, and the coded bit stream 213 is divided into pieces of coded data respectively having the compressed picture data 205, the quantization step information 207 and the motion information 208 and is output. In this case, picture-to-be-predicted block position-in-image-plane information 214 is output while counting up the information 214 for each picture-to-be-coded block such as a macro-block. In this syntax analysis processing, a start code denoting a division point is normally detected for each set of frames or each frame, and the decoding for a corresponding hierarchy is performed according to the start codes. In this syntax analysis processing, the processing equivalent to a processing level for analyzing data of the picture-to-be-decoded blocks such as macro-blocks is only performed. Also, the coding mode information 206 is decoded as data placed at a level which is equivalent to that of a picture-to-be-decoded and is higher than that of a picture-to-be-decoded block.

Thereafter, in a step ST52, an inverse quantization is performed for the compressed picture data 205 according to the quantization step information 207 in the inverse quantization unit 72, and orthogonal transformation coefficients 215 are output. Thereafter, in a step ST53, the orthogonal transformation coefficients 215 are inversely transformed in the inverse orthogonal transformation unit 73, and a decoding predicted error signal 216 is output. In this case, the same discrete cosine transformation (DCT) as that performed in the picture coding apparatus is used in the picture decoding apparatus as the orthogonal transformation.

In a next step ST54, in case of the decoding of the picture-to-be-decoded blocks, in the motion compensating unit 74, the motion information 208 and the picture-to-be-predicted block position-in-image-plane information 214 decoded from the coded bit stream 213 in the syntax analysis and variable-length decoding unit 71 are input, a motion compensation is performed, a predicted picture 219 is extracted from a reference picture 218 stored in the memory 75, and the predicted picture 219 is transmitted to the change-over unit 76.

In this embodiment, the sequence of the inverse quantization processing of the step ST52, the inverse orthogonal transformation of the step ST53 and the motion compensation processing of the step ST54 is performed in that order. However, the present invention is not limited to that order. For example, it is applicable that the sequence be performed in a reverse order or the processing steps be simultaneously performed.

Thereafter, in a step ST55, it is judged in the change-over unit 76 according to the coding mode information 206 decoded from the coded bit stream 213 in the syntax analysis and variable-length decoding unit 71 whether or not one picture-to-be-decoded block is coded at the inter-mode. In case of the picture-to-be-decoded block coded at the inter-mode, in a step ST56, the predicted picture is output from the change-over unit 76 to the adding unit 77, the predicted picture is added in the adding unit 77 to the decoding predicted error signal 216 output from the inverse orthogonal transformation unit 73 to output a decoded picture signal 217. In contrast, in case of the picture-to-be-decoded block coded at the intra-mode, in a step ST57, a value "0" is output from the change-over unit 76 to the adding unit 77, and the decoding predicted error signal 216 output from the inverse orthogonal transformation unit 73 is output, as it is, from the adding unit 77 as a decoded picture signal 217.

Thereafter, in a final step ST58, it is judged in the syntax analysis and variable-length decoding unit 71 whether or not the decoding processing performed for each picture-to-be-decoded is completed, for example, according to the detection of the picture-to-be-coded picture header information shown in FIG. 5. In cases where the coded data of one picture-to-be-coded block is detected, because the coded data to be decoded remains, the procedure returns to the step ST51, and the above-described processing is repeated. In contrast, in cases where no coded data of one picture-to-be-coded block is detected, because no coded data to be decoded remains, the decoding processing is completed. This decoded picture signal 217 is transmitted to a display control unit (not shown) or the like, is output to a display device (not shown) or the like and is written to the memory 75 to be used as a reference signal 218 in the following decoding processing.

Figure 27:
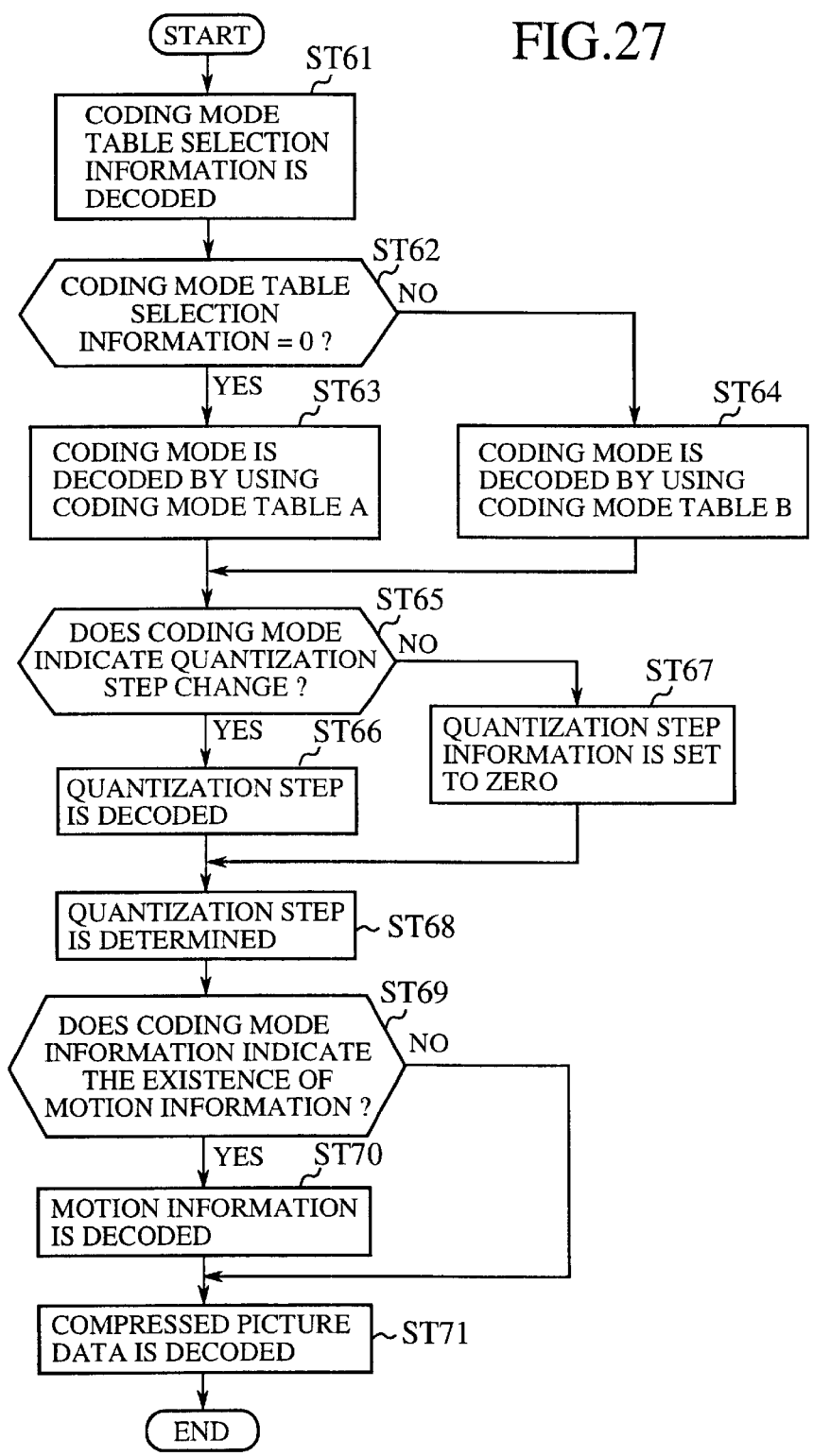
FIG. 27 is a flow chart showing an operation of the syntax analysis and variable-length decoding unit according to the fourth embodiment of the present invention.

FIG. 27 is a flow chart showing an operation of the syntax analysis and variable-length decoding unit 71, that is, the processing of the step ST51 shown in FIG. 26.

Initially, in a step ST61, the coding mode table selection information 200 of the coded bit stream 213 is decoded in the coding mode table selection information decoding unit 81.

In a step ST62, it is judged in the change-over unit 82 whether or not the coding mode table selection information 200 is, for example, set to the value "0" according to the coding mode table selection information 200 decoded, and an output of the change-over unit 82 is changed according to the judgement. For example, in cases where it is judged in the change-over unit 82 that the coding mode table selection information 200 is set to the value "0", the coded bit stream 213 is output from the change-over unit 82 to the coding mode table A decoding unit 83, the coding mode information 206 is decoded in the coding mode table A decoding unit 83 in a step ST63 by using a coding mode table A. In contrast, in cases where it is judged in the change-over unit 82 that the coding mode table selection information 200 is set to the value "1", the coded bit stream 213 is output from the change-over unit 82 to the coding mode table B decoding unit 84, the coding mode information 206 is decoded in the coding mode table B decoding unit 84 in a step ST64 by using a coding mode table B.

Thereafter, in a step ST65, the coded bit stream 213 and the coding mode information 206 decoded are input to the quantization step decoding unit 85, and it is judged whether or not the coding mode information 206 indicates the change of the quantization step. In cases where the change of the quantization step is indicated, the quantization step information 207 is decoded in the quantization step decoding unit 85 in a step ST66. In contrast, in cases where the change of the quantization step is not indicated, the quantization step information 207 is set to the value "0" in the quantization step decoding unit 85 in a step ST67. Thereafter, in a step ST68, a quantization step is determined in the quantization step decoding unit 85 from the value obtained in the step ST66 or step ST67.

Thereafter, in a step ST69, the coded bit stream 213 and the coding mode information 206 decoded are input to the motion information decoding unit 86, and it is judged whether or not the coding mode information 206 indicates the existence of the motion information. In cases where the existence of the motion information is indicated, the motion information 208 is decoded in the motion information decoding unit 86 in a step ST70.

Finally, in a step ST71, the coded bit stream 213 is input to the compressed picture data decoding unit 87, and the compressed picture data 205 is decoded and output.

Figure 28:
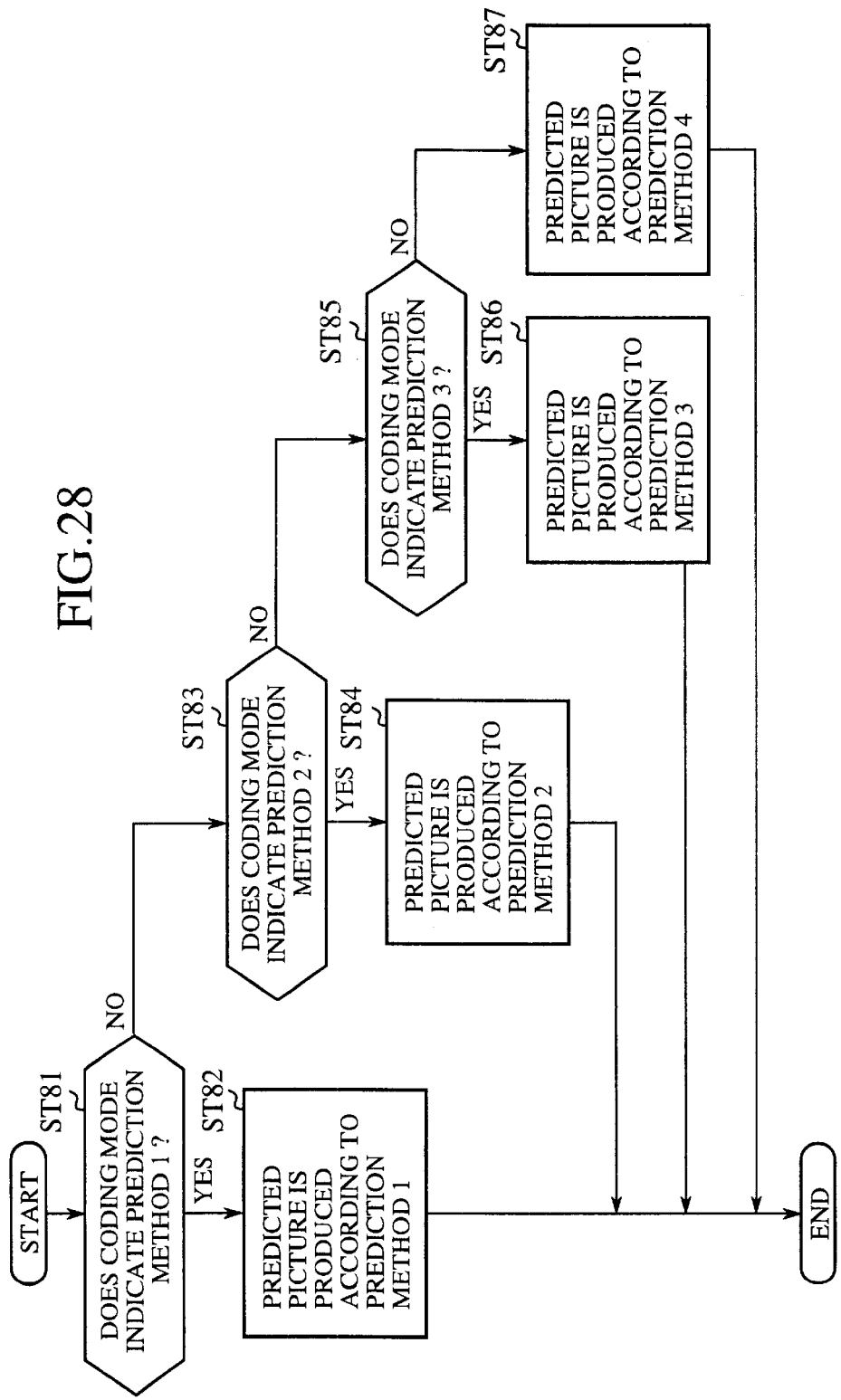
FIG. 28 is a flow chart showing an operation of the motion compensating unit according to the fourth embodiment of the present invention.

FIG. 28 is a flow chart showing an operation of the motion compensating unit 74, that is, the motion compensating processing of the step ST54 shown in FIG. 26.

In steps ST81, ST83 and ST85, it is judged in the change-over unit 91 of FIG. 25 which of four prediction methods 1 to 4 is indicated by the coding mode information 206.

In the step ST81, in cases where it is judged that the coding mode information 206 indicates the prediction method 1, the motion information 208 is transmitted to the prediction method 1 performing unit 92. In a step ST82, the motion information 208 and the picture-to-be-predicted block position-in-image-plane information 214 are input to the prediction method 1 performing unit 92, and a predicted picture 217 based on the prediction method 1 is produced.

Also, in the same manner, in the step ST83, in cases where it is judged that the coding mode information 206 indicates the prediction method 2, a predicted picture 217 based on the prediction method 2 is produced in the prediction method 2 performing unit 93 in a step ST84.

In addition, in cases where it is judged in the step ST85 that the coding mode information 206 indicates the prediction method 3, a predicted picture 217 based on the prediction method 3 is produced in the prediction method 3 performing unit 94 in a step ST86. In cases where it is judged in the step ST85 that the coding mode information 206 does not indicate the prediction method 3, a predicted picture 217 based on the prediction method 4 is produced in the prediction method 4 performing unit 95 in a step ST87.

As is described above, in the picture decoding apparatus of the fourth embodiment, the coded bit stream, in which the coding mode table selection information and the coding mode information are multiplexed with each other, is received, one coding mode table decoding unit is selected according to the coding mode table selection information, one prediction method is changed over to another prediction method according to the coding mode information, and the coded data is decoded. Therefore, even though an amount of the coding mode information arranged in the overhead information is made small in the coded bit stream, the coded data can be accurately decoded, and an effect that a picture decoding apparatus, in which the decoding of the coded data can be performed at a better efficiency on given conditions, can be realized can be obtained.

EMBODIMENT 5

A picture decoding apparatus according to a fifth embodiment is obtained by improving the picture decoding apparatus of FIG. 23 according to the fourth embodiment to that corresponding to the MPEG-4 standards.

Figure 29:
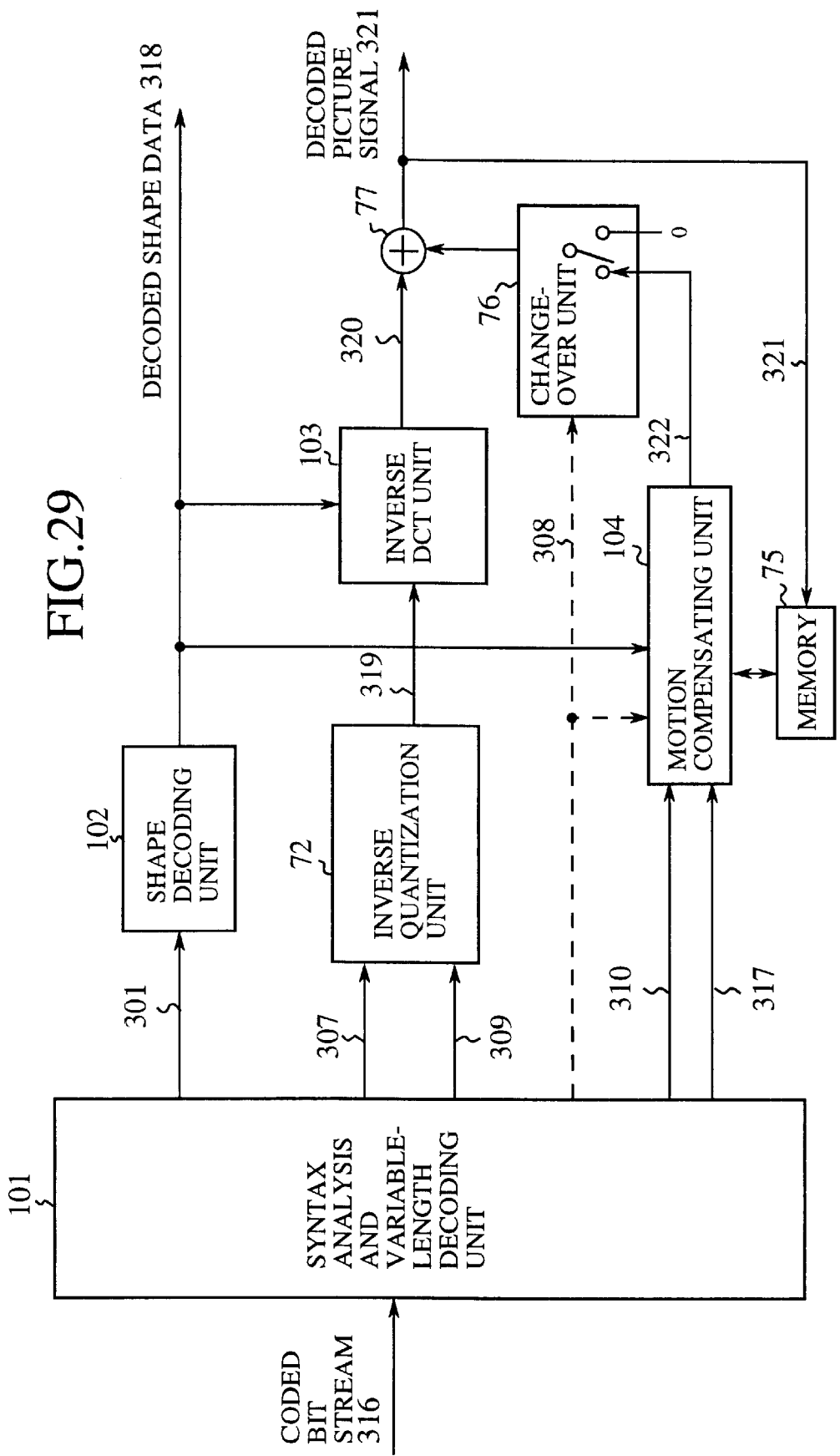
FIG. 29 is a block diagram showing the configuration of a picture decoding apparatus according to a fifth embodiment of the present invention.

FIG. 29 is a block diagram showing the configuration of a picture decoding apparatus according to a fifth embodiment. In FIG. 29, 101 denotes a syntax analysis and variable-length decoding unit, 102 denotes a shape decoding unit, 103 denotes an inverse DCT unit, 104 denotes a motion compensating unit, and the other units, to which the same reference numerals as those attached to the units of FIG. 23 according to the fourth embodiment are attached, are the same as those of FIG. 23.

The difference between this picture coding apparatus and that of FIG. 23 according to the fourth embodiment is described. In this fifth embodiment, the inverse DCT unit 103 are arranged in place of the inverse orthogonal transformation unit 73, and an MBTYPE 308 corresponding to the coding mode information, block data 307 corresponding to the compressed picture data and compressed shape data 301 are decoded from the coded bit stream 316 in the syntax analysis and variable-length decoding unit 101. Also, the shape decoding unit 102 peculiar to the MPEG-4 is arranged, the compressed shape data 301 is decoded in the shape decoding unit 102, and decoded shape data 318 is produced. The decoded shape data 318 influences the inverse DCT unit 103 and the motion compensating unit 104. However, even though this picture decoding apparatus corresponds to the MPEG-4, in cases where a rectangular picture frame of a television signal or the like is, for example, used as a picture-to-be-coded, because shape data indicates a constant rectangle, the shape decoding unit 102 is not required.

Figure 30:
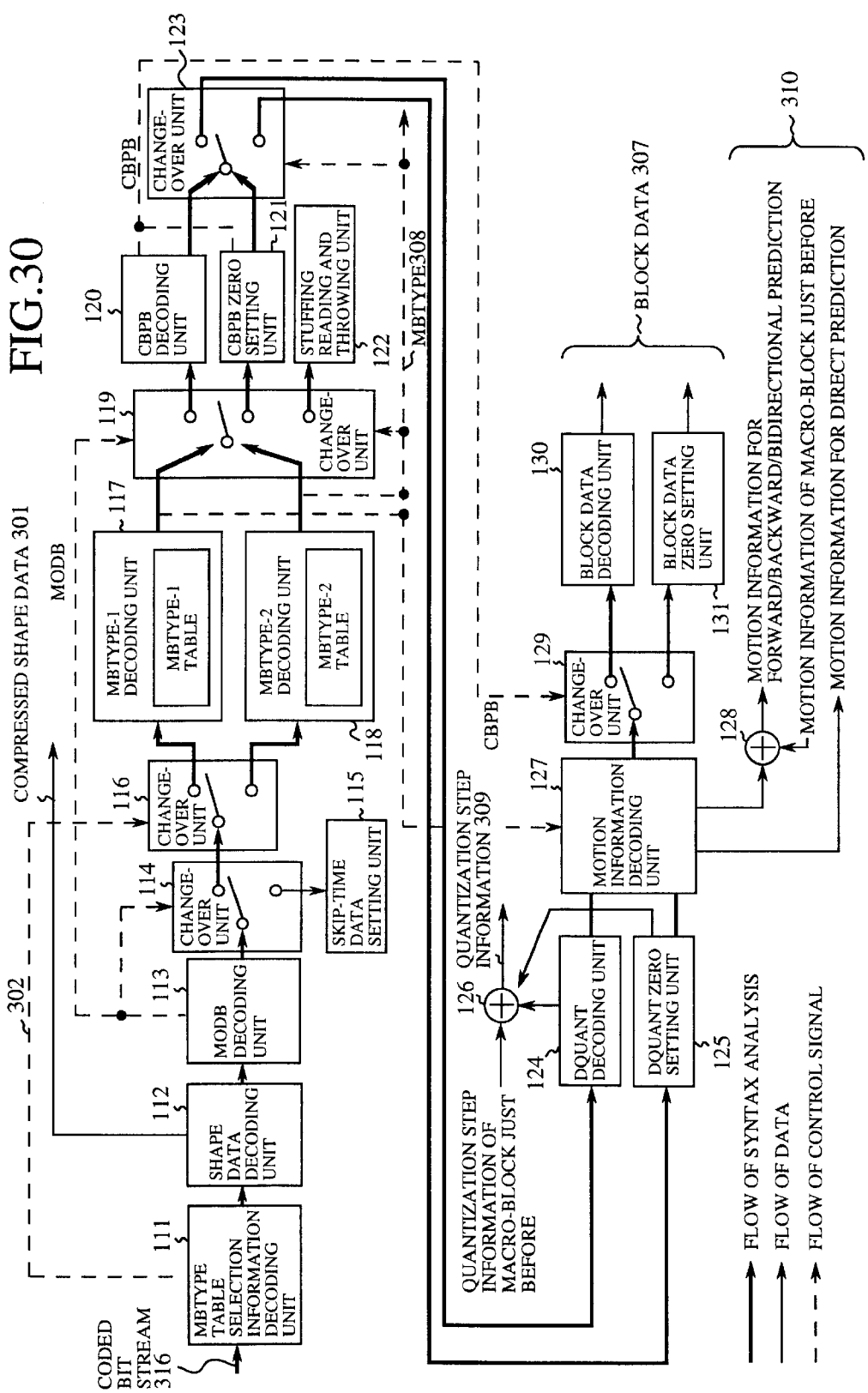
FIG. 30 is a block diagram showing the configuration of a syntax analysis and variable-length decoding unit according to the fifth embodiment of the present invention.

FIG. 30 is a block diagram showing the configuration of the syntax analysis and variable-length decoding unit 101 of FIG. 29 according to the fifth embodiment. In FIG. 30, 111 denotes an MBTYPE table selection information decoding unit, 112 denotes a shape data decoding unit, 113 denotes an MODB decoding unit, 114 denotes a change-over unit, 115 denotes a skip-time data setting unit, 116 denotes a change-over unit, 117 denotes an MBTYPE-1 decoding unit, 118 denotes an MBTYPE-2 decoding unit, 119 denotes a change-over unit, 120 denotes a CBPB decoding unit, 121 denotes a CBPB zero setting unit, 122 denotes a stuffing reading and throwing unit, 123 denotes a change-over unit, 124 denotes a DQUANT decoding unit, 125 denotes a DQUANT zero setting unit, 126 denotes an adding unit, 127 denotes a motion information decoding unit, 128 denotes an adding unit, 129 denotes a change-over unit, 130 denotes a block data decoding unit, and 131 denotes a block data zero setting unit.

The MBTYPE-1 table of the MBTYPE-1 decoding unit 117 and the MBTYPE-2 table of the MBTYPE-2 decoding unit 118 respectively have contents shown in FIG. 9 or FIG. 10 described in the picture coding apparatus of the second embodiment.

Figure 31:
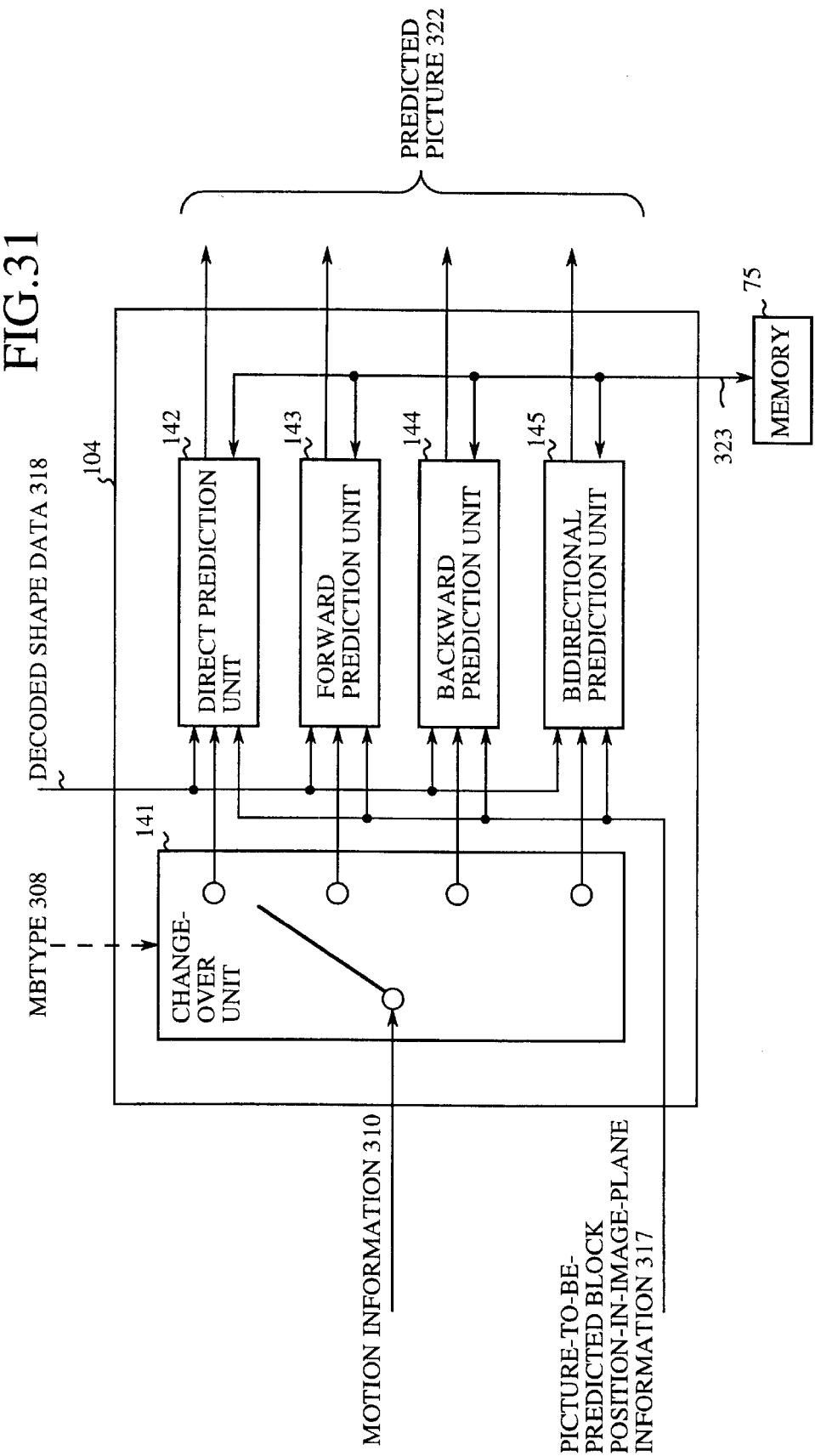
FIG. 31 is a block diagram showing the configuration of a motion compensating unit according to the fifth embodiment of the present invention.

FIG. 31 is a block diagram showing the configuration of the motion compensating unit 104 of FIG. 29 according to the fifth embodiment. In FIG. 31, 141 denotes a change-over unit, 142 denotes a direct prediction unit, 143 denotes a forward prediction unit, 144 denotes a backward prediction unit, and 145 denotes a bidirectional prediction unit.

Next, an operation is described.

Figure 32:
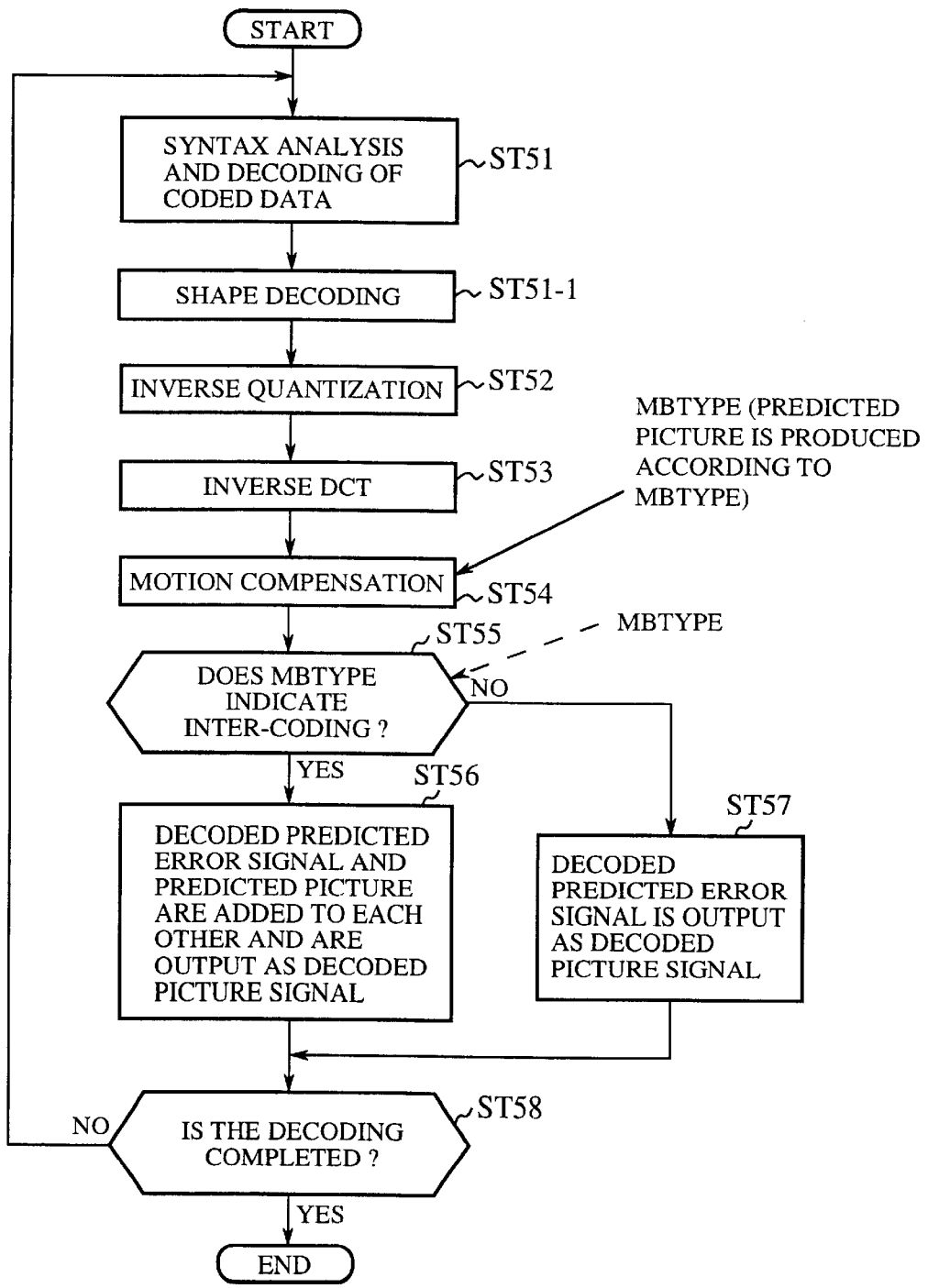
FIG. 32 is a flow chart showing an operation of the picture decoding apparatus according to the fifth embodiment of the present invention.

FIG. 32 is a flow chart showing an operation of the picture decoding apparatus according to the fifth embodiment.

A point different from the flow chart showing the operation of the picture decoding apparatus of FIG. 26 according to the fourth embodiment is described. In this fifth embodiment, as shown in FIG. 29, because the picture decoding apparatus has the shape decoding unit 102 and corresponds to the MPEG-4, a shape decoding processing performed in the shape decoding unit 102 for each macro-block is inserted as a step ST51-1 between the steps ST51 and ST52, the processing names of the steps ST53 and ST55 are changed to names of the judging processing indicating whether or not the inverse DCT processing or the MBTYPE indicates the inter-coding, and the processing performed in the steps is the same as that performed in the corresponding steps ST53 and ST55 of FIG. 26.

Also, the shape decoding processing of the step ST51-1 reflects decoded shape data 318 output from the shape decoding unit 102, and the inverse DCT processing of the step ST53 and the motion compensation processing of the step ST54 are performed according to the decoded shape data 318.

Also, in the same manner as the case of the fourth embodiment shown in FIG. 26, the sequence of the inverse quantization processing of the step ST52, the inverse DCT processing of the step ST53 and the motion compensation processing of the step ST54 is performed in that order. However, the present invention is not limited to that order. For example, it is applicable that the sequence be performed in a reverse order or the processing steps be simultaneously performed. In addition, a start code denoting a division point is detected in the syntax analysis processing of the step ST51 for each unit of the video object (VO), the video object layer (VOL) or the video object plane (VOP), and the decoding of a corresponding hierarchy is performed according to the start codes. In this syntax analysis processing, the processing at a step for analyzing data of the macro-blocks, in particular, data of the B-VOP is only performed. Also, the MBTYPE table selection information 302 shown in FIG. 30 is decoded as data of VOP or VOL which is placed at a level higher than that of the macro-blocks.

Figure 33:
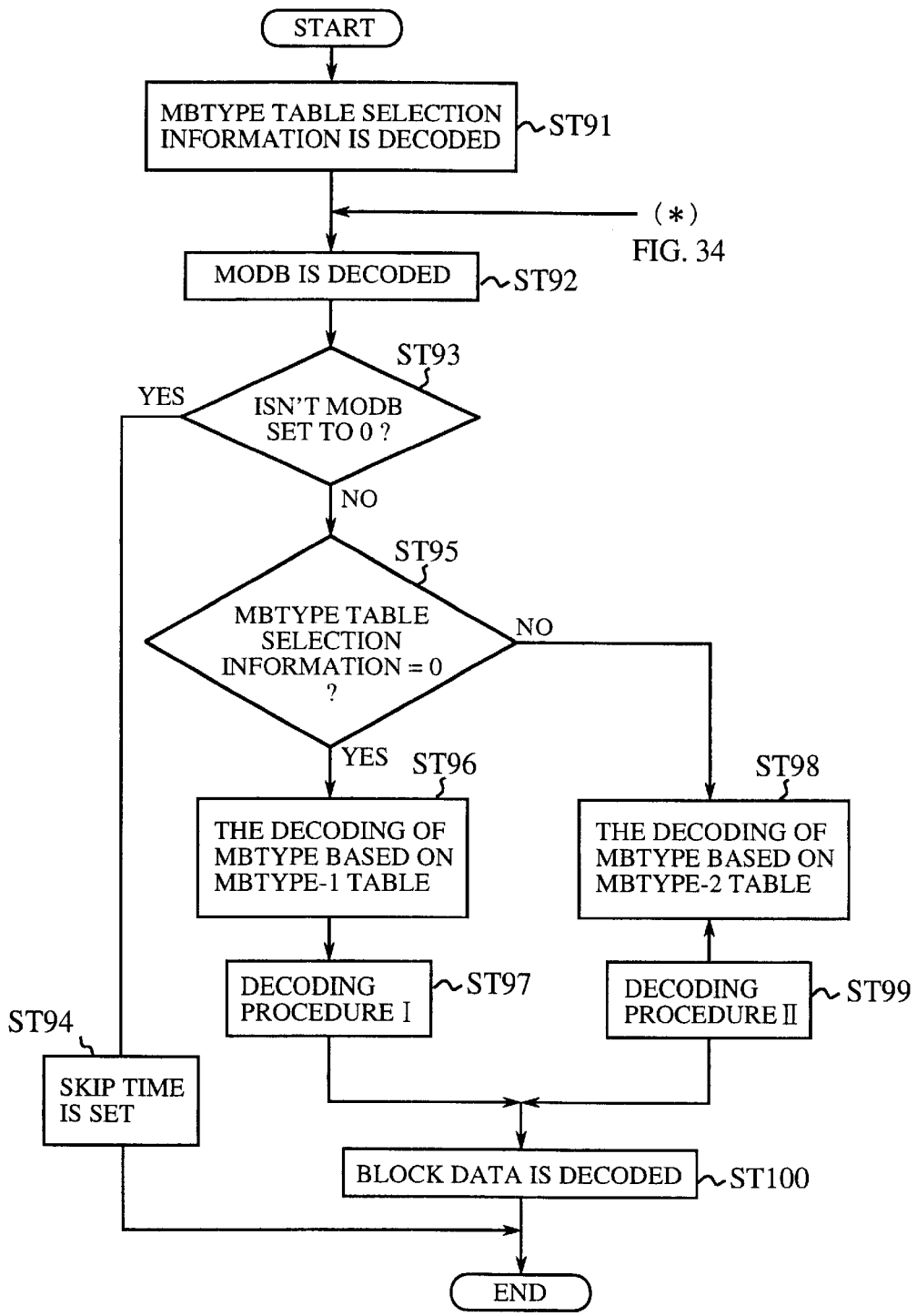
FIG. 33 is a flow chart showing an operation of the syntax analysis and variable-length decoding unit according to the fifth embodiment of the present invention.

FIG. 33 is a flow chart showing an operation of the syntax analysis and variable-length decoding unit 101, that is, the syntax analysis and coded data decoding processing of the step ST51 shown in FIG. 32.

Initially, in a step ST91, MBTYPE table selection information (B-VOP mode type) 302 of the B-VOP is decoded from the coded bit stream 316 shown in FIG. 12 in the MBTYPE table selection information decoding unit 111. In a following step ST92, MODB (skip judging information, not shown in FIG. 12) multiplexed as the overhead information of the coded bit stream 316 is decoded in the MODB decoding unit 113. Thereafter, in a following step ST93, it is judged in the change-over unit 114 whether or not the MODB (skip judging information) decoded is set to the value "0".

In cases where it is judged that the MODB is set to the value "0" ("YES" in the step ST93), a case that a corresponding macro-block is skipped is judged. Therefore, in a step ST94, the setting in following items 1) to 3) is performed as a skip time setting processing in the skip time data setting unit 115.

1) MBTYPE-0 (direct prediction) is set. Also, MVDB (delta vector for direct prediction) is set to the value "0".

2) CBPB (information indicating the existence of to-be-coded DCT coefficients of a sub-block which is composed of 8*8 blocks and denotes a DCT performing unit in the macro-block) are set to the value "0". That is, all pieces of DCT coefficient data are set to the value "0".

3) A predicted picture based on a direct prediction, which is obtained on the condition of the MVDB set to the value "0", is set as a decoded picture, as it is, according to the above two conditions.

In contrast, in cases where it is judged that the MODB is not set to the value "0" ("NO" in the step ST93), a case that a corresponding macro-block is not skipped is judged. Therefore, in a step ST95, it is judged in the change-over unit 116 whether or not the MBTYPE table selection information 302 decoded in the step ST91 is set to the value "0". In cases where the MBTYPE table selection information 302 is set to the value "0" ("YES" in the step ST95), the MBTYPE-1 table is selected in the MBTYPE-1 decoding unit 117 in a step ST96, the decoding of the MBTYPE is performed. Thereafter, a decoding procedure I described later is performed in a step ST97. In contrast, in cases where the MBTYPE table selection information 302 is not set to the value "0" ("NO" in the step ST95), the MBTYPE-2 table is selected in the MBTYPE-2 decoding unit 118 in a step ST98, and the decoding of the MBTYPE is performed.

Thereafter, in a step ST99, a decoding procedure II described later is performed.

Finally, in a step ST100, block data 307 denoting the compressed picture data is decoded in the block data decoding unit 130 and is output.

Figure 34:
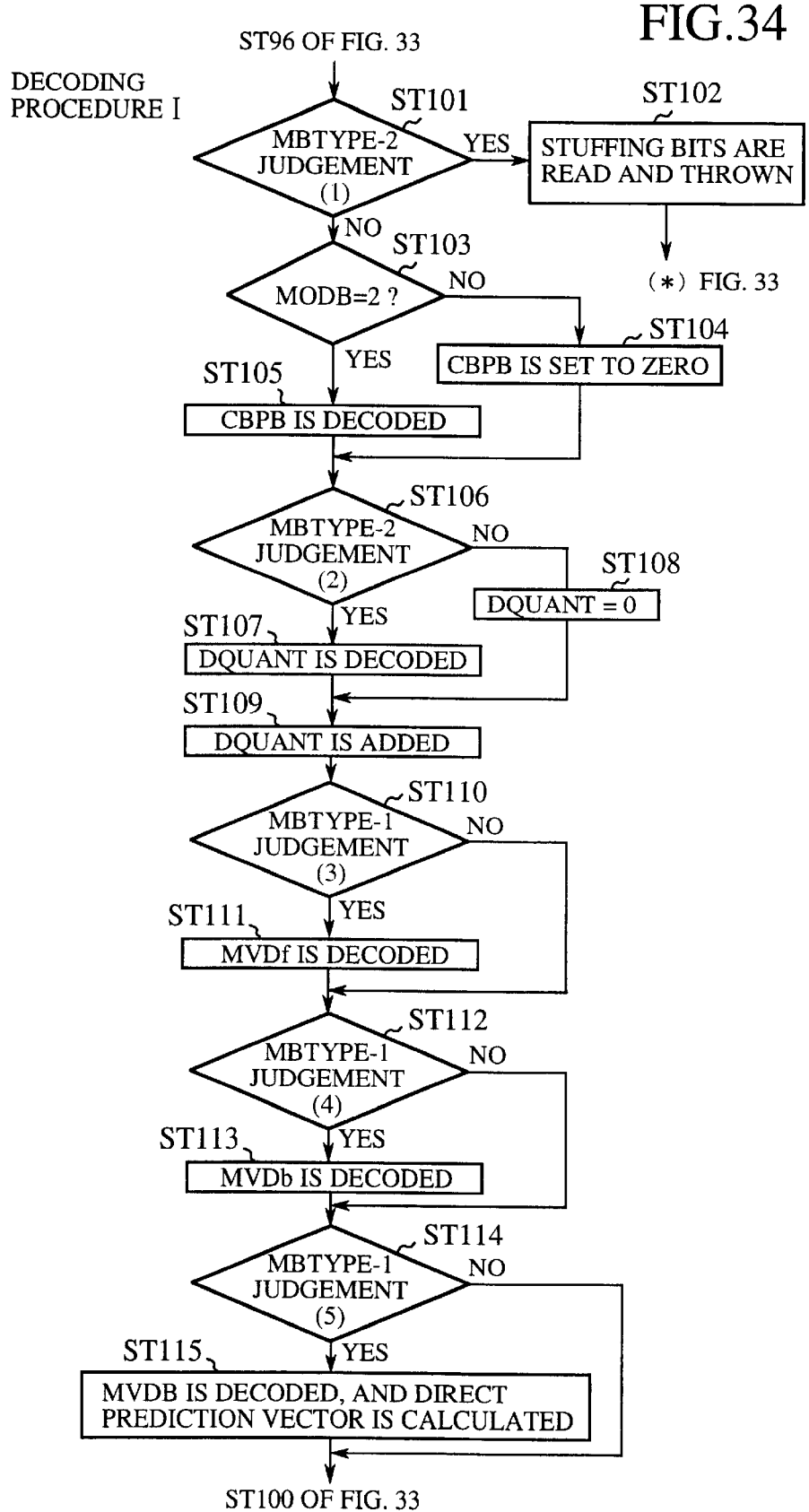
FIG. 34 is a flow chart showing a decoding procedure I based on the MBTYPE-5 table according to the fifth embodiment of the present invention.

FIG. 34 is a flow chart showing a decoding procedure I of the step ST97 shown in FIG. 33.

In this processing, an MBTYPE-1 judgement (1) processing is performed in the change-over unit 119 of FIG. 30 in a step ST101. That is, a code-word set in the coding mode information (MBTYPE) 308 of the coded bit stream is detected, the MBTYPE-1 table shown in FIG. 9 is referred, and it is judged whether or not a mode number (a value of MBTYPE) corresponding to the detected code-word is set to the value "3".

In cases where the mode number is set to the value "3", the MBTYPE-1 table shown in FIG. 9 is referred. Because a case of the coding mode of the stuffing is indicated, the step ST101 is "YES", a reading and throwing processing is performed in the stuffing reading and throwing unit 122 in a next step ST102 by judging the compressed picture data of the coding mode as stuffing bits, and the procedure returns to a decoding processing of the MODB (skip judging information) of the step ST92 of FIG. 33.

In contrast, in cases where the mode number is not set to the value "3", the MBTYPE-1 table shown in FIG. 9 is referred. Because a case of the coding mode of the stuffing is not indicated, the step ST101 is "NO", and it is judged in the change-over unit 119 in a step ST103 whether or not the MODB (skip judging information) is set to the value "2".

For example, in cases where the MODB is set to the value "1", in a step ST104, CBPB, which denotes information indicating the existence of to-be-coded DCT coefficients of a sub-block which is composed of 8*8 blocks and denotes a DCT performing unit in the macro-block, is set to the value "0" in the CBPB zero setting unit 121.

In contrast, in cases where the MODB is set to the value "2", in a step ST105, CBPB is decoded from the coded bit stream 316 in the CBPB decoding unit 120.

In a next step ST106, in the change-over unit 123, the MBTYPE-1 judgement (2) processing, that is, the MBTYPE-1 table shown in FIG. 9 is referred, and it is judged whether or not a mode number (a value of the MBTYPE) corresponding to a code-word set in the coding mode information (MBTYPE 308) of the coded bit stream 316 is 1 or 2. In cases where the MBTYPE is 1 or 2, the DQUANT (the quantization step differential value) is decoded from the bit stream in the DQUANT decoding unit 124 in a step ST107. Also, in cases where the MBTYPE is neither 1 nor 2, the DQUANT is set to zero in the DQUANT zero setting unit 125 in a step ST108.

Thereafter, in a step ST109, an output from the DQUANT decoding unit 124 or the DQUANT zero setting unit 125 and the quantization step information of the macro-block just before are added to each other in the adding unit 126, and the quantization step information 309 is output.

In a next step ST110, in the motion information decoding unit 127, the MBTYPE-1 judgement (3) processing, that is, the MBTYPE-1 table is referred, and it is judged whether or not the mode number (a value of the MBTYPE) corresponding to a code-word set in the coding mode information (MBTYPE 308) of the coded bit stream 316 is 2. In cases where the MBTYPE is 2, the MVDf (the motion vector differential value for forward prediction) is decoded from the bit stream in the motion information decoding unit 127 in a step ST111, and the MVDf and the motion information of the macro-block just before are added to each other in the adding unit 128, and the addition is output as for-forward-prediction motion information 310.

In a next step ST112, in the motion information decoding unit 127, the MBTYPE-1 judgement (4) processing, that is, the MBTYPE-1 table is referred, and it is judged whether or not the mode number corresponding to a code-word set in the coding mode information (MBTYPE 308) of the coded bit stream 316 is 1. In cases where the MBTYPE is 1, the MVDb (the motion vector differential value for backward prediction) is decoded from the bit stream in the motion information decoding unit 127 in a step ST113, and the MVDb and the motion information of the macro-block just before are added to each other in the adding unit 128, and the addition is output as for-backward-prediction motion information 310.

In a next step ST114, in the motion information decoding unit 127, the MBTYPE-1 judgement (5) processing, that is, the MBTYPE-1 table is referred, and it is judged whether or not the mode number corresponding to a code-word set in the coding mode information (MBTYPE 308) of the coded bit stream 316 is 0. In cases where the MBTYPE is 0, the MVDB (the delta vector for direct prediction) is decoded from the bit stream in the motion information decoding unit 127 in a step ST115, and for-direct-prediction motion information 310 such as a direct prediction vector or the like is reproduced. As is described above, a decoding processing shown in FIG. 34 is completed.

It is applicable that the step ST109 be performed after the step ST115 on condition that the step ST109 is performed after the step ST107 and the step ST108. Also, it is applicable that the processing of the adding unit 128 in the step ST111 and the step ST113 be performed simultaneously with or before the step ST109 or be performed simultaneously with or after the step ST100 of FIG. 33.

When the processing in the step ST115 is completed, contents of the CBPB (information indicating the existence of to-be-coded DCT coefficients of a sub-block which is composed of 8*8 blocks and denotes a DCT performing unit in the macro-block) output from the CBPB decoding unit 120 or the CBPB zero setting unit 121 are judged in the change-over unit 129 in the final step ST100 of FIG. 33. In cases where the CBPB denotes a block of zeros, all pieces of block data (pieces of DCT coefficient data) are set to zero in the block data zero setting unit 131 and are output. In contrast, in cases where the CBPB denotes a block in which all elements are not set to zeros, block data variable-length-decoded is output from the block data decoding unit 130.

Figure 35:
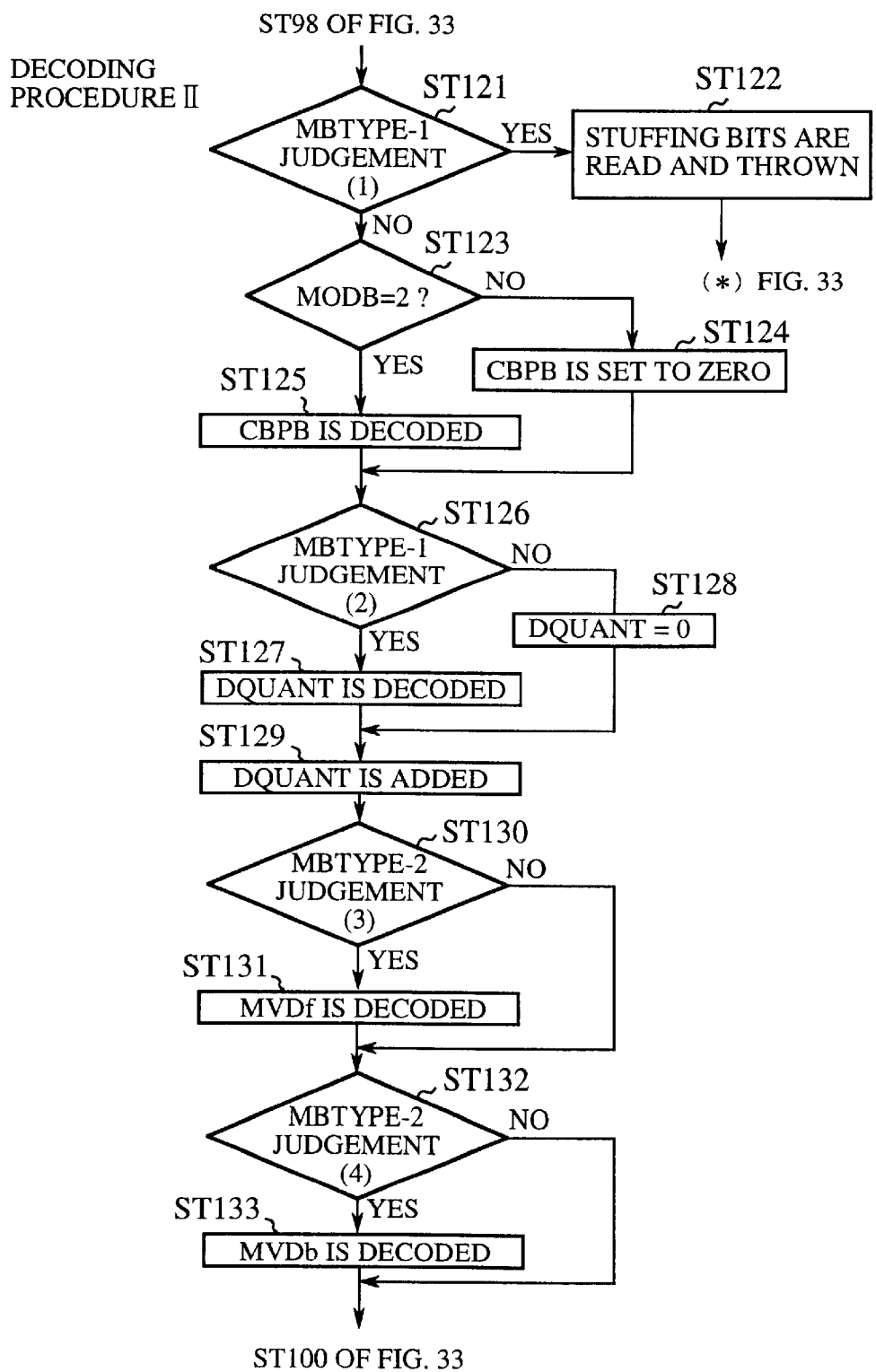
FIG. 35 is a flow chart showing a decoding procedure II based on the MBTYPE-6 table according to the fifth embodiment of the present invention.

FIG. 35 is a flow chart showing a decoding procedure II of the step ST99 shown in FIG. 33.

Initially, in a step ST121, in the change-over unit 120, the MBTYPE-2 judgement (1) processing, that is, the MBTYPE-2 table shown in FIG. 10 is referred, a code-word set in the coding mode information (MBTYPE 308) of the coded bit stream 316 is detected, and it is judged whether or not a mode number corresponding to the detected code-word is 8.

In cases where the mode number is 8, because the mode number indicates a case of the coding mode of the stuffing by referring the MBTYPE-2 table shown in FIG. 10, "YES" is satisfied in the step ST121, a reading and throwing processing, in which compressed picture data of the coding mode is regarded as stuffing bits, is performed in the stuffing reading and throwing unit 122 in a next step ST122, and the procedure returns to a decoding processing of the MODB (the skip judgement information) of the step ST92 of FIG. 33.

In contrast, in cases where the mode number is not 8, because the mode number does not indicate a case of the coding mode of the stuffing by referring the MBTYPE-2 table shown in FIG. 10, "NO" is satisfied in the step ST121, and it is judged in the change-over unit 119 in a step ST123 whether or not the MODB (the skip judgement information) is 2.

For example, in cases where the MODB is 1, the CBPB, which denotes information indicating the existence of to-be-coded DCT coefficients of a sub-block which is composed of 8*8 blocks and denotes a DCT performing unit in the macro-block, is set to zero in the CBPB zero setting unit 121 in a step ST124, in the same manner as in the case shown in FIG. 34. In contrast, in cases where the MODB is 2, the CBPB is decoded from the coded bit stream 316 in the CBPB decoding unit 120 in a step ST125.

In a next step ST126, in the change-over unit 123, the MBTYPE-2 judgement (2) processing, that is, the MBTYPE-2 table shown in FIG. 10 is referred, and it is judged whether or not a mode number corresponding to a code-word set in the coding mode information (MBTYPE 308) of the coded bit stream 316 is 1, 3, 5 or 7. In cases where the MBTYPE is 1, 3, 5 or 7, the DQUANT (the quantization step differential value) is decoded from the bit stream in the DQUANT decoding unit 124 in a step ST127. Also, in cases where the MBTYPE is neither 1, 3, 5 nor 7, the DQUANT is set to zero in the DQUANT zero setting unit 125 in a step ST128.

Thereafter, in a step ST129, an output from the DQUANT decoding unit 124 or the DQUANT zero setting unit 125 and the quantization step information of the macro-block just before are added to each other in the adding unit 126, and quantization step information 309 is output.

In a next step ST130, in the motion information decoding unit 127, the MBTYPE-2 judgement (3) processing, that is, the MBTYPE-2 table is referred, and it is judged whether or not the mode number corresponding to a code-word set in the coding mode information (MBTYPE 308) of the coded bit stream 316 is 2, 3, 6 or 7. In cases where the MBTYPE is 2, 3, 6 or 7, the MVDf (the motion vector differential value for forward prediction) is decoded from the bit stream in the motion information decoding unit 127 in a step ST131, and the MVDf and the motion information of the macro-block just before are added to each other in the adding unit 128, and the addition is output as for-forward-prediction motion information 310.

In a next step ST132, in the motion information decoding unit 127, the MBTYPE-2 judgement (4) processing, that is, the MBTYPE-2 table is referred, and it is judged whether or not the mode number corresponding to a code-word set in the coding mode information (MBTYPE 308) of the coded bit stream 316 is 2, 3, 4 or 5. In cases where the MBTYPE is 2, 3, 4 or 5, the MVDb (the motion vector differential value for backward prediction) is decoded from the bit stream in the motion information decoding unit 127 in a step ST133, and the MVDb and the motion information of the macro-block just before are added to each other in the adding unit 128, and the addition is output as for-backward-prediction motion information 310. As is described above, the decoding processing shown in FIG. 34 is completed.

When the processing in the step ST133 is completed, contents of the CBPB (information indicating the existence of to-be-coded DCT coefficients of a sub-block which is composed of 8*8 blocks and denotes a DCT performing unit in the macro-block) output from the CBPB decoding unit 120 or the CBPB zero setting unit 121 are judged in the change-over unit 129 in the final step ST100 of FIG. 33. In cases where the CBPB denotes a block of zeros, all pieces of block data (pieces of DCT coefficient data) are set to zero in the block data zero setting unit 131 and are output. In contrast, in cases where the CBPB denotes a block in which all elements are not set to zeros, block data 307 variable-length-decoded is output from the block data decoding unit 130.

Figure 36:
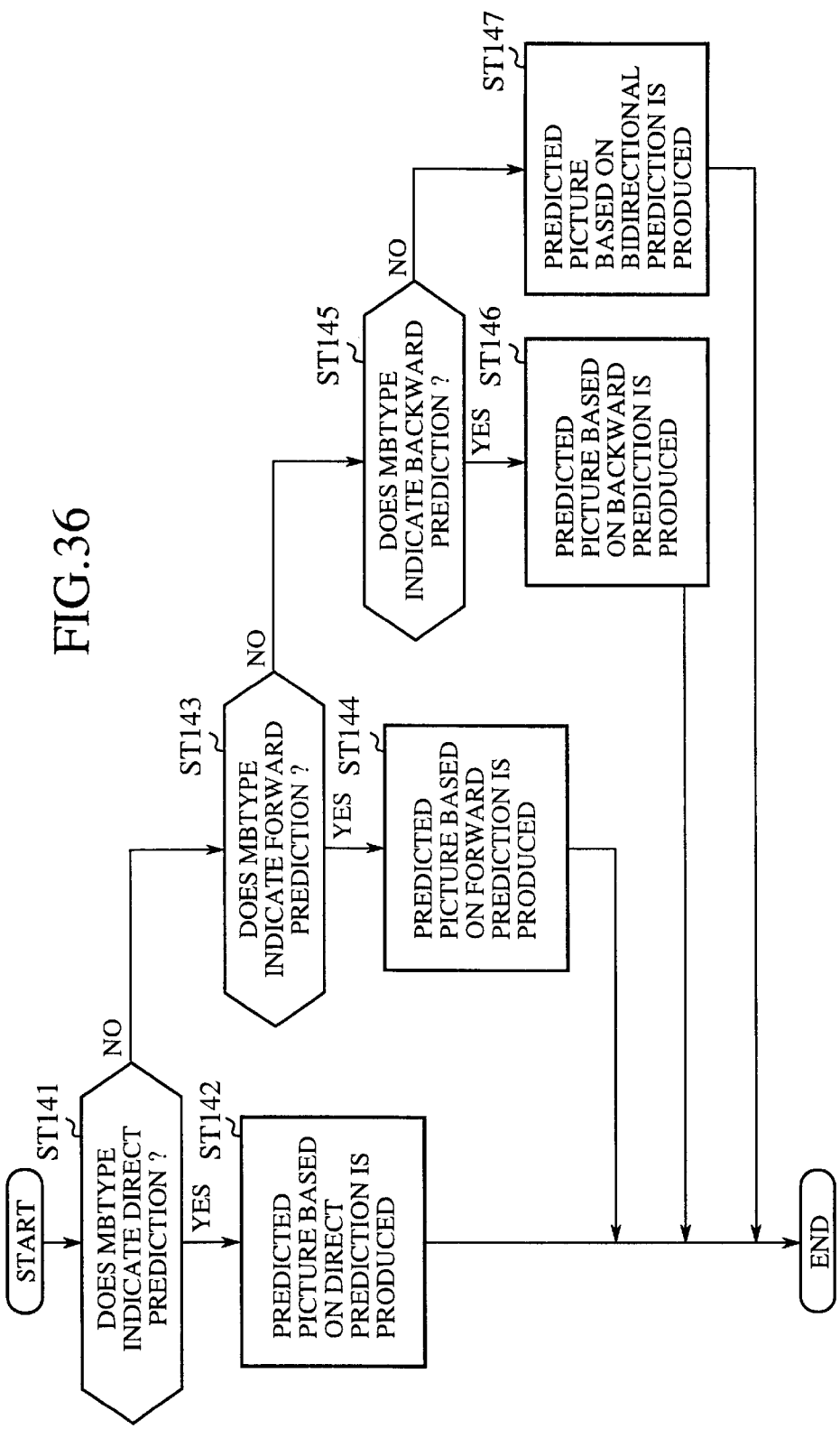
FIG. 36 is a flow chart showing an operation of the motion compensating unit according to the fifth embodiment of the present invention.

FIG. 36 is a flow chart showing an operation of the motion compensating unit 104, that is, a motion compensating processing of the step ST54 shown in FIG. 32. The motion compensating processing of the fifth embodiment shown in FIG. 36 is obtained by embodying the prediction methods 1 to 4 of the motion compensating processing of the fourth embodiment shown in FIG. 28.

In the changing-unit 141 of the motion compensating unit 104, it is judged according to the coding mode information (MBTYPE 308) in a step ST141, a step ST143 and a step ST145 which of the direct prediction, the forward prediction, the backward prediction and the bidirectional prediction is indicated by the coding mode.

Initially, in the step ST141, in cases where it is judged in the change-over unit 141 that the coding mode indicates the direct prediction, the motion information 310 is transmitted to the direct predicting unit 142. Thereafter, in a step ST142, the motion information 310 and picture-to-be-predicted block position-in-image-plane information 317 are input to the direct predicting unit 142, and a predicted picture 322 based on the direct prediction is produced.

In the next step ST143, in cases where it is judged in the change-over unit 141 that the coding mode indicates the forward prediction, a predicted picture 322 based on the forward prediction is produced in the forward predicting unit 143 in a step ST144 in the same manner. Thereafter, in the step ST145, in cases where it is judged in the change-over unit 141 that the coding mode indicates the backward prediction, a predicted picture 322 based on the backward prediction is produced in the backward predicting unit 144 in a step ST146. In cases where it is judged in the change-over unit 141 that the coding mode does not indicate the backward prediction, a predicted picture 322 based on the bidirectional prediction is produced in the bidirectional predicting unit 145 in a step ST147.

As is described above, in this fifth embodiment, even though coded data is transmitted from a picture coding apparatus side after the selection of an optimum coding mode table from the plurality of coding mode tables composed of the MBTYPE-1 table and the MBTYPE-2 table, which each define a combination of appropriate coding modes according to conditions such as a target bit rate, the selection of an optimum coding mode from the optimum coding mode table and the coding according to the optimum coding mode are performed on the picture coding apparatus side, because the MBTYPE-1 decoding unit 117 and the MBTYPE-2 decoding unit 118, in which the decoding is performed according to each of the plurality of coding mode tables, are arranged to select the MBTYPE-1 decoding unit 117 or the MBTYPE-2 decoding unit 118 according to the MBTYPE table selection information 302 denoting the coding mode selection information and the coding mode information (MBTYPE 308) of the coded bit stream 316 transmitted from the picture coding apparatus side and to perform the decoding according to the coding mode used for the coding, even though an amount of the coding mode information arranged in the overhead information of the coded data is made small according to the plurality of the coding mode tables on the picture coding apparatus side, the decoding can be correctly performed, and an effect that the decoding apparatus, in which the decoding can be performed at a better efficiency on given conditions, can be realized can be obtained.

EMBODIMENT 6

Figure 37:
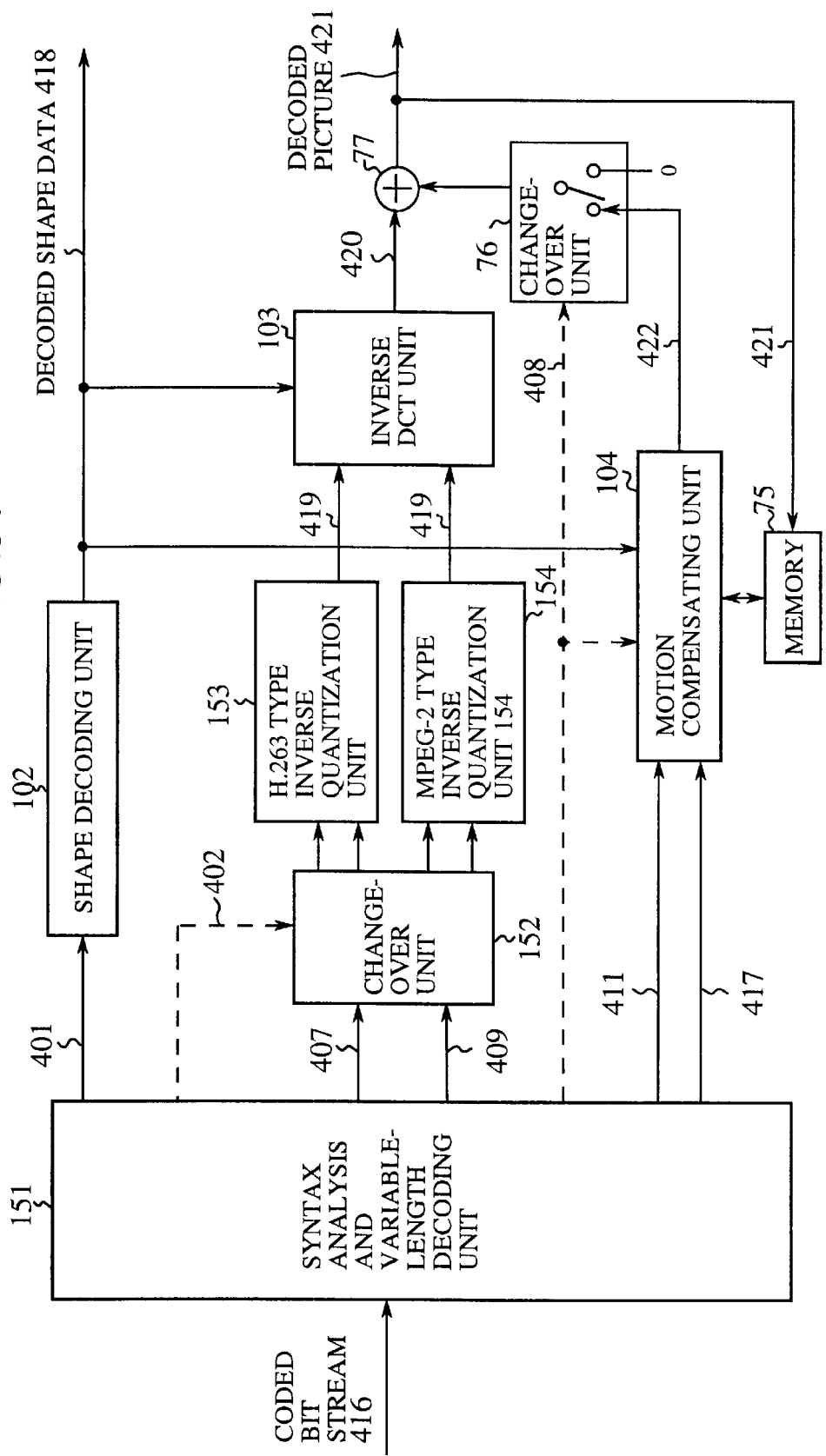
FIG. 37 is a block diagram showing the configuration of a picture decoding apparatus according to a sixth embodiment of the present invention.

FIG. 37 is a block diagram showing the configuration of a picture decoding apparatus according to a sixth embodiment. A picture decoding apparatus according to a sixth embodiment is obtained by describing in more detail the configuration of the inverse quantization unit of the picture decoding apparatus of the fifth embodiment corresponding to the MPEG-4 standards shown in FIG. 29 and denotes a decoding apparatus corresponding to the picture coding apparatus of the third embodiment shown in FIG. 19. In FIG. 37, 151 denotes a syntax analysis and valiable-length decoding unit, 152 denotes a change-over unit for performing a change-over according to already-existing quantization method selection information (video object layer quant type) 402 decoded from the coded bit stream 416, 153 denotes an H.263 type inverse quantization unit corresponding to the H.263 standards used for a low bit rate, and 154 denotes an MPEG-2 type inverse quantization unit corresponding to the MPEG-2 used for a high bit rate. Because the other configuration is the same as that of the picture decoding apparatus of the fifth embodiment shown in FIG. 29, the same reference numerals as those of the fifth embodiment are attached to the other units of the other configuration, and the description of the other units is omitted.

Figure 38:
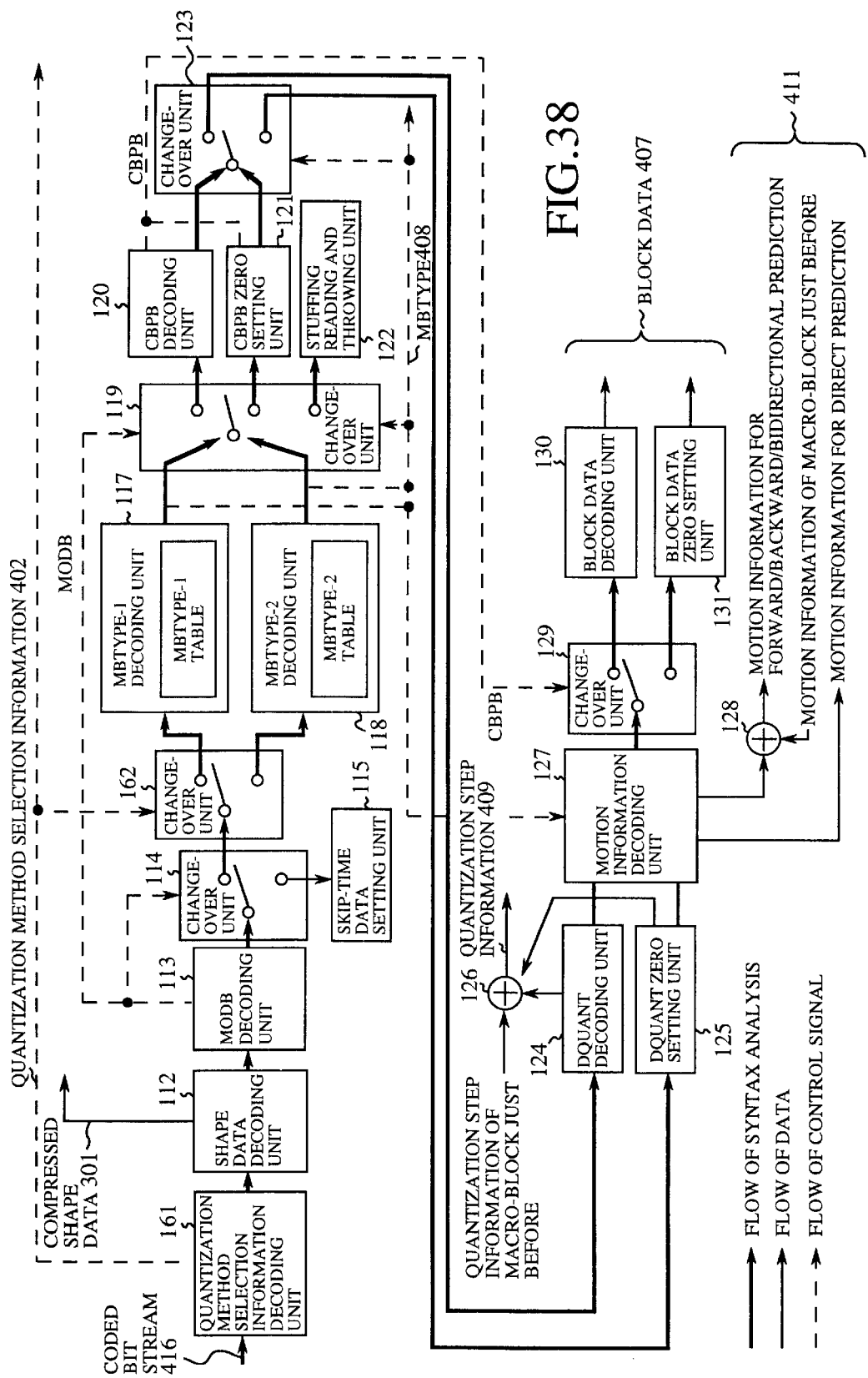
FIG. 38 is a block diagram showing the configuration of a syntax analysis and variable-length decoding unit according to the sixth embodiment of the present invention.

FIG. 38 is a block diagram showing the configuration of the syntax analysis and variable-length decoding unit 151 according to the sixth embodiment shown in FIG. 37. This syntax analysis and variable-length decoding unit 151 is fundamentally the same as the syntax analysis and variable-length decoding unit 101 shown in FIG. 30. As shown in FIG. 38, a different point is that the already-existing quantization method selection information (video object layer quant type) 402 is decoded from the coded bit stream 416 shown in FIG. 22 in the quantization method selection information decoding unit 161, the change-over unit 162 is operated to change over between the MBTYPE-1 decoding unit 117 and the MBTYPE-2 decoding unit 112 according to the quantization method selection information 402 used in place of the MBTYPE selection information. The decoded quantization method selection information 402 is output from the syntax analysis and variable-length decoding unit 151 to the change-over unit 152 of FIG. 37. Because the other configuration is the same as that of the syntax analysis and variable-length decoding unit 101 of the fifth embodiment shown in FIG. 30, the same reference numerals as those attached to the configuration of the syntax analysis and variable-length decoding unit 101 are attached to the other configuration, and the description for the other configuration is omitted.

Next, an operation is described.

Figure 39:
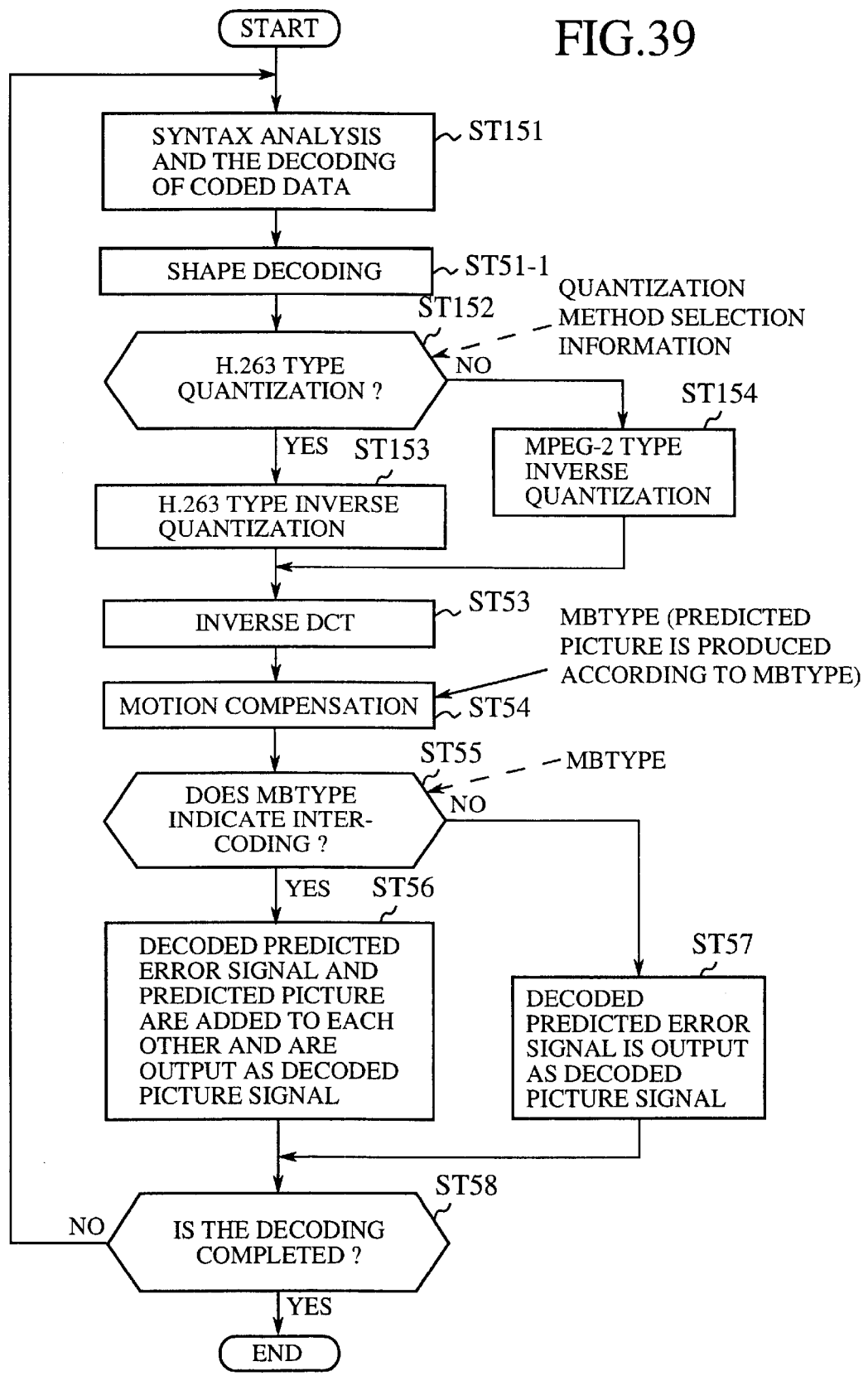
FIG. 39 is a flow chart showing an operation of a picture decoding apparatus according to the sixth embodiment of the present invention.

FIG. 39 is a flow chart showing an operation of the picture decoding apparatus according to the sixth embodiment.

Because an operation of the sixth embodiment is fundamentally the same as that of the fifth embodiment shown in FIG. 32 except for the syntax analysis and coded data decoding processing in a step ST151 and the processing of the steps ST152 to ST154 in which the quantization method is selected and the inverse quantization is performed, a different point is only described.

That is, in this sixth embodiment, because the change-over of the the quantization method is performed, it is judged in the change-over unit 152 of FIG. 37 according to the already-existing quantization method selection information 402 decoded from the coded bit stream 416 in a step ST152 whether or not the quantization method is the H.263 method.

In cases where the quantization method selection information 402 indicates the H.263 method, the procedure proceeds to a next step ST153, the inverse quantization is performed according to the MBTYPE-1 table corresponding to the low bit rate in the H.263 type inverse quantization unit 153. In contrast, in cases where the quantization method selection information 402 indicates the MPEG-2, the procedure proceeds to a next step ST154, the inverse quantization is performed according to the MBTYPE-2 table corresponding to the high bit rate in the MPEG-2 type inverse quantization unit 154.

Figure 40:
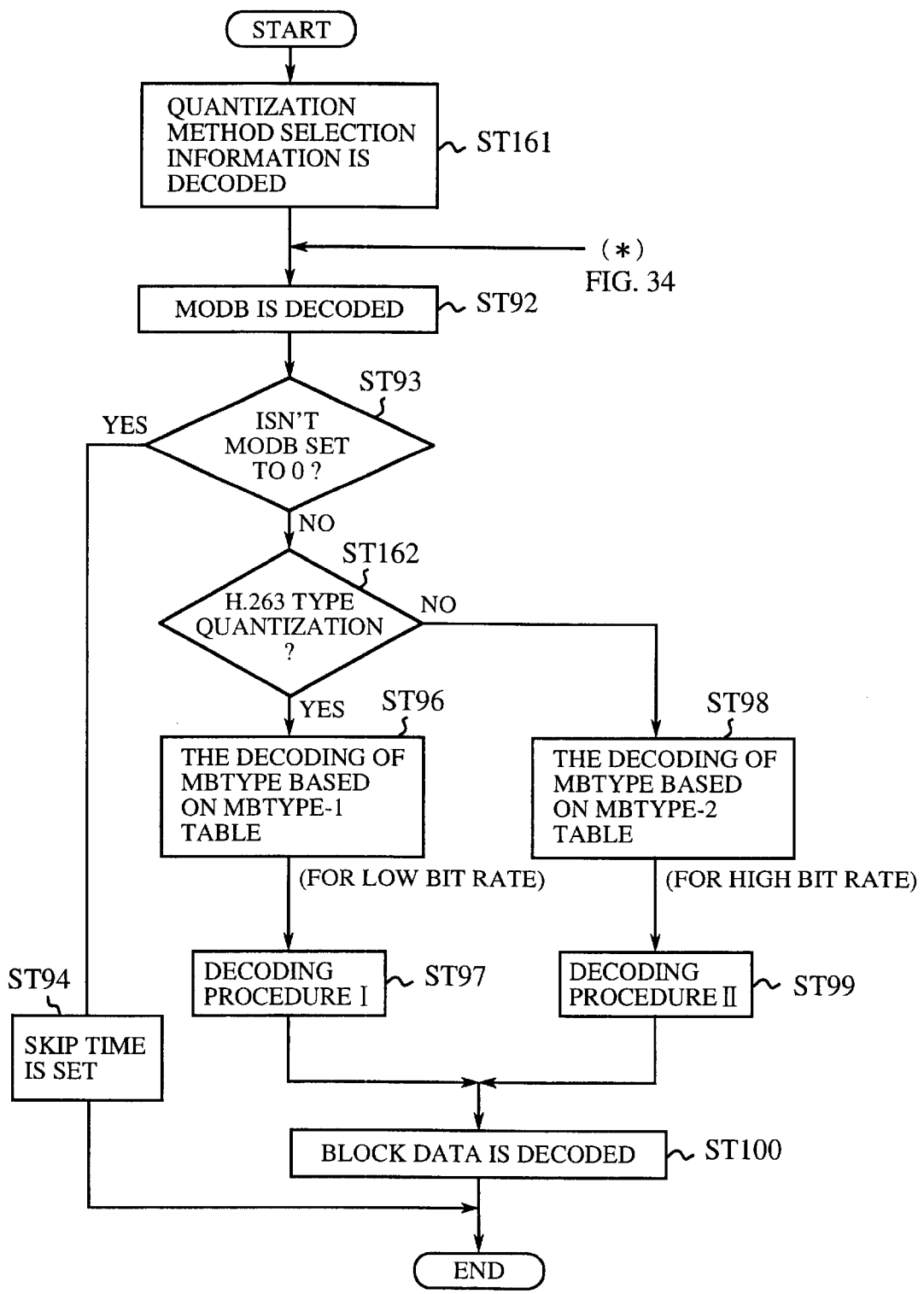
FIG. 40 is a flow chart showing an operation of the syntax analysis and variable-length decoding unit according to the sixth embodiment of the present invention.

FIG. 40 is a flow chart showing an operation of the syntax analysis and variable-length decoding unit 151, that is, a syntax analysis and coded data decoding processing of the step ST151 shown in FIG. 39.

Because the processing shown in FIG. 40 is fundamentally the same as that of the fifth embodiment shown in FIG. 33 except that the quantization method selection information 402 is used as the MBTYPE table selection information, so that an operation different from that of the fifth embodiment is only described.

Initially, in a first step ST161, the quantization method selection information 402 is decoded from the coded bit stream 416 in the quantization method selection information decoding unit 161. Thereafter, in a step ST162, it is judged according to the quantization method selection information 402 in the change-over unit 162 whether or not the quantization in the coding is the H.263 type quantization. In case of the H.263 type quantization, in a step ST96, the coding mode table of the MBTYPE-1 is selected in the MBTYPE-1 decoding unit 117, and the decoding is performed. In contrast, in cases where the quantization is not the H.263 type quantization but the MPEG-2 type quantization, the coding mode table of the MBTYPE-2 is selected in the MBTYPE-2 decoding unit 118 in a step ST98, and the decoding is performed.

As is described above, in the sixth embodiment, because the picture decoding apparatus is the same as that of the fifth embodiment except that the change-over of the quantization method is performed, in the same manner as in the fifth embodiment, even though an amount of the coding mode information of the overhead information in the coded data is made small by using the plurality of coding mode tables on the picture coding apparatus side, the decoding can be correctly performed. Also, because the already-existing quantization method selection information 402 arranged in the VOL header information is used as the MBTYPE table selection information (B VOP mode type) denoting the coding mode group selection information, it is required to add no overhead information in the present syntax of the coded bit stream 416, and an effect that the decoding apparatus, in which the decoding can be performed at a better efficiency on given conditions, can be realized can be obtained.

In this sixth embodiment, the MBTYPE-1 table an d the MBTYPE-2 table are described as an example. However, as is described in the second embodiment, it is applicable that the MBTYPE-0 table, the MBTYPE-3 table, the MBTYPE-5 table, the MBTYPE-6 table and/or the MBTYPE-7 table be, for example, used as the MBTYPE tables corresponding to the low bit rate and the MBTYPE-4 table be, for example, used as the MBTYPE table corresponding to the high bit rate.

INDUSTRIAL APPLICABILITY

As described above, because an amount of the coding mode information of the overhead information in the coded data is not increased even though the number of coding modes is increased, the picture coding method, the picture coding apparatus, the picture decoding method and the picture decoding apparatus are suitable to perform the transmission at a better efficiency.

What is claimed is:

1. A picture coding method, in which an input picture is coded while changing over a coding mode to another coding mode for each of prescribed blocks of the input picture, comprising the steps of:

selecting a coding mode group from a plurality of coding mode groups, which each are obtained by registering a selectable coding mode for each prescribed block, according to prescribed coding mode group selection information;

producing a coded bit stream by coding each of the prescribed blocks of the input picture according to the selected coding mode group;

adding the prescribed coding mode group selection information to the coded bit stream; and outputting the coded bit stream with the prescribed coding mode group selection information.

2. A picture coding apparatus, in which an input picture is coded while changing over a coding mode to another coding mode for each of prescribed blocks of the input picture, comprising:

a plurality of coding mode groups, which each are obtained by registering a coding mode selectable for each prescribed block;

coding mode group selecting means for selecting a coding mode group to be used in a coding processing according to prescribed coding mode group selection information;

coding mode selecting means for selecting a coding mode from a plurality of coding modes registered in the selected coding mode group for each prescribed block;

coding means for coding each block according to the selected coding mode and outputting a piece of coded data; and multiplexing means for multiplexing the coding mode group selection information, the coding modes and the pieces of coded data with each multiplexing means for multiplexing the coding mode group selection information, the coding modes and the pieces of coded data with each other and outputting those as a coded bit stream.

3. A picture coding apparatus according to claim 2, wherein a plurality of coding modes respectively selectable for each of macro-blocks, which each denote a unit of a picture-to-be-coded, is registered in each of the plurality of coding mode groups, and the coding mode group selecting means selects a coding mode group to be used for the coding from the plurality of coding mode groups according to the coding mode group selecting information for each of video object planes which each denote a picture indicating a condition of a video object at a time and each are composed of the macro-blocks.

4. A picture coding apparatus according to claim 2, wherein the coding means comprises a plurality of quantization means different from each other, and quantization selecting means for selecting one of the quantization means according to quantization method selection information, wherein a quantization is performed by using the selected quantization means in a coding, and the coding mode group selecting means uses the quantization method selection information as the coding mode group selection information.

5. A picture coding apparatus according to claim 2, wherein the plurality of coding mode groups comprises a coding mode group corresponding to a low bit rate in which a plurality of coding modes corresponding to the low bit rate lower than a prescribed standard bit rate are registered, and a coding mode group corresponding to a high bit rate in which a plurality of coding modes corresponding to the high bit rate higher than the prescribed standard bit rate are registered.

6. A picture decoding method, in which a coded bit stream obtained by compressing and coding a picture is input and the picture is decoded for each of prescribed blocks of the picture, comprising the steps of:

decoding coding mode group selection information from the coded bit stream;

selecting a coding mode group indicated according to the coding mode group selection information from a plurality of coding mode groups in which a coding mode selectable in a coding of one block is registered for each block; and decoding coded data from the coded bit stream for each block according to the selected coding mode group.

7. A picture decoding apparatus, in which a coded bit stream obtained by compressing and coding a picture is input and the picture is decoded for each of prescribed blocks of the picture, comprising:

a plurality of coding mode groups in which a coding mode selectable in a coding of one block is registered for each block;

coding mode group selection information decoding means for decoding coding mode group selection information from the coded bit stream;

coding mode group selecting means for selecting a coding mode group indicated by the coding mode group selection information from the plurality of coding mode groups;

coding mode decoding means for decoding a coding mode used in the coding of one block from the coded bit stream for each block by using the selected coding mode group; and decoding means for decoding coded data of each block from the coded bit stream according to the coding mode.

8. A picture decoding apparatus according to claim 7, wherein a plurality of coding modes respectively selectable for each of macro-blocks, which each denote a unit of a picture-to-be-coded, is registered in each of the plurality of coding mode groups, and the coding mode group selecting means selects a coding mode group to be used for the decoding from the plurality of coding mode groups according to the coding mode group selecting information for each of video object planes which each denote a picture indicating a condition of a video object at a time and each are composed of the macro-blocks.

9. A picture decoding apparatus according to claim 7, wherein the decoding means comprises a plurality of inverse quantization means different from each other, and inverse quantization selecting means for selecting one of the inverse quantization means according to quantization method selection information, wherein an inverse quantization is performed by using the selected inverse quantization means in a decoding, and the coding mode group selecting means uses the quantization method selection information as the coding mode group selection information.

10. A picture decoding apparatus according to claim 7, wherein the plurality of coding mode groups comprises a coding mode group corresponding to a low bit rate in which a plurality of coding modes corresponding to the low bit rate lower than a prescribed standard bit rate are registered, and a coding mode group corresponding to a high bit rate in which a plurality of coding modes corresponding to the high bit rate higher than the prescribed standard bit rate are registered.

* * * * *